United States Patent
Inoue et al.

(10) Patent No.: US 6,650,772 B1
(45) Date of Patent: Nov. 18, 2003

(54) IMAGE PROCESSING APPARATUS, IMAGE PROCESSING METHOD, AND IMAGE PROCESSING SYSTEM

(75) Inventors: Takahide Inoue, Ashigarakami-gun (JP); Hitoshi Ogatsu, Ashigarakami-gun (JP); Ryousuke Higashikata, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 264 days.

(21) Appl. No.: 09/618,569

(22) Filed: Jul. 14, 2000

Related U.S. Application Data

(62) Division of application No. 08/855,841, filed on May 12, 1997, now Pat. No. 6,128,407.

(30) Foreign Application Priority Data

| May 13, 1996 | (JP) | 8-118026 |
| Dec. 25, 1996 | (JP) | 8-345762 |
| Apr. 8, 1997 | (JP) | 9-89655 |

(51) Int. Cl.[7] .............. G06K 9/00; G03K 3/08
(52) U.S. Cl. .......... 382/162; 382/167; 358/518
(58) Field of Search ............ 382/167, 166, 382/162, 168, 232, 164, 163; 358/504, 501, 296, 518, 519; 348/391.1, 472

(56) References Cited

U.S. PATENT DOCUMENTS

| 5,237,409 A | | 8/1993 | Yamaguchi | 358/518 |
| 5,282,046 A | * | 1/1994 | Yamaguchi | 358/296 |
| 5,319,720 A | * | 6/1994 | Yokoyama et al. | 382/145 |
| 5,610,732 A | * | 3/1997 | Komatsu | 358/518 |

FOREIGN PATENT DOCUMENTS

| EP | 469804 A2 | 6/1991 |
| JP | 4-287569 A | 10/1992 |
| JP | 5-167839 | 7/1993 |
| JP | 5-227418 | 9/1993 |
| JP | 6-162181 | 6/1994 |
| JP | 7-203234 | 8/1995 |

* cited by examiner

*Primary Examiner*—Leo Boudreau
*Assistant Examiner*—Duy M. Dang
(74) *Attorney, Agent, or Firm*—Oliff & Berridge, PLC

(57) ABSTRACT

The invention provides an image processing apparatus having a device for inputting image data, a color distribution recognition device for recognizing a color distribution in a color space and position information in an image space of the image data input through the input device, and a device for determining one or more color reproduction parameters of the image data based on the color distribution and position information recognized by the color distribution recognition device and a color reproduction range of an output device.

12 Claims, 45 Drawing Sheets

N = 1
M = 2
α ≒ 0.6

N = 3
M = 1
α ≒ 1

N = 3
M = ∞
α ≒ 0

N = 3
M = 2
α ≒ 0.6

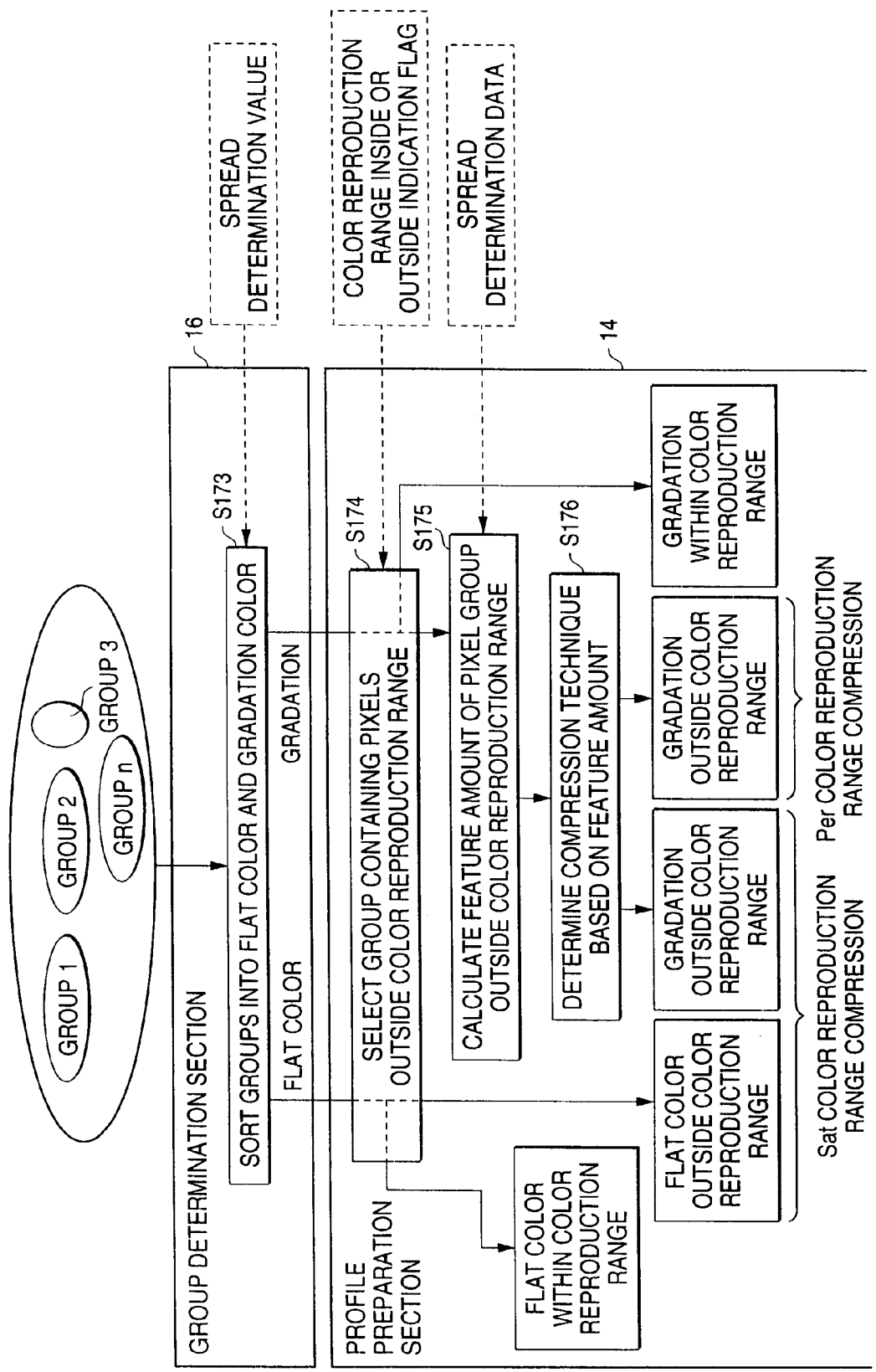

FIG. 20A
FIG. 20B
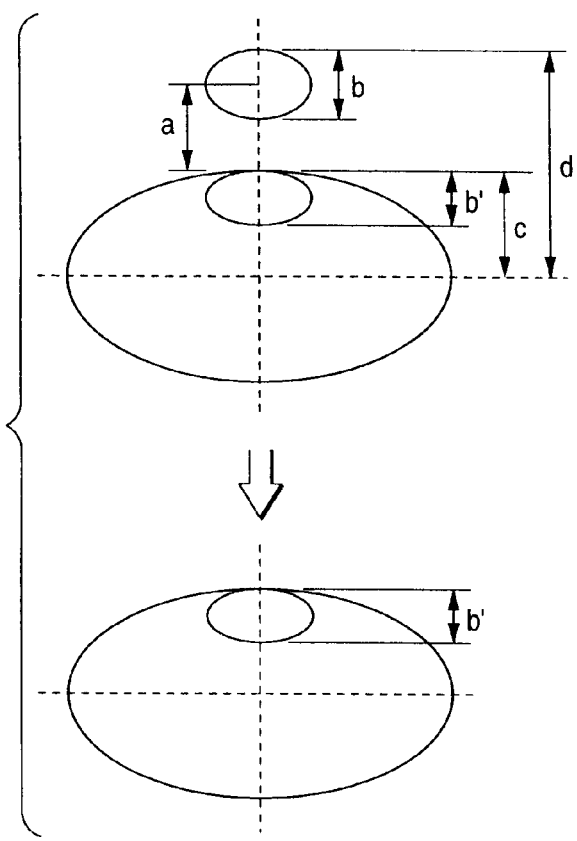
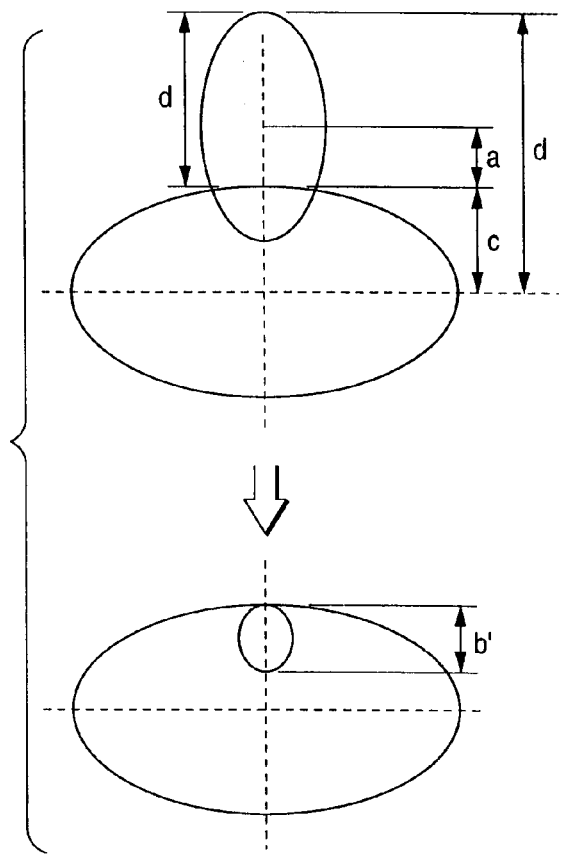
FIG. 20C
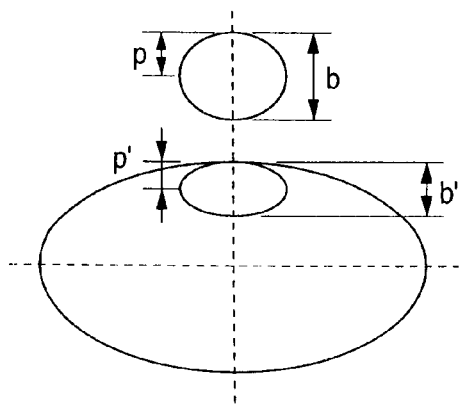

FIG. 24
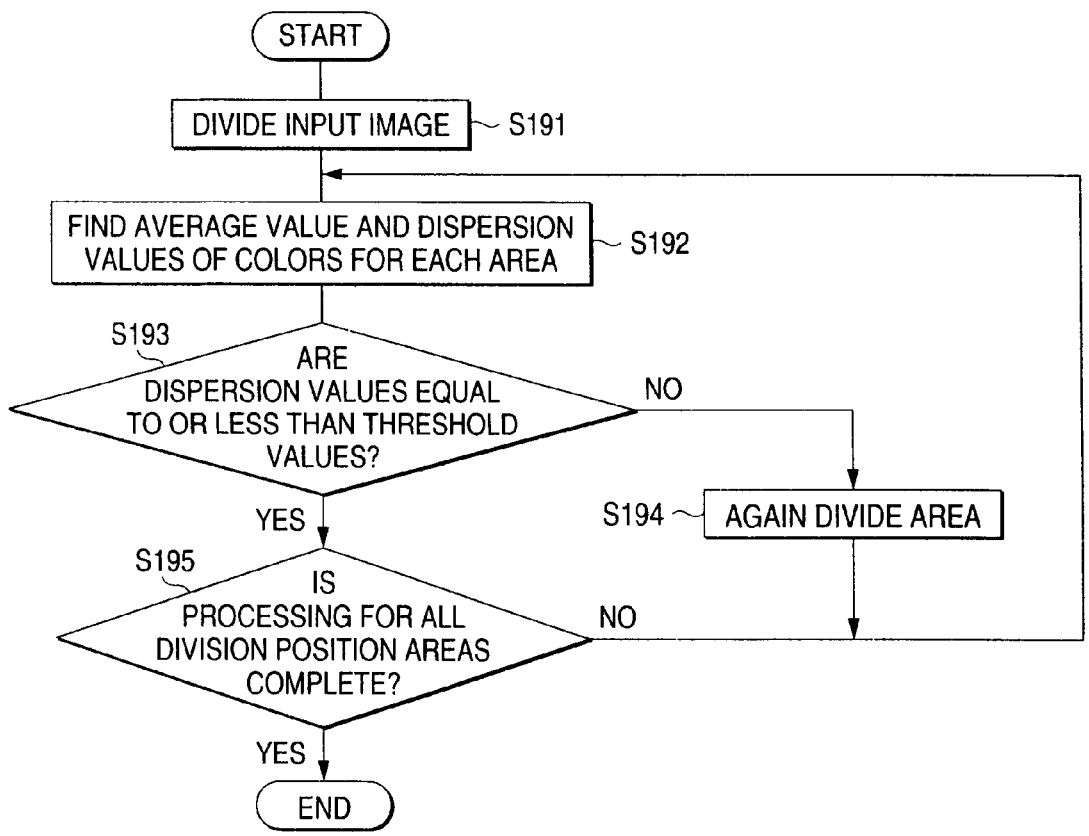
FIG. 25A     FIG. 25B     FIG. 25C
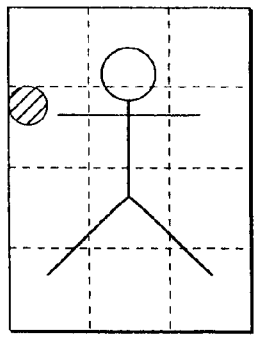 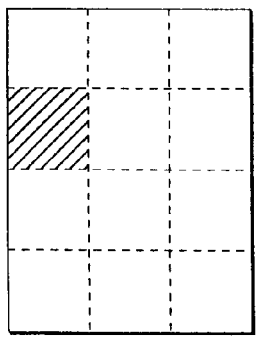 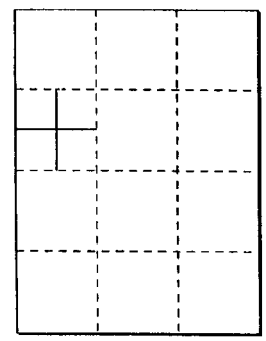

IMAGE PROCESSING APPARATUS, IMAGE PROCESSING METHOD, AND IMAGE PROCESSING SYSTEM

This is a Division of application Ser. No. 08/855,841 filed May 12, 1997 now U.S. Pat. No. 6,128,407. The entire disclosure of the prior application(s) is hereby incorporated by reference herein in its entirety.

BACKGROUND OF THE INVENTION

This invention relates to an image processing apparatus, an image processing method, and an image processing system for executing color conversion for input color image data so that the color image data falls within the color reproduction range of an output device.

Image processing includes color conversion processing of executing color conversion for color image data so that the color image data falls within the color reproduction range of the device for visualizing the color image data. For example, to output a color image to a CRT or a printer, not all colors can be represented and only colors within the color reproduction range of the device are output. When input color image data has a portion beyond the color reproduction range, color conversion processing is required for converting unreproduced colors beyond the color reproduction range into reproducible colors.

Hitherto, various methods have been designed for color conversion as to how colors not reproduced in an image output device are reproduced, and some software products that can execute color conversion have a function for such a purpose. Representative techniques of such color conversion processing include a conversion method for holding gradation, that for holding hue, and that for holding lightness.

The conversion method for holding gradation is a method of changing not only colors outside the color reproduction range, but also colors in the color range of color image data at one rate for compression so as to place all colors within the color reproduction range. This method holds color differences and therefore holds color change such as gradation. Thus, it is an optimum method as color conversion for an image such as a photo attaching importance to gradation. However, when colors within the color reproduction range in which an original image can be reproduced faithfully are changed largely, the method may be inferior in color reproducibility as a result.

In the conversion method for holding hue or lightness, only colors outside the color reproduction range are changed to boundary colors of the color reproduction range with hue or lightness held, whereby whole color change is eliminated and only unreproducible colors are converted. However, if colors resulting from changing the colors outside the color reproduction range or colors close to the resulting colors already exist in the original image, discrimination between the colors and the original colors is degraded. For example, if a part of a gradation portion is outside the color reproduction range, the colors in the part of gradation become the same color by the conversion and the gradation is lost. For another the original image portions different in color become the same color and the colors cannot be distinguished from each other.

Thus, the conversion methods have merits and demerits and a conversion method for producing good results for every image is not available. Therefore, in the current mainstream techniques, generally a method of adopting the conversion method considered to be the most favorable for the original type is often used. For example, if the original is an image such as a photo, importance is attached to gradation and the conversion method for holding gradation is adopted; if the original is a graph used in business, etc., importance is attached to lightness and the conversion method for holding lightness is used.

However, if the conversion method is thus selected according only to the original type, the demerits of the selected conversion method are reflected on the output image intact, thus the user may feel dissatisfaction. For example, if the original is determined to be an image attaching importance to gradation, such as a photo, and color conversion is executed by the conversion method for holding gradation, reproducible colors are also converted into different colors, thus a problem remains in color reproducibility. If the conversion method for holding hue or lightness is selected for executing conversion, different colors of the original image become the same, as a result of the conversion and cannot be distinguished from each other. For example, there is a possibility that a problem may occur such that although a map is colored, the colors cannot be distinguished from each other as a result of conversion or that although a gradation portion should exist in a part, flat color representation results. These problems are caused by the fact that the color conversion method is selected according only to the original type; there may be a problem in that the image contents are not considered.

For example, a system described in the Unexamined Japanese Patent Application Publication No. Hei 5-167839 counts the number of pixels outside the color reproduction range.

If the ratio of the number of pixels outside the color reproduction range is small, the conversion method for holding hue is adopted; if the ratio of the number of pixels within the color reproduction range is small, the conversion method for holding gradation is adopted. Further, a system described in the Unexamined Japanese Patent Application Publication No. Hei 6-162181 divides a color space into blocks for each hue and counts the number of pixels outside the color reproduction range for each block. If a block with a large ratio of the count exists, the conversion method for holding gradation is used; otherwise, the conversion method for holding hue is used. In the systems, the conversion method is selected for each block. Thus, even if the original is a photo, a part of the gradation portion becomes flat or even if the original is an image with large flat portions, the original colors are not reproduced if a large number of pixels are beyond the color reproduction range.

Described in the Unexamined Japanese Patent Application Publication No. Hei 5-227418 are a method of counting the number of pixels outside the color reproduction range, preparing a histogram, and using the conversion method for holding gradation so as to place 90% pixels of the count in the color reproduction range, a method of determining conversion scaling interactively, and the like. Problems similar to those described above also exist in the art described in the Unexamined Japanese Patent Application Publication No. Hei 5-227418.

For example, a color image converter described in the Unexamined Japanese Patent Application Publication No. Hei 7-203234 divides an equal color space into unit areas, finds the number of pixels contained in each unit area, maps unit areas outside the color reproduction range to other color unit areas constant in lightness in response to the number of pixels, and executes color conversion. According to the art, conversion of the colors outside the color reproduction range to the same colors as other used colors is lessened, thus gradation color change is represented in different colors and if the original image is represented in different colors, the image resulting from conversion are also represented in different colors; degradation of color discrimination can be reduced. Further, since the colors within the color reproduction range are represented in intact colors in most cases, unnecessary color change is prevented and color reproducibility is enhanced. However, since color mapping is executed only for the unit areas outside the color reproduction range, for example, for continuous gradation from the colors within the color reproduction range to the colors outside the range, color continuity is impaired due to color change in portions outside the color reproduction range and desired gradation cannot be represented.

Thus, in the prior arts, it may be impossible to represent gradation portions as gradation and represent flat portion colors in appropriate colors for the flat portions; it is difficult to provide an output image satisfactory to the user.

On the other hand, when the user criticizes the color difference between input and output images, for example, he or she often takes out a part of the image and comments on the color difference and discrimination degradation. The image portions whose color difference is discussed are often flat tone portions and comparison such that some colors in the gradation portions differ is not much made. In contrast, the difference between colors placed in the neighborhood becomes a comparison object in gradation portions in many cases. For example, if a gradation portion becomes almost flat tone as discrimination is degraded, it becomes a factor unsatisfactory to the user.

Thus, different criteria are applied to flat tone and gradation portions even in one image and if the same color conversion is executed, either must be sacrificed. Optimum color conversion may be executed in response to parts of an image in such a manner that different conversion methods are applied to the flat tone and gradation portions. However, prior art for such purpose does not exist as things stand now.

SUMMARY OF THE INVENTION

It is therefore an object of the invention to provide an image processing apparatus, an image processing method, and an image processing system for performing color processing in response to an input image so as to represent a gradation portion as gradation and perform processing appropriate for flat color for a flat color portion at the same time.

According to the invention as in aspect 1, there is provided an image processing apparatus comprising means for inputting image data, color distribution recognition means for recognizing a color distribution in a color space and position information in an image space of the image data input through the input means, and means for determining one or more color reproduction parameters of the image data based on the color distribution and position information recognized by the color distribution recognition means and a color reproduction range of an output device.

According to the invention as in aspect 2, there is provided an image processing apparatus comprising means for inputting image data, color distribution recognition means for recognizing a color distribution of the image data input through the input means, grouping means for sorting the color distribution recognized by the color distribution recognition means into one or more groups, and means for determining a color reproduction parameter of the image data based on the groups into which the color distribution is sorted by the grouping means and a color reproduction range of an output device.

According to the invention as in aspect 3, there is provided an image processing apparatus comprising means for inputting image data, color distribution recognition means for recognizing a color distribution in a color space and position information in an image space of the image data input through the input means, grouping means for sorting the color distribution into one or more groups based on the position information recognized by the color distribution recognition means, and means for determining one or more color reproduction parameters of the image data based on the groups into which the color distribution is sorted by the grouping means and a color reproduction range of an output device.

In the invention as in aspect 4, in the image processing apparatus as in aspect 2 or 3, the color distribution recognition means divides the color space into areas and counts the number of pixels belonging to each division area and the grouping means determines whether or not adjacent areas can be combined based on the counts of the adjacent areas provided by the color distribution recognition means and groups the areas in response to the determination result.

In the invention as in aspect 5, in the image processing apparatus as in aspect 2 or 3, the color distribution recognition means divides the color space into areas, counts the number of pixels belonging to each division area, and recognizes pixel distribution information and the grouping means determines whether or not adjacent areas can be combined based on the counts of the adjacent areas provided by the color distribution recognition means and the pixel distribution information and groups the areas in response to the determination result.

In the invention as in aspect 6, in the image processing apparatus as in aspect 3, the color distribution recognition means divides the color space into areas, counts the number of pixels belonging to each division area, and relates position information of pixels belonging to each area and the grouping means determines whether or not adjacent areas can be combined based on the counts of the adjacent areas provided by the color distribution recognition means, determines positions of the pixels belonging to the adjacent areas, and groups the areas on the color space in response to the two determination results.

In the invention as in aspect 7, in the image processing apparatus as in aspect 2 or 3, the grouping means groups the areas except for color distributions of portions where no degradation of color discrimination is assumed to occur.

According to the invention as in aspect 8, there is provided an image processing apparatus comprising means for inputting image data, cluster preparation means for extracting areas on an image plane made up of similar color pixels based on the image data input through the input means and preparing clusters based on the extracted areas, cluster analysis means for recognizing color distributions of the clusters prepared by the cluster preparation means and preparing a group, and means for determining a color reproduction parameter of the image data for each of the clusters prepared by the cluster preparation means based on the group generated by the cluster analysis means and a color reproduction range of an output device.

In the invention as in aspect 9, the image processing apparatus as in aspect 8 further includes cluster correction means for again dividing and again integrating the cluster prepared by the cluster preparation means based on the group generated by the cluster analysis means to prepare new clusters, recognizing color distributions of the new clusters, and generating a new group, wherein the color reproduction parameter determination means determines a color reproduction parameter of the image data for each of the new clusters based on the new clusters and the new group generated by the cluster correction means and the color reproduction range of the output device.

In the invention as in aspect 10, in the image processing apparatus as in aspect 8, the cluster preparation means extracts clusters on the image space by clustering based on one or more feature amounts extracted from the image data input through the input means.

In the invention as in aspect 11, in the image processing apparatus as in aspect 8, the cluster preparation means divides the image data input through the input means into blocks on the image space, repeats block division and integration in response to dispersion of pixel values in the blocks for extracting a global similar color area, and extracts a detailed cluster by clustering based on the global similar color area.

In the invention as in aspect 12, in the image processing apparatus as in aspect 8, the cluster preparation means divides the image data input through the input means into blocks on the image space, repeats block division and integration in response to dispersion of pixel values in the blocks for extracting a global similar color area, checks the global similar color area for color distribution, determines whether or not cluster preparation using position information is required, and extracts a detailed cluster by clustering based on the global similar color area, if necessary, based on the determination result.

In the invention as in aspect 13, in the image processing apparatus as in aspect 8, the cluster analysis means recognizes a color distribution based on dispersion of pixels belonging to the cluster prepared by the cluster preparation means.

In the invention as in aspect 14, in the image processing apparatus as in aspect 8, the cluster analysis means recognizes a color distribution based on a color value change rate of adjacent pixels belonging to the cluster prepared by the cluster preparation means and dispersion of pixels belonging to the cluster.

In the invention as in aspect 15, in the image processing apparatus as in aspect 8, the cluster analysis means groups the clusters except for color distributions of portions where no degradation of color discrimination is assumed to occur.

In the invention as in aspect 16, in the image processing apparatus as in aspect 9, the cluster correction means integrates the clusters based on representative colors of the clusters and the color distributions in the clusters recognized by the cluster analysis section.

In the invention as in aspect 17, in the image processing apparatus as in aspect 9, the cluster correction means divides and integrates clusters in response to a form of a multi-dimensional histogram based on the color distributions and color value in the clusters recognized by the cluster analysis section.

In the invention as in aspect 18, in the image processing apparatus as in aspect 2, 3, or 8, the color reproduction parameter determination means comprises gradation determination means for determining spread magnitude of color change of the group for determining the color reproduction parameter based on the determination result of the gradation determination means.

In the invention as in aspect 19, in the image processing apparatus as in aspect 2, 3, or 8, the color reproduction parameter determination means determines a color compression method and color compression strength for the group based on a distribution form of a portion where a color portion space on the color space contained in the group is outside the color reproduction range.

In the invention as in aspect 20, in the image processing apparatus as in aspect 2, 3, or 8, the color reproduction parameter determination means determines a color compression method and color compression strength for the group based on a distribution form of a portion where a color portion space on the color space contained in the group is outside the color reproduction range and a distribution form of the group.

In the invention as in aspect 21, in the image processing apparatus as in aspect 19 or 20, the color space is an equal color space and the distribution form is determined based on any one of spread in a lightness direction, spread in a hue direction, or spread in a chroma direction or combination thereof in the color portion space on the equal color space contained in the group.

In the invention as in aspect 22, in the image processing apparatus as in aspect 1, 3, or 8, the color reproduction parameter determination means prepares one or more conversion parameters of a first equal color space to a second equal color space and one or more pieces of position mask information each indicating a position on the image space to which the conversion parameter is applied.

In the invention as in aspect 23, in the image processing apparatus as in aspect 2, 3, or 8, the color reproduction parameter determination means generates a group into which the groups are collected and determines the color reproduction parameter for the group.

In the invention as in aspect 24, in the image processing apparatus as in aspect 3 or 8, the color reproduction parameter determination means generates a group into which the groups are collected and determines a conversion parameter of a first equal color space to a second equal color space and position mask information indicating a position on the image space to which the conversion parameter is applied for the group.

According to the invention as in aspect 25, there is provided an image processing apparatus comprising means for inputting image data, one or more multi-dimensional color conversion tables for executing color conversion of the image data input through the input means based on preset lattice point data, color distribution recognition means for recognizing a color distribution in a color space and position information in an image space of the image data input through the input means, and means for determining the lattice point data for the one or more multi-dimensional color conversion tables based on the color distribution, the position information, and a color reproduction range of an output device.

According to the invention as in aspect 26, there is provided an image processing apparatus comprising means for inputting image data, a multi-dimensional color conversion table for executing color conversion of the image data input through the input means based on preset lattice point data, color distribution recognition means for recognizing a color distribution of the image data input through the input means, grouping means for sorting the color distribution recognized by the color distribution recognition means into one or more groups, and means for determining the lattice point data for the multi-dimensional color conversion table based on the groups into which the color distribution is sorted by the grouping means and the color reproduction range of the output device.

According to the invention as in aspect 27, there is provided an image processing apparatus comprising means for inputting image data, one or more multi-dimensional color conversion tables for executing color conversion of the image data input through the input means based on preset lattice point data, color distribution recognition means for recognizing a color distribution in a color space and position information in an image space of the image data input through the input means, grouping means for sorting the color distribution into one or more groups based on the position information recognized by the color distribution recognition means, and means for determining the lattice point data for the one or more multi-dimensional color conversion tables based on the groups into which the color distribution is sorted by the grouping means, the position information, and the color reproduction range of: the output device.

In the invention as in aspect 28, in the image processing apparatus as in aspect 26 or 27, the color distribution recognition means divides the color space into areas and counts the number of pixels belonging to each division area and the grouping means determines whether or not adjacent areas can be combined based on the counts of the adjacent areas provided by the color distribution recognition means and groups the areas in response to the determination result.

In the invention as in aspect 29, in the image processing apparatus as in aspect 26 or 27, the color distribution recognition means divides the color space into areas, counts the number of pixels belonging to each division area, and recognizes pixel distribution information and the grouping means determines whether or not adjacent areas can be combined based on the counts of the adjacent areas provided by the color distribution recognition means and the pixel distribution information and groups the areas in response to the determination result.

In the invention as in aspect 30, in the image processing apparatus as in aspect 26 or 27, the grouping means groups the areas except for color distributions of portions where no degradation of color discrimination is assumed to occur.

In the invention as in aspect 31, in the image processing apparatus as in aspect 26 or 27, the lattice point data determination means determines a color compression method and color compression strength for the group based on a distribution form of a portion where a color portion space on the color space contained in the group is outside the color reproduction range.

In the invention as in aspect 32, in the image processing apparatus as in aspect 26 or 27, the lattice point data determination means determines a color compression method and color compression strength for the group based on a distribution form of a portion where a color portion space on the color space contained in the group is outside the color reproduction range and a distribution form of the group.

In the invention as in aspect 33, in the image processing apparatus as in aspect 27, the lattice point data determination means comprises means for determining position mask information corresponding to the groups into which the color distribution is sorted by the grouping means and storage means for creating and storing a file of the lattice point data corresponding to the position mask information determined by the position mask information determination means for determining the lattice point data by reading the lattice point data based on the position mask information from the storage means.

According to the invention as in aspect 34, there is provided an image processing apparatus comprising means for inputting image data, one or more multi-dimensional color conversion tables for executing color conversion of the image data input through the input means based on preset lattice point data, cluster preparation means for extracting areas on an image space made up of similar color pixels based on the image data input through the input means and preparing clusters based on the extracted areas, cluster analysis means for recognizing color distributions of the clusters prepared by the cluster preparation means and preparing a group, and means for determining lattice point data for the one or more multi-dimensional color conversion tables based on the clusters prepared by the cluster preparation means, the group generated by the cluster analysis means, and a color reproduction range of an output device.

According to the invention as in aspect 35, there is provided an image processing method comprising the steps of recognizing a color distribution in a color space and position information in an image space of input image data and determining one or more color reproduction parameters of the image data based on the color distribution, the position information, and a color reproduction range of an output device.

According to the invention as in aspect 36, there is provided an image processing method comprising the steps of recognizing a color distribution of input image data, sorting the recognized color distribution into one or more groups, and determining a color reproduction parameter of the image data based on the groups and a color reproduction range of an output device.

According to the invention as in aspect 37, there is provided an image processing method comprising the steps of recognizing a color distribution in a color space and position information in an image space of input image data, sorting the color distribution into one or more groups based on the recognized position information, and determining one or more color reproduction parameters of the image data based on the groups and a color reproduction range of an output device.

In the invention as in aspect 38, in the image processing method as in aspect 36 or 37, the color distribution recognition step divides the color space into areas and counts the number of pixels belonging to each division area and the grouping step determines whether or not adjacent areas can be combined based on the counts of the adjacent areas provided by the color distribution recognition step and groups the areas in response to the determination result.

In the invention as in aspect 39, in the image processing method as in aspect 36 or 37, the color distribution recognition step divides the color space into areas, counts the number of pixels belonging to each division area, and recognizes pixel distribution information and the grouping step determines whether or not adjacent areas can be combined based on the counts of the adjacent areas provided by the color distribution recognition step and the pixel distribution information and groups the areas in response to the determination result.

In the invention as in aspect 40, in the image processing method as in aspect 36 or 37, the grouping step groups the areas except for color distributions of portions where no degradation of color discrimination is assumed to occur.

In the invention as in aspect 41, in the image processing method as in aspect 36 or 37, the color reproduction parameter determination step includes determining a color compression method and color compression strength for the group based on a distribution form of a portion where a color portion space on the color space contained in the group is outside the color reproduction range.

In the invention as in aspect 42, in the image processing method as in aspect 36 or 37, the color reproduction parameter determination step includes determining a color compression method and color compression strength for the group based on a distribution form of a portion where a color portion space on the color space contained in the group is outside the color reproduction range and a distribution form of the group.

In the invention as in aspect 43, in the image processing method as in aspect 35 or 37, the color reproduction parameter determination step includes preparing one or more conversion parameters of a first equal color space to a second equal color space and one or more pieces of position mask information each indicating a position on the image space to which the conversion parameter is applied.

According to the invention as in aspect 44, there is provided an image processing method comprising the steps of extracting areas on an image space made up of similar color pixels based on input image data and preparing clusters, recognizing color distributions of the clusters and preparing a group, and determining one or more color reproduction parameters of the image data based on the clusters, the group, and a color reproduction range of an output device.

According to the invention as in aspect 45, there is provided an image processing system comprising an image input device for inputting color image data, an image processing apparatus for performing image processing for color image data input through the image input device, and an image output device for outputting the color image data for which the image processing has been performed by the image processing apparatus, characterized in that the image processing apparatus comprises color distribution recognition means for recognizing a color distribution in a color space and position information in an image space of the color image data, means for determining a color reproduction parameter of the color image data based on the color distribution, the position information, and a color reproduction range of the image output device, and conversion means for performing color reproduction processing for the color image data based on the color reproduction parameter determined by the color reproduction parameter determination means and the position information and outputting the resulting conversion color image data to the image output device and that the image output device outputs a color image based on the conversion color image data output from the image processing apparatus.

According to the invention as in aspect 46, there is provided an image processing system comprising an image input device for inputting color image data, an image processing apparatus for performing image processing for color image data input through the image input device, and an image output device for outputting the color image data for which the image processing has been performed by the image processing apparatus, characterized in that the image processing apparatus comprises color distribution recognition means for recognizing a color distribution of the color image data, grouping means for sorting the color distribution recognized by the color distribution recognition means into one or more groups, means for determining a color reproduction parameter of the color image data based on the groups into which the color distribution is sorted by the grouping means and a color reproduction range of the image output device, and conversion means for performing color reproduction processing for the color image data based on the color reproduction parameter determined by the color reproduction parameter determination means and outputting the resulting conversion color image data to the image output device and that the image output device outputs a color image based on the conversion color image data output from the image processing apparatus.

According to the invention as in aspect 47, there is provided an image processing system comprising an image input device for inputting color image data, an image processing apparatus for performing image processing for color image data input through the image input device, and an image output device for outputting the color image data for which the image processing has been performed by the image processing apparatus, characterized in that the image processing apparatus comprises color distribution recognition means for recognizing a color distribution in a color space and position information in an image space of the color image data, grouping means for sorting the color distribution into one or more groups based on the position information recognized by the color distribution recognition means, means for determining a color reproduction parameter of the color image data based on the groups into which the color distribution is sorted by the grouping means and a color reproduction range of the image output device, and conversion means for performing color reproduction processing for the color image data based on the color reproduction parameter determined by the color reproduction parameter determination means and the position information and outputting the resulting conversion color image data to the image output device and that the image output device outputs a color image based on the conversion color image data output from the image processing apparatus.

According to the invention as in aspect 48, there is provided an image processing system comprising an image input device for inputting color image data, an image processing apparatus for performing image processing for color image data input through the image input device, and an image output device for performing image processing for the color image data based on an image processing instruction given by the image processing apparatus and outputting a color image, characterized in that the image processing apparatus comprises color distribution recognition means for recognizing a color distribution in a color space and position information in an image space of the color image data and means for determining a color reproduction parameter of the color image data based on the color space, the position information, and a color reproduction range of the image output device and that the image output device performs color conversion processing for the color image data based on the color reproduction parameter and the position information output from the image processing apparatus and outputs a color image.

According to the invention as in aspect 49, there is provided an image processing system comprising an image input device for inputting color image data, an image processing apparatus for performing image processing for color image data input through the image input device, and an image output device for performing image processing for the color image data based on an image processing instruction given by the image processing apparatus and outputting a color image, characterized in that the image processing apparatus comprises color distribution recognition means for recognizing a color distribution of the color image data, grouping means for sorting the color distribution recognized by the color distribution recognition means into one or more groups, and means for determining a color reproduction parameter of the color image data based on the groups into which the color distribution is sorted by the grouping means and a color reproduction range of the image output device, and that the image output device performs color conversion processing for the color image data based on the color reproduction parameter output from the image processing apparatus and outputs a color image.

According to the invention as in aspect 50, there is provided an image processing system comprising an image input device for inputting color image data, an image processing apparatus for performing image processing for dolor image data input through the image input device, and an image output device for performing image processing for the color image data based on an image processing instruction given by the image processing apparatus and outputting a color image, characterized in that the image processing apparatus comprises color distribution recognition means for recognizing a color distribution in a color space and position information in an image space of the color image data, grouping means for sorting the color distribution into one or more groups based on the position information recognized by the color distribution recognition means, and means for determining a color reproduction parameter of the color image data based on the groups into which the color distribution is sorted by the grouping means and a color reproduction range of the image output device, and that the image output device performs color conversion processing for the color image data based on the color reproduction parameter and the position information output from the image processing apparatus and outputs a color image.

According to the invention as in aspect 51, there is provided an image processing system comprising an image input device for inputting color image data, an image processing apparatus for performing image processing for color image data input through the image input device, and an image output device for performing image processing for the color image data based on an image processing instruction given by the image processing apparatus and outputting a color image, characterized in that the image processing apparatus comprises cluster preparation means for extracting areas on an image space made up of similar color pixels based on the color image data and preparing clusters based on the extracted areas, cluster analysis means for recognizing color distributions of the clusters prepared by the cluster preparation means and preparing a group, and means for determining a color reproduction parameter of the color image data based on the clusters prepared by the cluster preparation means, the group generated by the cluster analysis means, and a color reproduction range of the image output device, and that the image output device performs color conversion processing for the color image data based on the color reproduction parameter and the position information output from the image processing apparatus and outputs a color image.

BRIEF DESCRIPTION OF THE DRAWING

In the accompanying drawings:

FIG. 16 is a flowchart to show an operation example from a group determination section to an intermediate point of the profile preparation section in the second embodiment of the image processing system of the invention;

FIGS. 20a–c is an illustration of compressibility in examples of Per compression processing for gradation in the profile preparation section in the second embodiment of the image processing system of the invention;

FIG. 24 is a flowchart to show an operation example of a position space division section 91 in the third embodiment of the image processing system of the invention;

FIGS. 25a–c is an illustration of an operation example of a position space dividing section in the third embodiment of the image processing system of the invention;

DETAILED DESCRIPTION OF THE PREFERRED EMBODIMENTS

Figure 1:
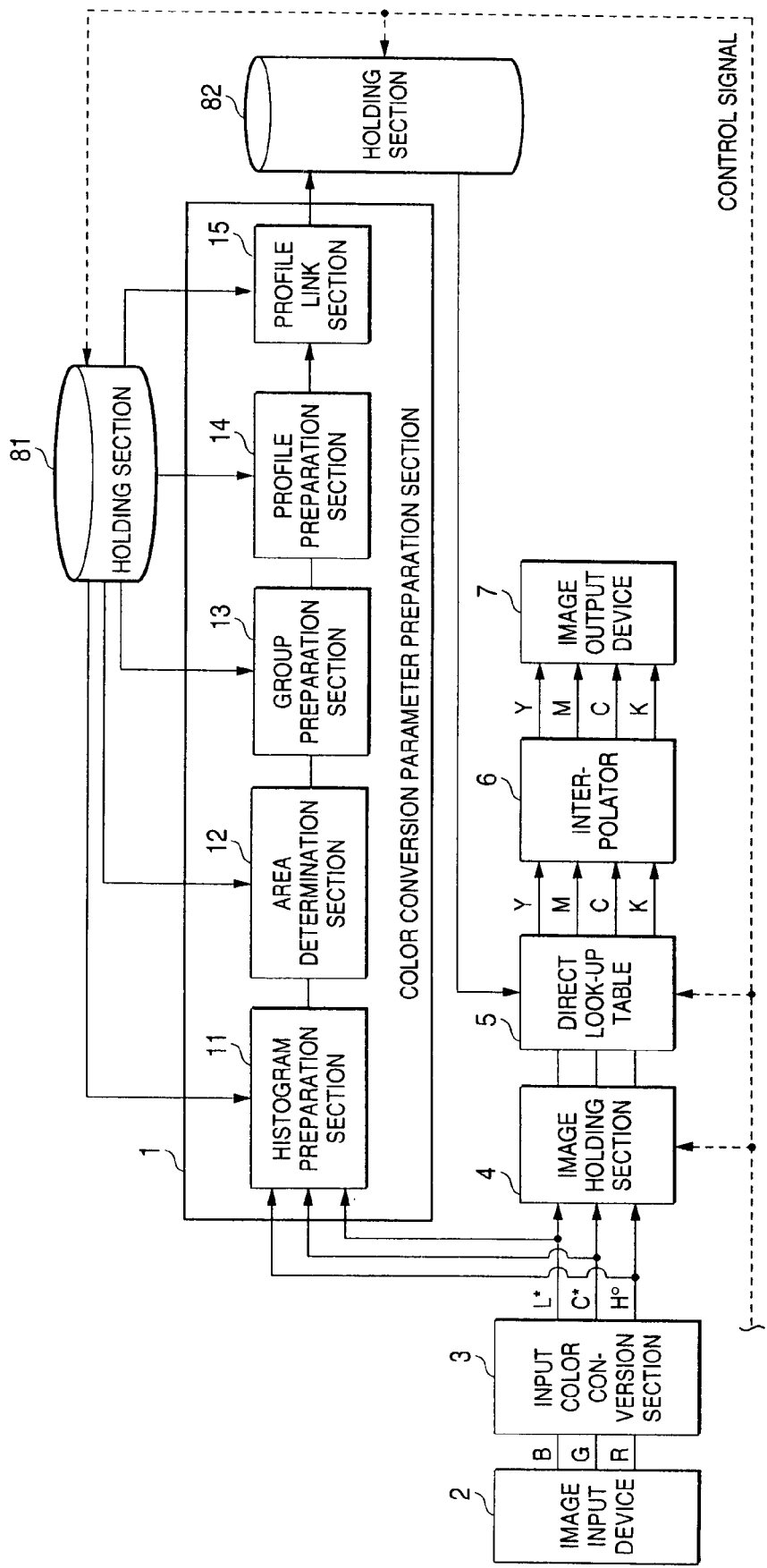
FIG. 1 is a block diagram to show a first embodiment of an image processing system of the invention.

FIG. 1 is a block diagram to show a first embodiment of an image processing system of the invention. In the figure, numeral 1 is a color conversion parameter preparation section, numeral 2 is an image input device, numeral 3 is an input color conversion section, numeral 4 is an image holding section, numeral 5 is a direct look-up table, numeral 6 is an interpolator, numeral 7 is an image output device, numeral 11 is a histogram preparation section, numeral 12 is an area determination section, numeral 13 is a group preparation section, numeral 14 is a profile preparation section, numeral 15 is a profile link section, and numerals 81 and 82 are holding sections. This image processing system contains an image processing apparatus of the invention and provides an image processing method of the invention.

The image input device 2 reads an image and outputs the image as input image data. Here, assume that the image data is input as RGB data. Image data previously read and stored in a storage unit, etc., or sent via a network, etc., may be used as input image data. Besides, for example, such as the images prepared by a graphics system, etc., may be also used as input image data.

The input color conversion section 3 executes color conversion between the color system of input image data and that used in internal processing. Since an $L^*C^*H°$ color system is used in internal processing in the example, conversion processing from RGB space to $L^*C^*H°$ space is performed. In the description that follows, $L^*C^*H°$ is represented simply as LCH.

The image holding section 4 holds input image data resulting from color conversion executed by the input color conversion section 3. Since the direct look-up table 5 has the contents changed by the color conversion parameter preparation section 1 in response to input image data, the image holding section 4 holds the input image data resulting from color conversion until the contents of the direct look-up table 5 are set. After the contents of the direct look-up table 5 are set, the image holding section 4 enters the held input image data in the direct look-up table 5.

The direct look-up table 5 is a memory for holding the contents set by the color conversion parameter preparation section 1. It compresses color value to a color reproduction range and executes conversion to the color space of the image output device 7 at the same time. A number of table values are output based on input image data given from the image holding section 4. For example, to divide each axis of LCH into 16 pieces, 17 lattice points occur on each axis. The number of lattice point sets on each axis is 17, and the total number of lattice points of the three axes is $17^3$=4913. The direct look-up table 5 holds the values resulting from conversion for the 4913 lattice points. Of course, the number of divisions of each axis is arbitrary and the values of the lattice points responsive to the number of divisions are held. In addition to use of such a table, various configurations are possible as a function expression is given for performing an operation. Since internal processing is performed on the LCH space and the image output device 7 uses a YMCK color system in the example, conversion of LCH to YMCK is executed. Conversion is not limited to it. Conversion processing fitted to the color system of the input image data held in the image holding section 4 may be performed. For example, if input image data in an L*a*b* color system (L*a*b* will be hereinafter represented as Lab) is held in the image holding section 4, conversion of Lab to YMCK may be performed. Color conversion processing is divided and, for example, after conversion of LCH to LCH is executed to compress color value to the color representation range, conversion of LCH to YMCK, which is color space conversion, may be executed.

The interpolator 6 interpolates a number of table values output from the direct look-up table 5 and outputs output image data.

The image output device 7 is a machine that can output color images, such as a printer or CRT. It outputs an image based on the output image data from the interpolator 6. The image output device 7 may store data in a recording device, and transfer data to another device via a network, bus, etc., for example, without actual output.

The holding section 8 holds various setup values required for the color conversion parameter section 1 and setup values of the direct look-up table 5 according to prepared color conversion parameters. The holding section 81 mainly holds various setup values required for the color conversion parameter section 1 and the holding section 82 mainly holds setup values of the direct look-up table 5 prepared by the color conversion parameter preparation section 1.

The color conversion parameter preparation section 1 prepares and sets lattice point data in the direct look-up table 5 based on the input image data resulting from color conversion by the input color conversion section 3. It has a histogram preparation section 11, an area determination section 12, a group preparation section 13, a profile preparation section 14, and a profile link section 15. In the example, the color conversion parameter preparation section 1 performs processing on the LCH space, but the invention is not limited to it; for example, any other color system such as Lab may be used.

The histogram preparation section 11 prepares a histogram on the LCH space. How to divide the LCH space for preparing a histogram is read from the holding section 81 as division information. Preferably, a histogram may be created for each address value of an LCH-to-CMYK direct look-up table profile used in the profile link section 15. Here, assume that a histogram is prepared for each LCH address value of the LCH-to-CMYK direct look-up table profile. Of course, as the LCH space is finely divided, a distribution can be grasped accurately, but processing time is taken. A tradeoff exists between the fine division and the processing time. Partial spaces into which the LCH space is divided will be called "division color areas".

As a specific example of creating a histogram, if each of L, C, and H axes in an LCH-to-LCH direct look-up table is divided into 16 pieces, namely, the number of lattice points on each axis is 17, the high-order five bits or more of input image data (in this case, L, C, and H are each 8-bit data) are seen for determining which division color area the lattice point enters. The number of pixels entered in each division color area is counted, whereby a histogram is prepared.

When the histogram preparation section 11 counts the number of pixels for each division color area, it also holds intra-area distribution information indicating a distribution in a division color area as to how many colors exist and how distant the colors are from the center of the division color area. The intra-area distribution information can be determined on the low-order four bits of the input image. To speed up processing, input images are thinned out and then histograms may be created for images.

The area determination section 12 first determines whether or not a representative point in each division color area is within the color reproduction range based on the histogram for each division color area prepared by the histogram preparation section 11. If the representative point in each division color area is within the color reproduction range, the area determination section 12 determines that color compression to the color reproduction range is not required as a rule. If colors exist outside the color reproduction range, the area determination section 12 calculates dispersion in each axis direction based on the intra-area distribution information in each division color area and finds a "dispersion vector" in each division color area. It determines color spread in the division color area based on the dispersion value and determines whether the area is a flat color portion using almost uniform colors or a gradation portion using similar colors gradually.

Since the gradation portion is a portion in which originally adjacent colors are similar colors and gradual color change exists, whether or not the area is a gradation portion cannot be determined unless position information is used. Here, for convenience, if the dispersion value is small and spread in color space is small, the area is determined to be a flat color portion; if the dispersion value is large and spread in color space is large, the area is determined to be a gradation portion. Of course, any other determination method may be used.

The group preparation section 13 combines a division color area determined to be a gradation portion by the area determination section 12 with adjacent division color areas to form a group based on the dispersion vector found for each division color area. This means that if the combination degree with adjacent division color areas is strong, the areas are collected into one group. The adjacent division color areas indicate three-dimensional adjacent color division areas existing up and down, from side to side, back and force, and slantingly on color space. However, when the color space is divided in small units, the adjacent concept is expanded and division color areas existing in one range although they are not adjacent viewed from one division color area may be defined as adjacent division color areas. The group refers to combination of two or more division color areas or only a single division color area.

Whether or not adjacent division color areas are grouped is determined by seeing the dispersion vector match degree. For example, if the inner product of dispersion vectors is calculated and compared with a threshold value and the former is greater than the latter, namely, if it is determined that the dispersion vectors indicate a similar trend and that colors spread in a similar direction, the two division color areas are combined into one group.

The profile preparation section 14 prepares a profile to compress colors outside the color reproduction range to the color reproduction range. Here, separate profiles are prepared for flat color and gradation portions. Basically, if the area is a flat color portion, compression processing to the color reproduction range to put colors outside the color reproduction range on the contour of the color reproduction range, which will be hereinafter referred to as Sat compression processing, is executed. If the area is a gradation portion, the distribution of the portion outside the color reproduction range in the group is seen for determining the compression method to the color reproduction range. For example, if spread in a chroma direction is large, the conversion method for holding gradation, which will be hereinafter referred to as Per compression processing, is used; if spread in a hue direction is large, Sat compression processing is executed. For the spread determination criterion, the dispersion value may be compared with a threshold value, for example.

According such determination, in the flat color portion, Sat compression processing is executed for compressing colors to the color reproduction range and in the gradation portion, either Sat or Per compression processing is executed. Color conversion parameters are found by Sat compression processing, Per compression processing. Specifically, a color reproduction range compression initialization profile in which initial values that can be stored in the direct look-up table 5 are set is provided and is rewritten, thereby providing an optimum color reproduction range compression profile. In the color reproduction range compression initialization profile, the address and data values are the same within the color reproduction range and the map data value to the contour of the color reproduction range which seems to be optimum for address value is previously held outside the color reproduction range. Since color conversion with the color reproduction range compression profile is LCH-to-LCH conversion, the profile may be called "an LCH-to-LCH direct look-up table profile".

The profile link section 15 links the LCH-to-LCH direct look-up table profile for color reproduction range compression and a profile for the image output device 7, for example, a direct look-up table profile for executing color space conversion of LCH to CMYK to prepare an LCH-to-CMYK direct look-up table profile. This profile is a profile for compressing to the color reproduction range and executing color space conversion. The profile is stored in the direct look-up table 5 and input image data of LCH space held in the image holding section 4, whereby image data with the possible color space range compressed to the color reproduction range of the image output device 7 can be provided.

Next, an example of the operation in the first embodiment of the image processing system of the invention will be discussed. First, an example of the general operation will be outlined. An image is read through the image input device 2 and input image data in the RGB space is provided. The input image data is converted into LCH signals by the input color conversion section 3. The LCH signals are input to the color conversion parameter preparation section 1, which then prepares color conversion parameters containing processing for colors outside the color reproduction range and sets the prepared color conversion parameters in the direct look-up table 5.

The input image data read through the image input device 2 and subjected to color conversion in the input color conversion section 3 is held in the image holding section 4. After the color conversion parameter preparation section 1 sets the color conversion parameters in the direct look-up table 5, the input image data held in the image holding section 4 is input to the direct look-up table 5 and color conversion is executed so that color value of the image data is placed within the color reproduction range. Also, color space conversion matched with the color system of the image output device 7 is also executed in the direct look-up table 5. Output image data read from the direct look-up table 5 is interpolated by the interpolator 6 and is sent to the image output device 7 for output.

Figure 2:
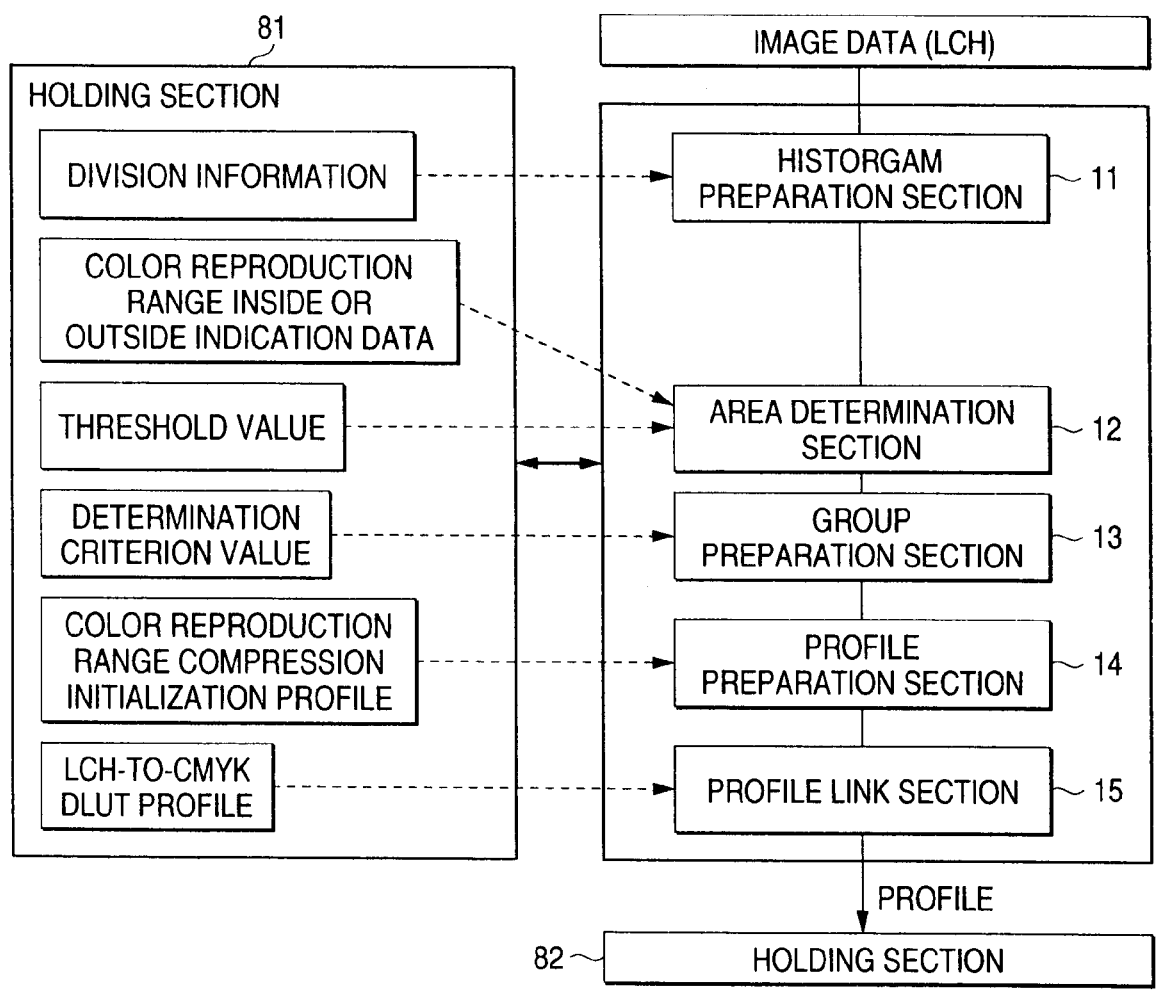
FIG. 2 is an illustration of an example of the operation of a color conversion parameter preparation section 1 in the first embodiment of the image processing system of the invention.

FIG. 2 is an illustration of an example of the operation of the color conversion parameter preparation section 1 in the first embodiment of the image processing system of the invention. It also shows data in the holding section 81 used together with the processing sections of the color conversion parameter preparation section 1.

Image data input through the image input device 2 undergoes color space conversion processing of RGB to LCH in the input color conversion section 3 and is input to the color conversion parameter preparation section 1. First, the histogram preparation section 11 uses division information to divide the color space and counts the number of pixels having color value contained in each division color area. Here, as described above, the division color areas are set so that the lattice points in the LCH-to-LCH direct look-up table profile for initialization in which values are preset or that prepared by the profile preparation section 14 become center points, and the number of pixels in each division color area is counted. Intra-area distribution information indicating a distribution in a division color area as to how many colors exist and how distant the colors are from the center of the division color area is also held.

Figure 3A:
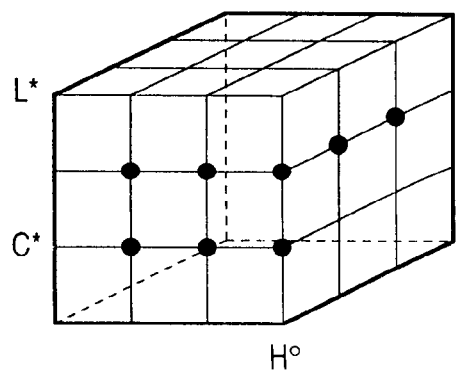
FIG. 3a is an illustration of dividing a color space.

FIG. 3 is an illustration of dividing a color space. FIG. 3A is an illustration of lattice points and (B) is an illustration of division color areas. The LCH space, which is a cylindrical coordinate system, is represented in a rectangular coordinate system for convenience in the description to follow. Also in FIG. 3, the LCH space is shown as a rectangular coordinate system.

Figure 3B:
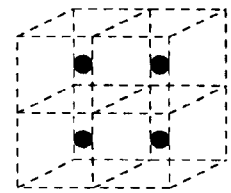

FIG. 3 shows an example of dividing each axis into three parts and the solid lines in FIG. 3A denote planes provided by dividing the axes. The intersections of the division planes of the three axes are lattice points. Since each axis is divided into three parts, four division planes exist and the number of intersections is $4^3=64$. In FIG. 3A, only several lattice points on the contours are indicated by black dots. The division color areas are set as indicated by the broken lines in FIG. 3B so that the lattice points become the center points. The number of pixels having color value contained in each of the division color areas is counted. In each division color area, the representative color is a color at the lattice point and the frequency at the lattice points is held.

Figure 4:
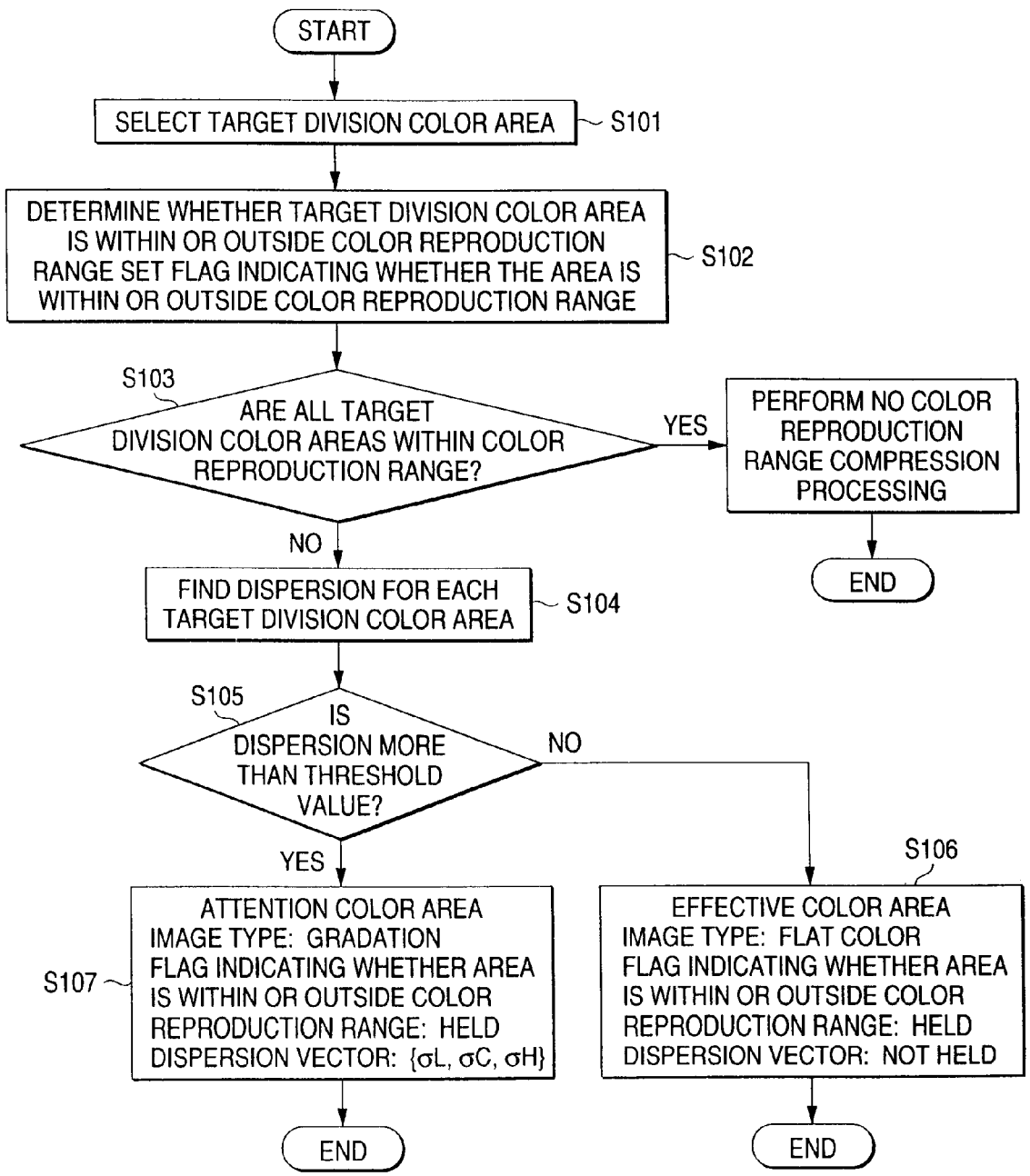
FIG. 4 is a flowchart to show an example of processing of an area determination section in the first embodiment of the image processing system of the invention.

Referring again to FIG. 2, the area determination section 12 performs determination processing of each division color area. FIG. 4 is a flowchart to show an example of processing of the area determination section in the first embodiment of the image processing system of the invention. In the description that follows, when a color space is divided into division color areas and histograms are created, the division color areas each having frequency more than a threshold value are called "target division color areas". Of the target division color areas, division color areas determined to be flat color are called "effective color areas" and those determined to be gradation are called "attention color areas". The frequency and intra-area distribution information for each division color area are passed from the histogram preparation section 11.

At step S101, the histogram frequency for each division color area is checked for selecting a target division color area. Whether or not the division color area is a target division color area can be determined based on whether or not the division color area has the frequency more than one threshold value.

Next, at step S102, whether the division color area determined to be the target division color area at step S101, more particularly, the lattice point of the center point of the division color area is within or outside the color reproduction range, and flag data indicating whether or not the lattice point is within the color reproduction range is given for each division color area. This step is executed for all target division color areas.

At step S103, whether or not all target division color areas are within the color reproduction range is checked based on the determination as to whether or not the lattice point is within the color reproduction range at step S102. If all target division color areas are within the color reproduction range, color reproduction range compression processing need not be performed, thus the preset color reproduction range compression initialization profile is set to an LCH-to-LCH profile. The subsequent steps are skipped according to the determination, enabling high-speed processing.

If there is a target division color area outside the color reproduction range, at step S104, dispersion values in L, C, and H directions for the target division color area are found based on the intra-area distribution information of the target division color area, and are set to σL, σC, and σH.

At step S105, the dispersion values in the axis directions found at step S104 are evaluated. Here, whether or not all three dispersion values are equal to or less than a threshold value is determined. If all three dispersion values are equal to or less than the threshold value, spread in the axis directions is determined to be small and the target division color area is defined as an effective color area. At step S106, the image type is set to flat color. In this case, the flag indicating whether the area is within or outside the color reproduction range is held and the dispersion values are not held. If any of the three dispersion values exceeds the threshold value, the corresponding target division color area is assumed to be an attention color area. At step S107, the image type is set to gradation. The calculated dispersion values are held as a dispersion vector (σL, σC, σH). Further, the flag indicating whether the area is within or outside the color reproduction range is also held intact.

Thus, the target division color areas containing reasonable frequency or more are extracted and the image types of the target division color areas can be determined and classified into effective and attention color areas. The target division color areas are extracted to reduce the subsequent processing for speeding up processing; the classification processing may be performed for all division color areas.

Figure 5:
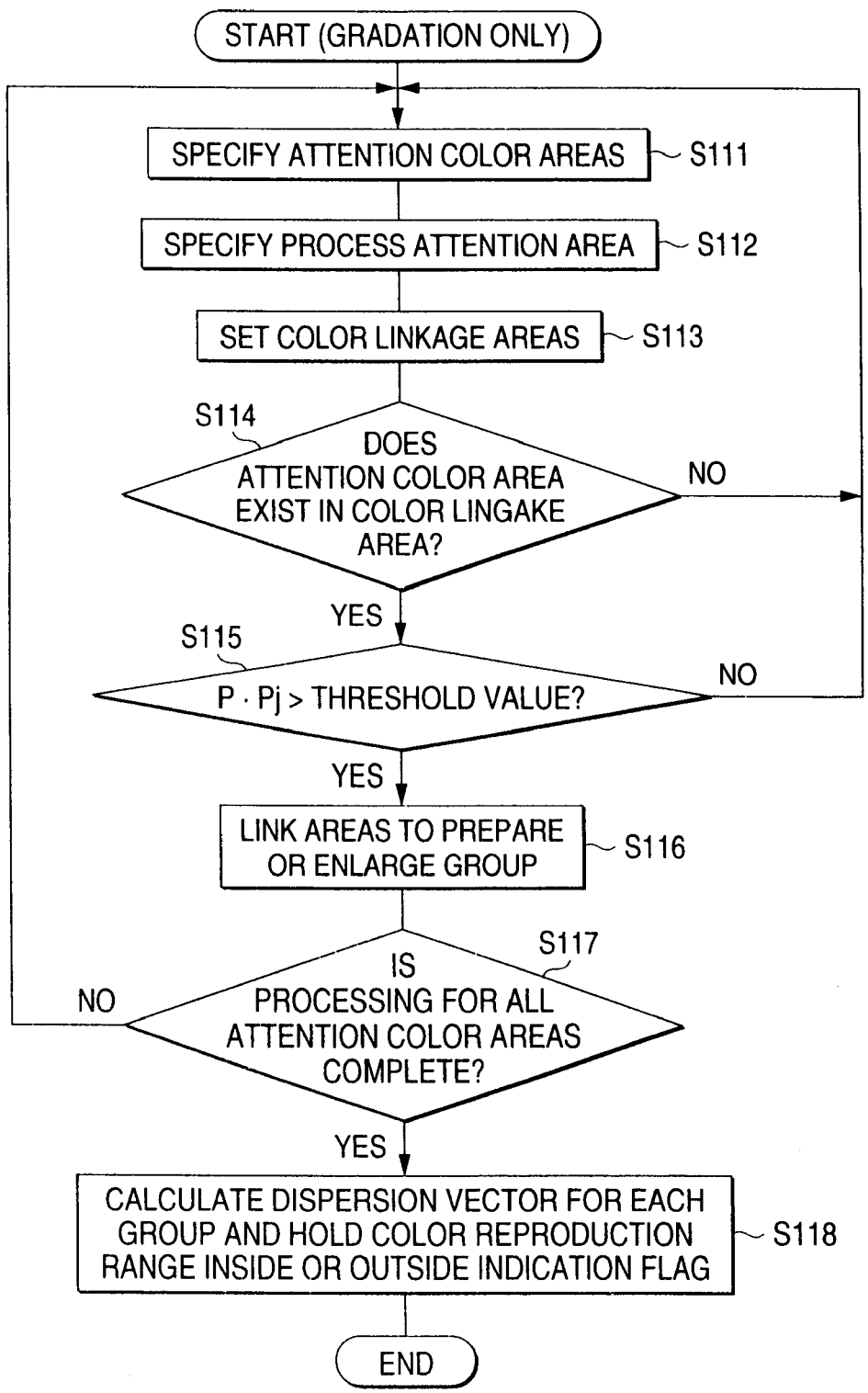
FIG. 5 is a flowchart to show an example of processing of a group preparation section in the first embodiment of the image processing system of the invention.

FIG. 5 is a flowchart to show an example of processing of the group preparation section in the first embodiment of the image processing system of the invention. This processing is performed only for the division color areas determined to be the attention color areas by the area determination section 12 shown in FIG. 4. In the description to follow, a division color area adjacent to the target color area in the dispersion vector direction, namely, an area determined to have a color to which the color in the attention color area is smoothly continuous is called "a linkage area" (an area to be linked). The area to be liked is a division color area having the potential for being combined with an adjacent attention color area.

At step S111, attention color areas are picked up and sorted in the descending order of frequency. At step S112, an unprocessed attention color area is taken out in the descending order of frequency and is defined as a process attention area.

At step S113, the dispersion vector of the process attention area is referenced and the division color areas existing in the dispersion vector (σL, σC, σH) directions (L, C, and H) are selected as linkage areas. For example, if dispersion vector (σL, σC, σH)=(1, 1, 1), there is no feature in inclination, the division color areas adjacent to the process attention area in all directions of L, C, and H are defined as the linkage areas. If dispersion vector (σL, σC, σH)=(2, 0.5, 0.5), dispersion in the L direction is large, the division color area adjacent to the process attention area in the L direction is defined as the linkage area.

At step S114, whether or not the linkage area is an attention color area is checked. If the linkage area is not an attention color area, processing is not performed. If the linkage area is an attention color area, control goes to step S115 at which the inner product of the dispersion vector Pj of the linkage area and the dispersion vector P of the process attention area is found and whether or not the value of the inner product is equal to or greater than a threshold value is checked. If it is smaller than the threshold value, the dispersion features do not match and the process attention area is not linked with the linkage area. If the value of the inner product P·Pj of the dispersion vectors is equal to or greater than the threshold value, it is determined that the dispersion vectors of the two areas indicate a similar trend, namely, colors spread in a similar direction. At step S116, the process attention area is linked with the linkage area to prepare a new group or enlarge the existing group. At step S117, whether or not processing has been performed for all attention color areas is determined. If an unprocessed attention color area remains, control returns to step S112 for processing the attention color area.

Figure 6:
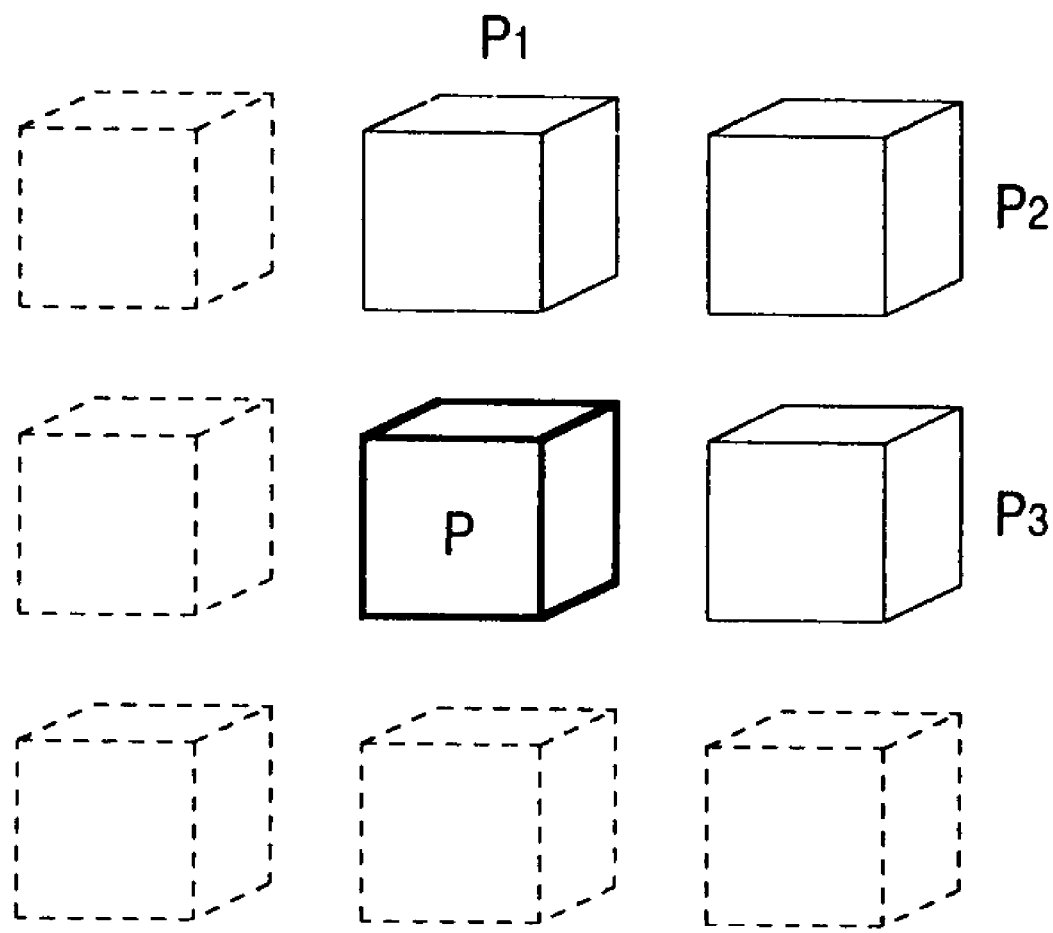
FIG. 6 is an illustration of an example of linking processing of a process attention area and linkage areas in a group preparation section in the first embodiment of the image processing system of the invention.

FIG. 6 is an illustration of an example of linking processing of a process attention area and linkage areas in the group preparation section in the first embodiment of the image processing system of the invention. In the figure, assume that the center division color area is the process attention area and that its dispersion vector is P. Here, assume that the dispersion vector P has large values in two directions and that the division color areas adjacent to the process attention area up and down, left and right, and slantingly are the linkage areas. The division color areas indicated by the solid lines are attention color areas. Assume that the attention color areas have dispersion vectors P1–P3. At S115 in FIG. 5, the inner products of the dispersion vectors of the process attention area and the linkage areas are calculated. That is, the inner products P·P1, P·P2, and P·P3 are calculated. Each of the inner products is compared with a threshold value. Here, assuming that the value of the inner product P·P1 is greater than the threshold value, the process attention area is linked with the linkage area having the dispersion vector P1 upward adjacent to the process attention area. They can be linked by giving the same group number to them. When a process attention area is next specified at step S112, the liked division color area having the dispersion vector P1 is specified as the process attention area and the subsequent steps are executed in sequence.

Returning to FIG. 5, at step S118, a dispersion vector is calculated for the group prepared by the linking processing at steps S111–S117. If at least one of the division color areas in the group is outside the color reproduction range, the color reproduction range inside or outside indication flag of the group is set to the color reproduction range outside. When all the division color areas in the group are within the color reproduction range, the color reproduction range inside or outside indication flag of the group is set to the color reproduction range inside.

Such processing is performed for grouping the attention color areas. At this time, the processing is started at the attention color area having the largest frequency, thus the attention color areas having smaller frequency later processed are integrated into the group containing the attention color areas having larger frequency early processed for gradual grouping.

In the processing example, the dispersion vector of the group is calculated, etc., after grouping. However, when the areas are linked, the group dispersion vector, etc., is calculated and processing can also be performed with the group as the process attention area. If the center value of dispersion as well as the dispersion vector is provided for the attention color area in FIG. 4, the determination of setting the linkage area at step S113 can be made more accurately.

The profile preparation section 14 performs Sat compression processing if the image type is flat color, or either Per or Sat compression processing if the image type is gradation. The operation for flat color and that for gradation will be discussed separately.

Figure 7:
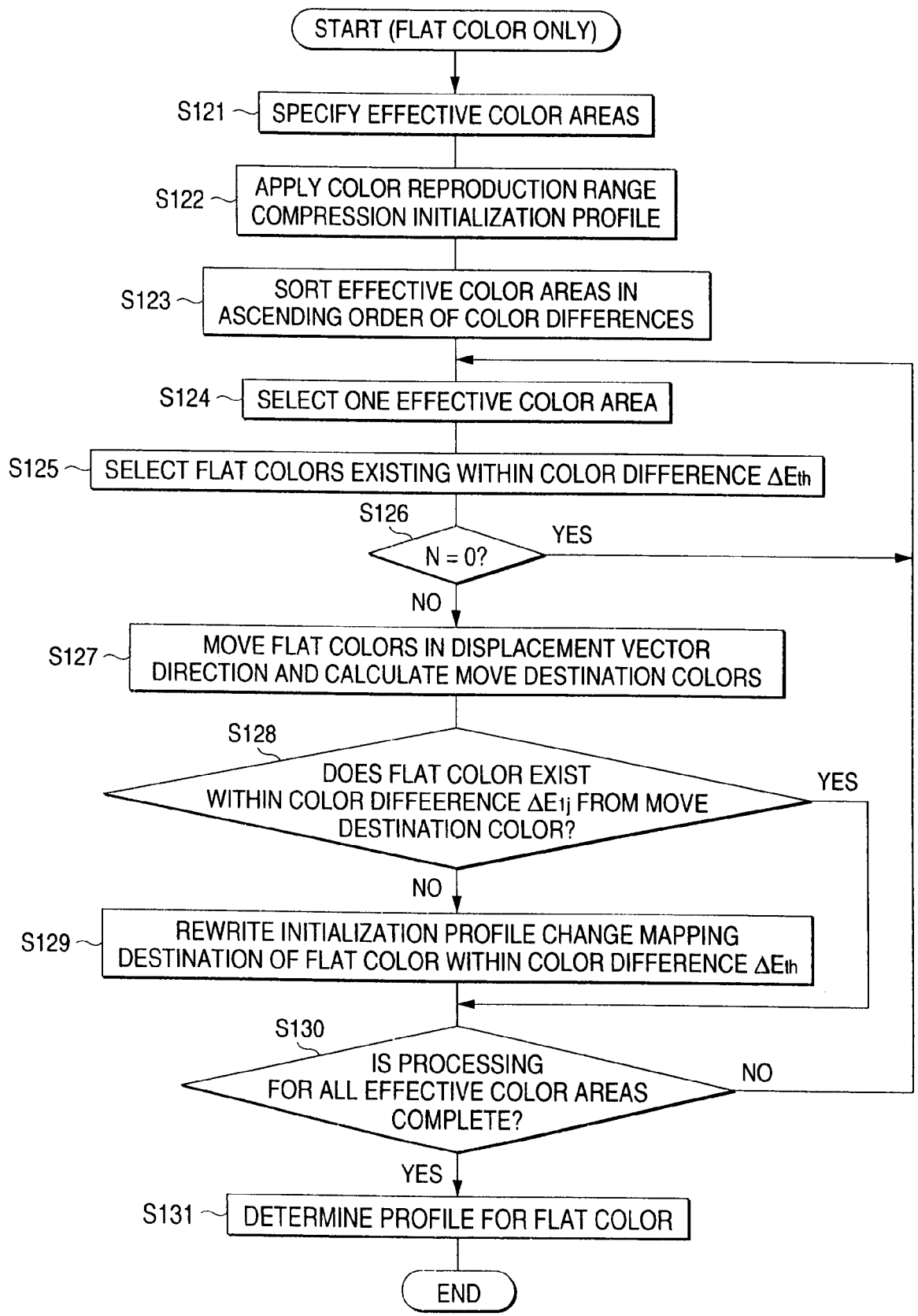
FIG. 7 is a flowchart to show an example of processing for flat color in a profile preparation section in the first embodiment of the image processing system of the invention.

First, compression processing for flat color will be discussed. FIG. 7 is a flowchart to show an example of processing for flat color in the profile preparation section in the first embodiment of the image processing system of the invention. This processing is performed for the division color areas determined to be effective color areas by the area determination section 12.

First, at step S121, all effective color areas are picked up. At step S122, the L, C, and H values when each effective color area outside the color reproduction range is put on the contour of the color reproduction range are found and the color difference is calculated. Specifically, the color reproduction range compression initialization profile is used to convert the effective color area outside the color reproduction range and the difference between the address value before the conversion and the data value after the conversion is found as the color difference. Of course, any other method may be used; the L, C, and H values when the area is put on the contour of the color reproduction range are previously determined as map data to the color reproduction range contour for lattice point outside the color reproduction range, and the color difference may be found.

Let L, C, and H before conversion be L*, C*, and H° and those after conversion be L*′, C*′, and H°′. The color difference ΔE can be calculated as $$\Delta E = \{(\Delta L^*)^2 + (\Delta C^*)^2 + (\Delta H^*)^2\}^{1/2} \quad (1)$$

where $$\Delta L^* = L^* - L^{*\prime}$$

$$\Delta C^* = C^* - C^{*\prime}$$

$$\Delta H^* = (\pi/180)(C^* \cdot C^{*\prime})^{1/2}(H^\circ - H^{\circ\prime})$$

At step S123, the effective color areas are sorted in the ascending order of the color differences found at step S122. At step S124, one unprocessed effective color area is selected in the ascending order of the color differences.

At step S125, division color areas of flat colors existing within color difference $\Delta E_{th}$ from the color after conversion of the selected effective color area, namely, the contour color of the color reproduction range are selected. The number of the selected flat color division color areas is N and the color difference between the color after conversion of the selected effective color area and the color of the flat color division color area j is $\Delta E_{1j}$ ($1 \leq j \leq N$).

At step S126, whether or not N equals 0 is determined. If N=0, the color after conversion of the selected effective color area does not degrade discrimination from other flat colors and therefore if conversion is executed as it is, it does not affect others. Thus, the following color discrimination improvement processing is skipped:

When N does not equal 0, discrimination improvement processing is performed for the flat color division color areas within color difference $\Delta E_{th}$. At step S127, considering that the N flat color division color areas within color difference $\Delta E_{th}$ are moved so that the color difference becomes $\Delta E_{th}$ in the "displacement vector" direction, move destination colors are calculated. The displacement vector is a vector from the source color to the color after conversion when the effective color area selected at step S124 is mapped to the contour of the color reproduction range. Here, the flat color is changed in the same direction as color conversion of the effective color area.

At step S128, whether or not a flat color division color area exists within color difference $\Delta E_{1j}$ from the move destination color is checked. If at least one division color area of a different flat color exists within color difference $\Delta E_{1j}$ from the move destination color, the move degrades color discrimination from the different color as compared with color discrimination before the move and therefore is not made. That is, conversion as in the color reproduction range compression initialization profile is executed only for the effective color areas outside the color reproduction range. If no division color area of a different flat color exists within color difference $E_{1j}$ from the move destination color, the move can improve color discrimination. Thus, conversion as in the color reproduction range compression initialization profile is executed for the effective color areas outside the color reproduction range and the flat color within color difference $\Delta E_{th}$ from the color after conversion is converted into the color of the move destination. Thus, at step S129, the color reproduction range compression initialization profile contents are rewritten for the flat color to be changed.

At step S130, whether or not processing has been performed for all effective color areas outside the color reproduction range is determined. If an unprocessed effective color area remains, control returns to step S124 at which the process is continued. At the termination of processing for all effective color areas outside the color reproduction range, the profile for the flat color is determined at step S131.

Figure 8:
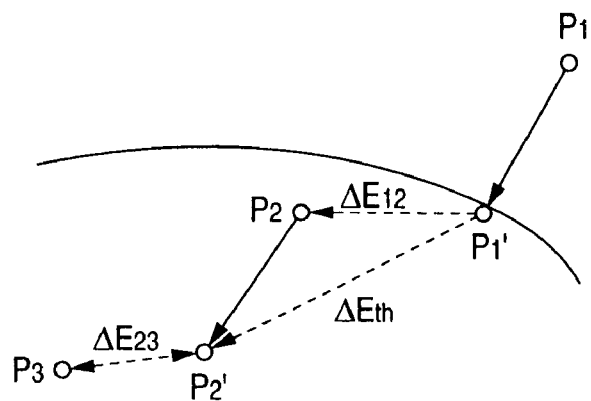
FIG. 8 is an illustration of an example of flat color processing in the profile preparation section in the first embodiment of the image processing system of the invention.

FIG. 8 is an illustration of an example of flat color processing in the profile preparation section in the first embodiment of the image processing system of the invention. The process shown in FIG. 7 will be discussed with an example. In FIG. 8, the curve denotes the contour of the color reproduction range; the color reproduction range inside is below the curve and the color reproduction range outside is above the curve. Effective color area P1 is a flat color outside the color reproduction range. Assume that the effective color area P1 is selected at step S124. When the effective color area P1 is converted into the contour color of the color reproduction range according to the color reproduction range compression initialization profile, the conversion destination is P1'.

At step S125, a flat color existing within color difference $\Delta E_{th}$ from the conversion destination P1' is found. Then, flat color P2 having color difference $\Delta E_{12}$ exists within color difference $\Delta E_{th}$. At step S127, the flat color P2 is moved so that the color difference from P1' becomes $\Delta E_{th}$ in the same direction as the vector when the effective color area P1 is converted into P1'. This move destination is P2'. Since there is one flat color within $\Delta E_{th}$, the example shown in FIG. 8 corresponds to N=1 at step S126 in FIG. 7; similarity is also applied when N≧2.

At step S128, whether or not a different flat color exists within color difference $\Delta E_{12}$ from P2' is determined. To do this, the color difference from the flat color which is the nearest from P2' may be determined. Assuming that the flat color which is the nearest from P2' is P3, the color difference between P2' and P3 is $\Delta E_{23}$. When color difference $\Delta E_{23}$ is smaller than color difference $\Delta E_{12}$ between P1' and P2, if P2 is moved to P2', the color discrimination between P2' and P3 is degraded more than that between P1' and P2 is degraded. Thus, P2 is not moved to P2' and P1 is only converted into P1'. When color difference $\Delta E_{23}$ is larger than color difference $\Delta E_{12}$ between P1' and P2, if P2 is moved to P2', the color discrimination can be recovered from degradation caused by P1 conversion. Thus, P1 is converted into P1' and P2 is converted into P2'.

Here, a move of P3 is not considered, but a move of P2 to P2' may be allowed for considering a move of P3.

Figure 9:
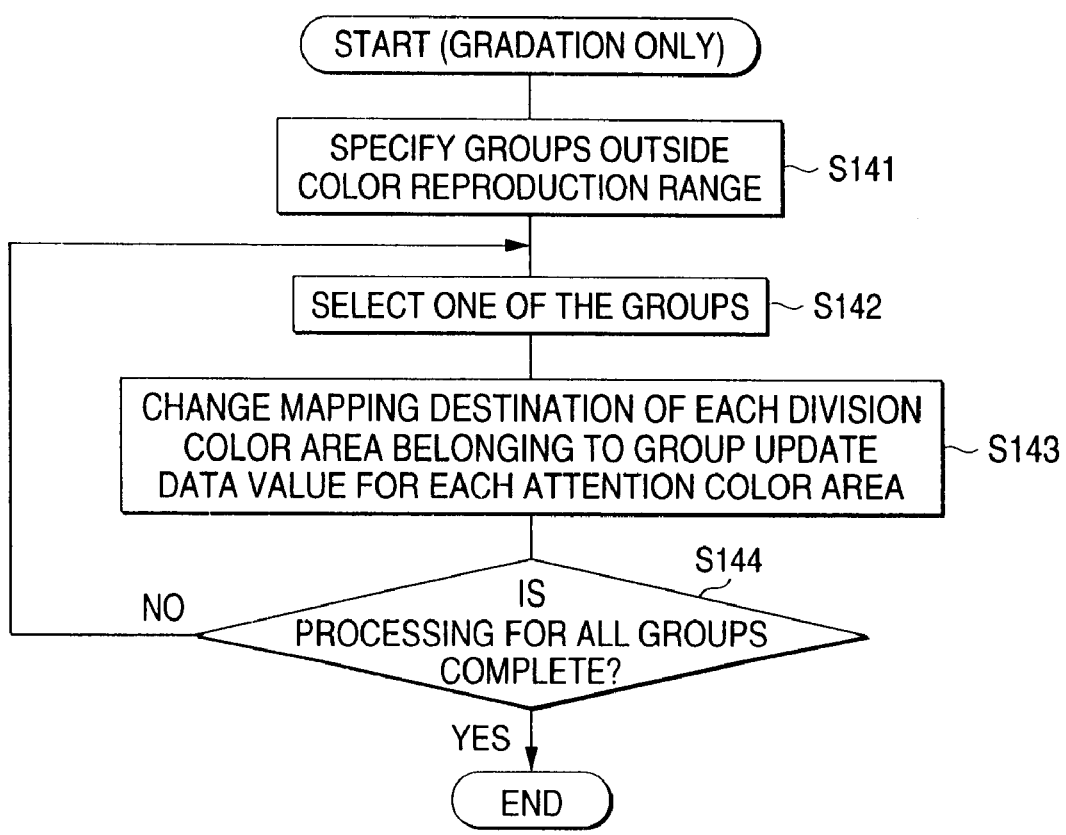
FIG. 9 is a flowchart to show an example of processing for gradation in the profile preparation section in the first embodiment of the image processing system of the invention.

Next, compression processing for gradation will be discussed. FIG. 9 is a flowchart to show an example of processing for gradation in the profile preparation section in the first embodiment of the image processing system of the invention. This processing is performed for the division color areas determined to be attention color areas by the area determination section 12.

First, at step S141, all groups having the color reproduction range inside or outside indication flag set to color reproduction range outside are picked up. At step S142, one of the unprocessed group outside the color reproduction range is selected. At step S143, compression processing is performed so as to place the selected group in the color reproduction range. First, the division color areas contained in the group are put on the contour of the color reproduction range. Specifically, the color reproduction range compression initialization profile is used to convert each division color area in the group and difference vector $\Delta E_{INT}$ of the color difference before the conversion and after the conversion is found by finding a difference of each axis component from the address value given to the color reproduction range compression initialization profile and the provided data value. Assume that the difference vector of the color difference of division color area i is $\Delta E_{iINT}$ and that the maximum one of difference vector sizes $|\Delta E_{iINT}|$ of the division color areas in the group is $\Delta E_{maxINT}$. Assume that the length of the difference vector $\Delta E_{maxINT}$ direction component of dispersion vector D of the group is N and that the distance in the direction of the dispersion vector D from the end point with smaller chroma of the group to the contour of the color reproduction range is M. Further, assume that the distance in the group viewed from the point at which the difference vector becomes $\Delta E_{maxINT}$ is i. In the division color area with difference vector $\Delta E_{maxINT}$, i=0, and at the other end, i=N. The length N and the distances M and i are indicated each by the number of division color areas.

At this time, correction change amount $\Delta E_i$ in division color area i in the group (namely, division color area at the distance i from the division color area with the maximum difference vector) is found as when M is smaller than threshold value, $$\Delta E_i = \Delta E_{iINT} + \alpha \times \{i/(N+M)\} \times \Delta E_{maxINT}$$

when M is equal to or greater than threshold value, $$\Delta E_i = \Delta E_{iINT}$$

The threshold value can be set to about 10, for example. $\alpha$ is found from the following inner product:

$$\alpha = D \cdot \Delta E_{maxINT} / |\Delta E_{maxINT}|^2$$

When $\alpha > 1$ $\alpha = 1$, namely, $0 \leq \alpha \leq 1$.

The correction change amount $\Delta E_i$ thus found is used to rewrite the contents of the color reproduction range compression initialization profile. That is, when the division color area value is (L, C, H), (L+$\Delta E_i$ (L), C+$\Delta E_i$ (C), H+$\Delta E_i$ (H)) is written as the value after mapping corresponding thereto, where $\Delta E_i$ (L), $\Delta E_i$ (C), and $\Delta E_i$ (H) are L, C, and H components of $\Delta E_i$ respectively.

At step S144, whether or not processing has been performed for all groups outside the color reproduction range is determined. If an unprocessed group remains, control returns to step S142 at which processing for the group is performed. At the termination of processing for all groups outside the color reproduction range, a corrected gradation profile is provided.

FIG. 10 is an illustration to show how division color areas in a group are compressed to the color reproduction range inside in the gradation processing example in the profile preparation section in the first embodiment of the image processing system of the invention. In the figure, the broken line arrows denote dispersion vectors. The black dots are lattice points in each division color area. Further, the white dots denote lattice points arranged in the direction of the dispersion vector D from the end point with smaller chroma of the group to the contour of the color reproduction range; the number of white dots is M.

How division color areas in the group are compressed to the color reproduction range inside will be discussed with several specific examples. First, in the example shown in FIG. 10A, two division color areas exist in the group and are outside the color reproduction range. The dispersion vector of the group is almost parallel with difference vector $\Delta E_{iINT}$ of the color difference. Since the group preparation section 13 groups the division color areas in the dispersion vector direction as described above, the arrangement direction of the division color areas in the group is almost identical with the dispersion vector direction. In this case, the difference vector at the outer lattice point is $\Delta E_{maxINT}$ (M=2, N=1, and $\alpha \approx 0.6$). Since the lattice point distant from the color reproduction range has i=0, it is moved by $\Delta E_{0INT} = \Delta E_{maxINT}$. For the lattice point near the color reproduction range (i=1), $\Delta E_i = \Delta E_{iINT} + \Delta E_{maxINT}/3$ from the expression of correction change amount $\Delta E_i$ described above. The lattice point is mapped by $\Delta E_{maxINT}/3$ to the inside from the contour of the color reproduction range.

Figure 10A:
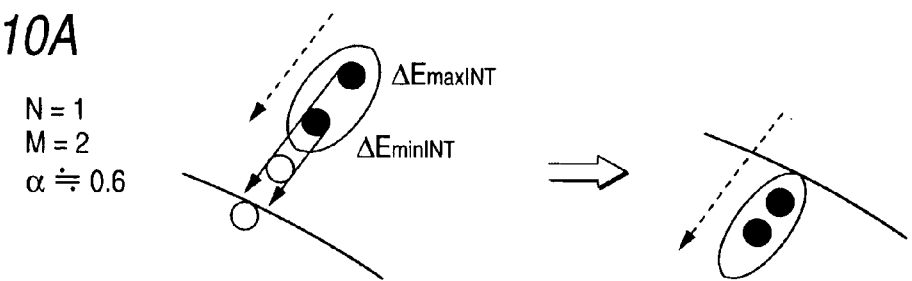
FIGS. 10a–d is an illustration to show how division color areas in a group are compressed to the color reproduction range inside in the gradation processing example in the profile preparation section in the first embodiment of the image processing system of the invention.
Figure 10B:
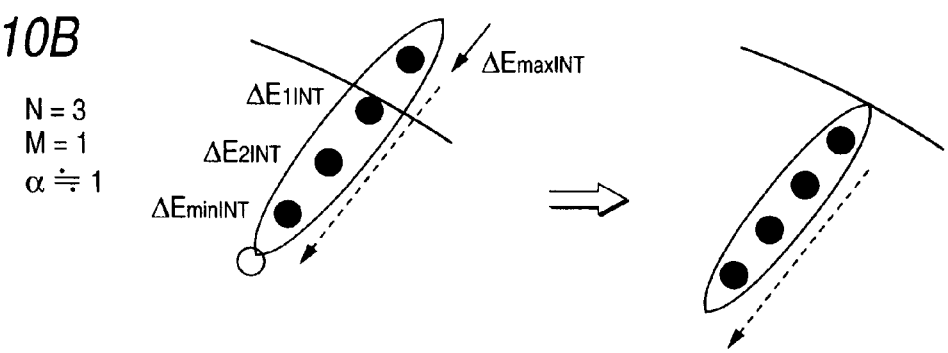

In the example shown in FIG. 10B, only one of the four division color areas in the group is outside the color reproduction range. The dispersion vector direction is almost parallel with the $\Delta E_{maxINT}$ direction ($\alpha \approx 1$, M=1, and N=3). For the lattice point outside the color reproduction range, correction change amount $\Delta E_0 = \Delta E_{0INT} = \Delta E_{maxINT}$. The lattice points within the color reproduction range are pushed into the color reproduction range by correction change amount $\Delta E_i = i \cdot \Delta E_{maxINT}/4$ because $\Delta E_{iINT} = 0$.

Figure 10C:
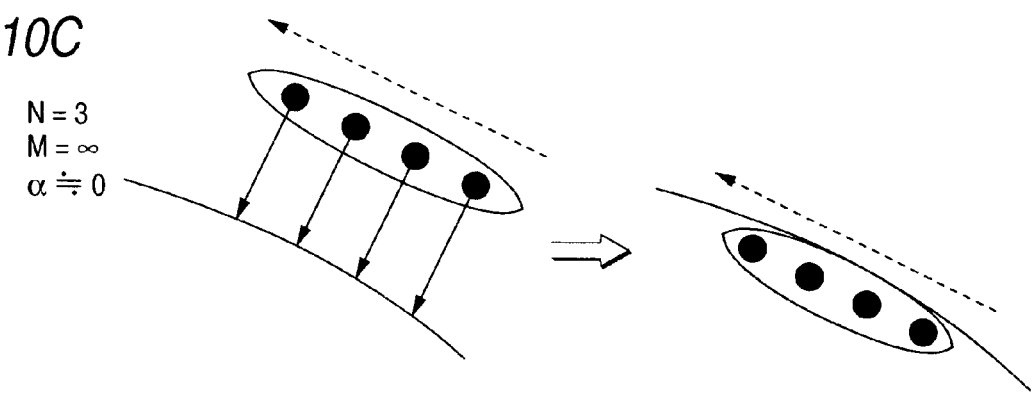

In the example shown in FIG. 10C, difference vector $\Delta E_{maxINT}$ of the color difference is almost orthogonal to the dispersion vector D. In this case, the inner product of the two vectors becomes almost 0 and M becomes infinity. $\alpha=0$. In this case, the second expression of correction change amount $\Delta E_i$ described above is adopted as $\Delta E_i = \Delta E_{iINT}$. That is, the difference vector $\Delta E_{iINT}$ at each lattice point becomes the correction change amount $\Delta E_i$. Thus, the division color areas are mapped to the contour of the color reproduction range.

Figure 10D:
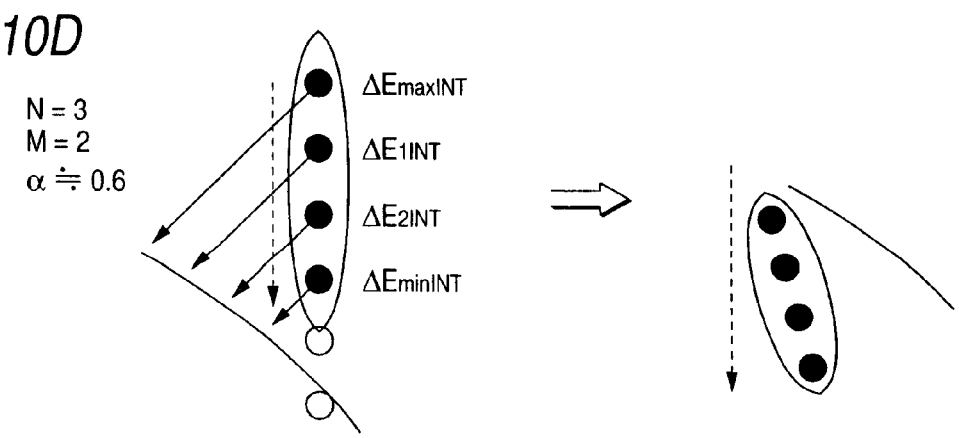

The example shown in FIG. 10D is an example of a combination of the examples in FIGS. 10A and 10C, wherein N=3, M=2, and $\alpha \approx 0.6$. At this time, correction change amount $\Delta E_i = \Delta E_{iINT} + 0.6i \cdot \Delta E_{maxINT}/5$. The division color area having the maximum difference vector $\Delta E_{maxINT}$ is mapped to the contour of the color reproduction range and other division color areas are pushed into the color reproduction range by the second term of the correction change amount $\Delta E_i$ expression.

The correction change amount $\Delta E_i$ is thus provided such that the division color areas in each group can be converted into colors within the color reproduction range with color change held. The amount in which each division color area is pushed into the color reproduction range varies by $\alpha \cdot \Delta E_{maxINT}/(N+M)$ depending on the position of the division color area; the change amount decreases as the division color area goes into the inside of the color reproduction range.

The calculation expression of the correction change amount $\Delta E_i$ is not limited to that described above. For example, assume that an average vector of the difference vector $\Delta E_{iINT}$ of the color difference in each division color area in a group is $\Delta Q$. The correction change amount $\Delta E_i$ can be calculated by the following expression:

$$\Delta E_i = \Delta E_{iINT} + (1-EXP(-ri)) \times (\Delta E_{maxINT} - \Delta E_{iINT})$$

$$r_i = |P_i \cdot \Delta Q| / |Pi|^2$$

where $r_i$ is a weighted parameter for division color area i.

Figure 11A:
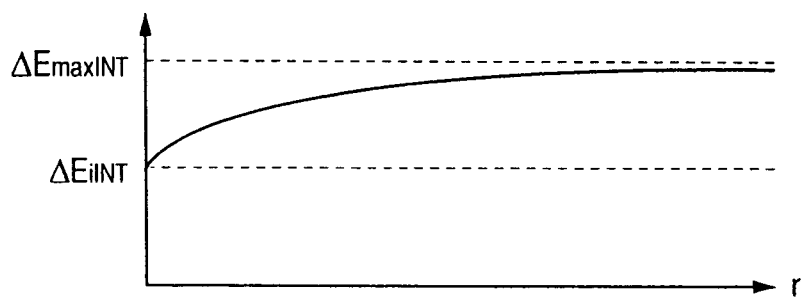
FIGS. 11a–b is an illustration of different correction change amount Ei calculation executed in the profile preparation section in the first embodiment of the image processing system of the invention.
Figure 11B:
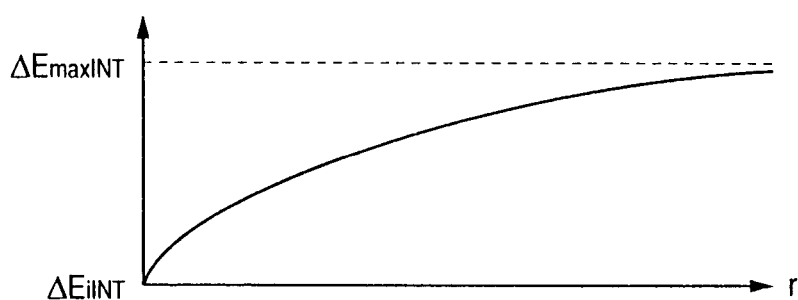

FIG. 11 is an illustration of different correction change amount $\Delta E_i$ calculation executed in the profile preparation section in the first embodiment of the image processing system of the invention. Since the weighted parameter $r_i$ is a non-negative value, the above-described correction change amount $\Delta E_i$ expression is a function taking a value in the range of $\Delta E_{iINT}$ to $\Delta E_{maxINT}$. The correction change amount $\Delta E_i$ becomes the value as shown in FIG. 11A according to the value of the weighted parameter $r_i$. The group contains the division color areas within and outside the color reproduction range; the difference vector $\Delta E_{iINT}$ of the color difference is 0 for each division color area within the color reproduction range. Thus, when the group contains any division color area within the color reproduction range, the minimum value of the correction change amount $\Delta E_i$ becomes 0 and the correction change amount $\Delta E_i$ has a graph as shown in FIG. 11B in response to the weighted parameter $r_i$.

In the above-described correction change amount $\Delta E_i$ calculation expression, $\Delta E_{iINT}$ in the first term is the difference vector of the color difference for the division color area i, as described above. $(1-EXP(-r_i)) \times (\Delta E_{maxINT} - \Delta E_{iINT})$ in the second term represents how much the division color area outside the color reproduction range is pushed into the inside from the contour of the color reproduction range or how much the division color area within the color reproduction range is pushed into the inside from the color. The degree of pushing the division color area into the inside depends on the weighted parameter ri, as shown in FIG. 11.

The weighted parameter $r_i$ is a function of the inner product of the dispersion vector Pi for the division color area i and the average vector $\Delta Q$ of the difference vector $\Delta E_{iINT}$ of the color difference. That is, the weighted parameter $r_i$ is determined by the magnitude of the average vector $\Delta Q$ of the difference vector and the magnitude of the dispersion vector Pi in the $\Delta Q$ direction. Thus, the more equal the directions of the average vector $\Delta Q$ of the difference vector of the color difference and the dispersion vector Pi, the greater the value of the weighted parameter $r_i$. The greater the number of division color areas existing within the color reproduction range, the smaller $\Delta Q$ and the smaller the value of the weighted parameter $r_i$.

The correction change amount $\Delta E_i$ is thus provided such that the division color areas can be converted into colors within the color reproduction range with color change held. In addition, various correction change amount $\Delta E_i$ calculation expression are possible and the invention is not limited to the above-described calculation expressions.

In the above-described processing, processing between groups or processing for flat color is not described. However, if compression processing as described above results in degradation of color discrimination from another group or flat color, conversion processing of the neighboring group or flat color into the inside of the color reproduction range may be added.

Figure 12:
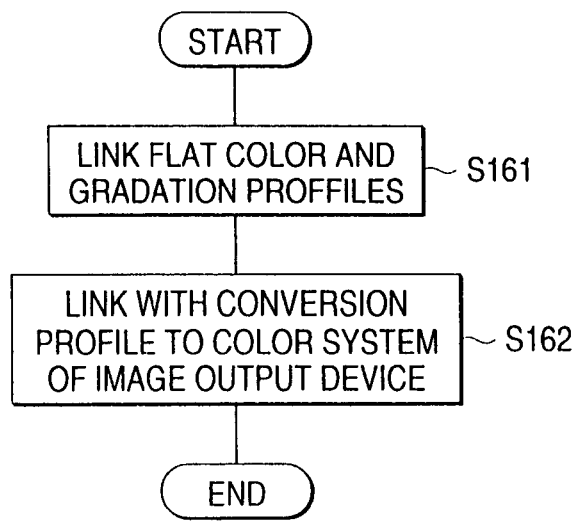
FIG. 12 is a flowchart to show a processing example of a profile link section in the first embodiment of the image processing system of the invention.

Referring again to FIG. 2, when a profile is prepared in the profile preparation section 14, the profile link section 15 links the profile with a profile for executing conversion to a color coordinate system for the image output device 7. FIG. 12 is a flowchart to show a processing example of the profile link section in the first embodiment of the image processing system of the invention. In the processing to the profile preparation section 14, profiles for flat color and gradation are prepared separately. At step 161, the profiles are linked to prepare a color reproduction range compression profile (LCH-to-LCH direct look-up table profile). Further, at step S162, the profile is linked with a profile for executing color space conversion fitted to the color system of the image output device 7 to form a final profile (LCH-to-YMCK direct look-up table profile). This profile is a profile considering compression processing to the color reproduction range.

In the embodiment, the conversion parameters are prepared automatically. However, for example, the system may be configured to allow the user to enter commands so as to prepare a profile considering compression to the color reproduction range in accordance with the user commands.

In the embodiment, the color reproduction range compression LCH-to-LCH direct look-up table profile is prepared, then linked with the LCH-to-CMYK direct look-up table profile is prepared. However, the color reproduction range compression LCH-to-LCH direct look-up table profile itself may be held to deal with the case where several types of image output device 7 exist.

Figure 13:
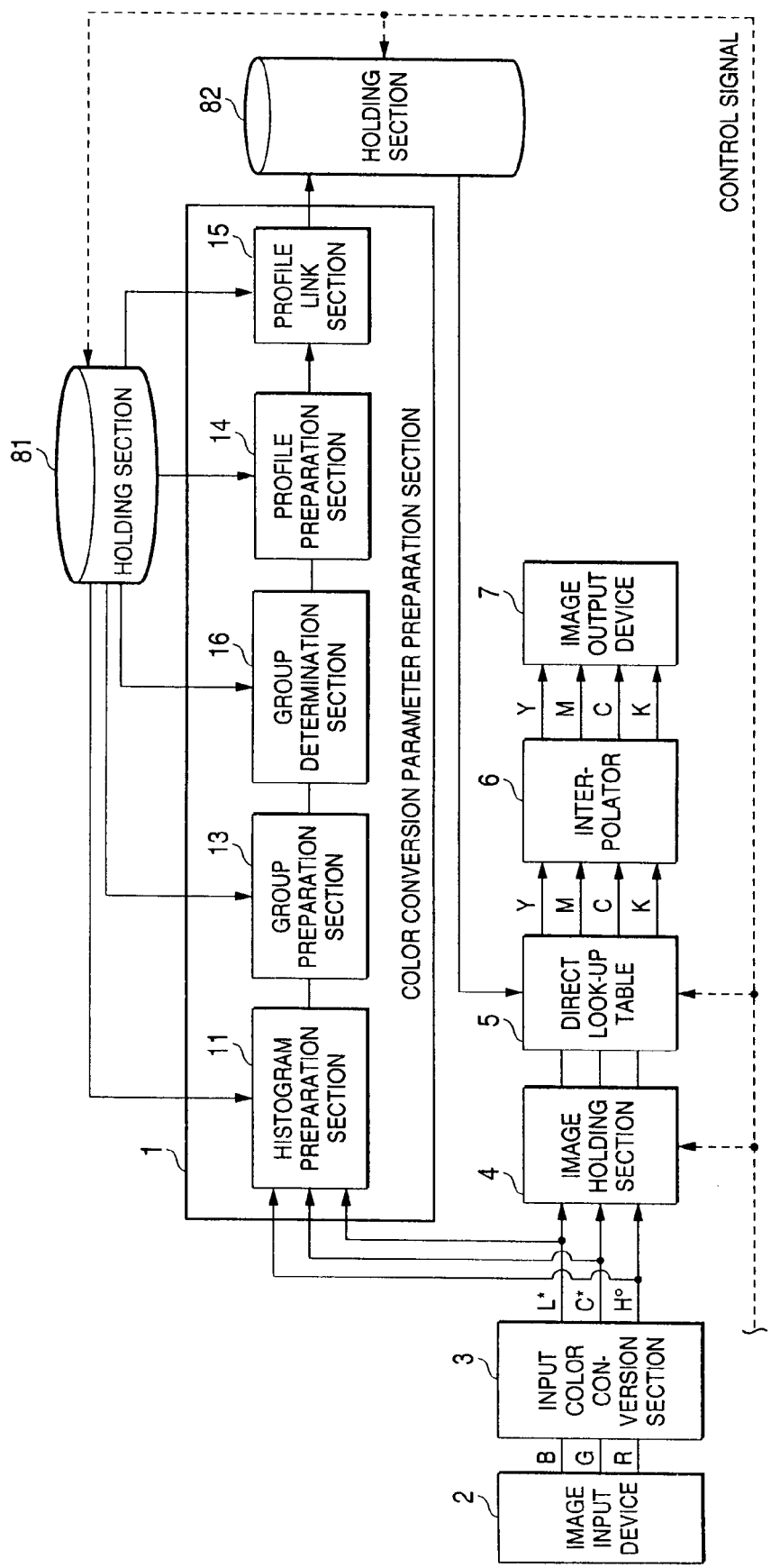
FIG. 13 is a block diagram to show a second embodiment of the image processing system of the invention.

FIG. 13 is a block diagram to show a second embodiment of the image processing system of the invention. Parts identical with or similar to those previously described with reference to FIG. 1 are denoted by the same reference numerals in FIG. 13 and will not be discussed again. Numeral 16 is a group determination section. In the second embodiment, whether each area is flat color or gradation is determined after a group is prepared. A method with no dispersion vectors is also shown. Other points are the same as the first embodiment.

A color conversion parameter preparation section 1 in the second embodiment has a histogram preparation section 11, a group preparation section 13, a group determination section 16, a profile preparation section 14, and a profile link section 15.

The histogram preparation section 11 prepares a histogram on an LCH space. How to divide the LCH space for preparing a histogram is read from a holding section 81 as division information. In the second embodiment, the histogram preparation section 11 only counts the number of pixels for each division color area of a color space.

The group preparation section 13 combines adjacent division color areas into a group based on a histogram prepared by the histogram preparation section 11 for each division color area. First, the group preparation section 13 determines whether or not a frequency value exists in each division color area outside the color reproduction range based on the histogram prepared by the histogram preparation section 11. If color value of all pixels is within the color reproduction range, the subsequent processing may be skipped. At this time, if the number of pixels having color value outside the color reproduction range is equal to or less than a predetermined value, for example, conventional standard color conversion parameters (color reproduction range compression initialization profile) are used and the subsequent processing may be skipped.

To determine whether or not adjacent division color areas are grouped, the frequency in one division color area is compared with that in another division color area. If the frequencies satisfy one condition, the division color areas are grouped. For example, assuming that the frequencies in division color areas 1 and 2 are A and B respectively, the value of A/B or B/A can be compared with a threshold value for determining whether or not the adjacent division color areas are grouped. If the value is close to 1, the frequencies can be determined to be almost equal. Thus, the adjacent division color areas are combined. If the value is extremely large or small, the frequencies are determined to be greatly different, and combining the adjacent division color areas can be suppressed. Alternatively, a method using the difference is also available.

As another method, if either of the following two expressions is satisfied, the combination degree is determined to be strong and the division color areas are grouped:

$$\max (A, B) > th1 \text{ and } \min (A, B) > th3$$

$$A > th2 \text{ and } B > th2$$

where th1 to th3 are threshold values satisfying the relation th1>th2>th3, max (A, B) denotes A or B, whichever is the greater, and min (A, B) denotes A or B, whichever is the smaller. The threshold values th1–th3 may be preset or may be calculated by seeing how other adjacent division color areas or peripheral division color areas are combined. To calculate the threshold values, division color areas are combined from the division color area having a large frequency to the peripheries and the threshold magnitude can also be controlled in response to the number of division color areas making up the group, the area combining direction, etc. Since it is considered that the determination value also varies depending on the color, a method for providing determination criterion values for colors is also possible.

In addition, various techniques can be used to determine the division color area combining degree and the division color areas strongly combined can be combined. The division color areas thus combined are grouped, and even if uncombined division color areas are considered to be grouped.

The group determination section 16 determines whether each group is flat color or gradation by the group size (spread in LCH color space). For example, if spread of one group in color space is small, similar colors may concentrate locally or may be scattered here and there. Such a group called "flat color for convenience". If spread of a group in color space is large, it means that the color in the group gradually changes. Such a group is called "gradation". Whether each group is flat color or gradation is thus determined.

When the group is gradation, it essentially is a portion where adjacent colors are similar colors and gradual color change exists. Thus, it is not known unless position information is used. However, for convenience in the embodiment, when spread of a group in color space is small, it is determined to be flat color; when spread of a group in color space is large, it is determined to be gradation. Of course, any other determination method may be used.

In the embodiment, a histogram is prepared for each lattice point. Thus, the number of lattice points belonging to a group, N, is counted and when N=1, the group can be determined to be flat color; when N≧2, the group can be determined to be gradation. However, this sorting method is affected by how finely the color space is divided. If the color space is divided finely, flat color or gradation can belong to two or more division color areas in the color space. For appropriate sorting, a threshold value for sorting may be set up properly.

The profile preparation section 14 first selects a group containing as many pixels having color value outside the color reproduction range as or greater than the threshold value (or the threshold value calculated from the group size, etc.,), and performs Sat compression processing for each selected group. If the group is gradation, the distribution of the portion outside the color reproduction range in the group is seen for determining the compression method to the color reproduction range. For example, if spread in a chroma direction is large, Per compression processing is used; if spread in a hue direction is large, Sat compression processing is executed. Since it is considered that the spread determination criterion also varies depending fairly on the color, a determination threshold value for each color area may be provided in the form of a database, for example.

In the embodiment, a histogram is prepared for each lattice point. Thus, the center of gravity of lattice point in the group, lightness, chroma, spread degree in the hue direction (spread as large as how many lattice points are, etc.,) when a center of group is considered to be the center in view of spread, and the like are found and the distribution may be determined by the values for selecting a compression technique to the color reproduction range.

According such determination, in the flat color portion, Sat compression processing is executed for compressing colors to the color reproduction range and in the gradation portion, either Sat or Per compression processing is executed. Sat compression processing and Per compression processing are performed separately. Color conversion parameters are found by Sat compression processing and Per compression processing. Specifically, a color reproduction range compression initialization profile in which initial values that can be stored in a direct look-up table 5 are set is provided and is rewritten, thereby providing an optimum color reproduction range compression profile.

Processing in the profile link section 15 is similar to that in the first embodiment of the invention and therefore will not be discussed again.

Figure 14:
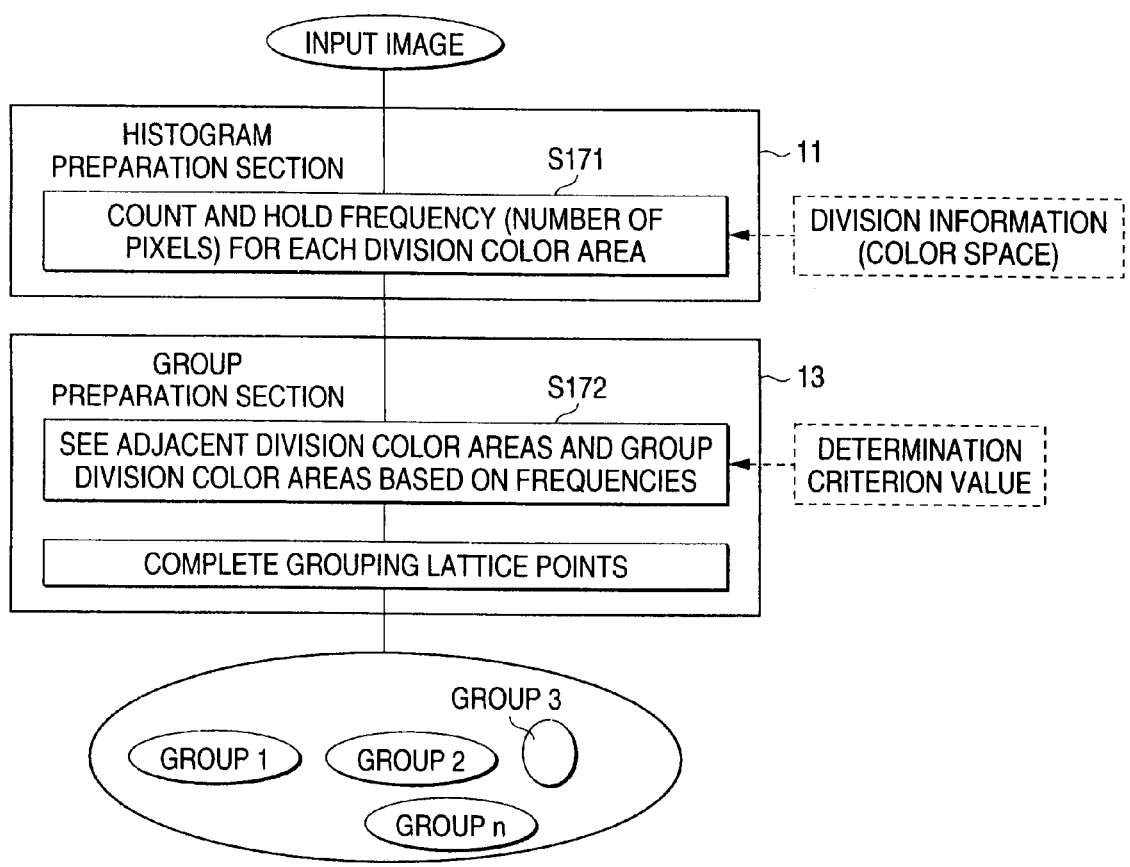
FIG. 14 is a flowchart to show an operation example to a group preparation section in the second embodiment of the image processing system of the invention.

Next, an example of the operation in the second embodiment of the image processing system of the invention will be discussed. The general operation is similar to the operation in the first embodiment of the invention described above. Only the operation in the color conversion parameter preparation section 1 differs. FIG. 14 is a flowchart to show an operation example to the group preparation section in the second embodiment of the image processing system of the invention. It also shows data in a holding section 81 used together with the processing sections of the color conversion parameter preparation section 1. Image data input through an image input device 2 undergoes color space conversion processing of RGB to LCH in an input color conversion section 3 and is input to the color conversion parameter preparation section 1. First, at step S171, the histogram preparation section 11 counts the number of pixels having color value contained in each division color area on the color space.

Next, at step S172, the group preparation section 13 sees adjacent division color areas and group division color areas based on the frequencies. FIG. 15 is an illustration of a processing example of the group preparation section in the second embodiment of the image processing system of the invention. Here, the above-described condition $$\max (A, B) > th1 \text{ and } \min (A, B) > th3$$

or $$A > th2 \text{ and } B > th2$$

is used to prepare a group. Under the condition, if the adjacent division color areas have a reasonable frequency, they are grouped and a division color area having a small frequency adjacent to a division color area having a large frequency is also contained in the group.

Figure 15A:
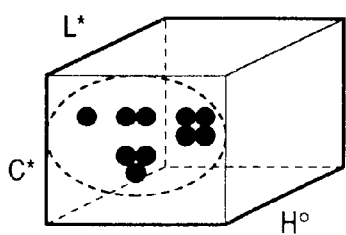
FIGS. 15a–c is an illustration of a processing example of the group preparation section in the second embodiment of the image processing system of the invention.
Figure 15B:
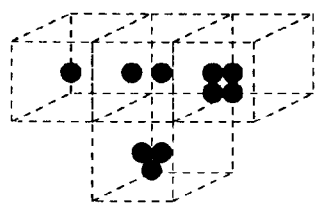
Figure 15C:
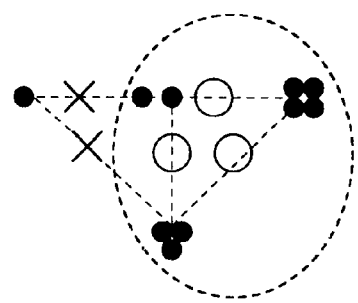

FIG. 15B shows division color areas by broken lines for a part of LCH space in FIG. 15A. In the example shown in FIG. 15B, one black dot corresponds to 10 pixels and division color areas having counts of 40, 30, 20, and 10 pixels are shown. Here, assuming that th1=35, that th2=20, and that th3=12, the division color areas having 30 and 20 pixels adjacent the division color area having 40 pixels satisfy the condition and are determined to have a strong combining degree with the division color area having 40 pixels. The division color areas having 30 and 20 pixels are also determined to have a strong combining degree with each other. However, the division color areas having 20 and 10 pixels do not satisfy the condition and are determined to have a weak combining degree with each other. The division color areas having 30 and 10 pixels are also determined to have a weak combining degree with each other. In FIG. 15C, the portion determined to have a strong combining degree is marked with 0 and the portion determined to have a weak combining degree is marked with X. According such determination, the division color areas surrounded by the dotted line in FIG. 15C make up one group. The threshold values are given as determination criterion values from the holding section 81, for example.

If such determination is made for each lattice point, the lattice points having a strong combining degree are collected into several groups. A lattice point having a weak combining degree with any other lattice point may be grouped alone.

Various combining techniques are available in addition to the above-described technique. Although only adjacent lattice points are seen for determination in the example, a technique of seeing frequencies of lattice points and determination is made from a distribution of the frequencies can also be applied.

Figure 17:
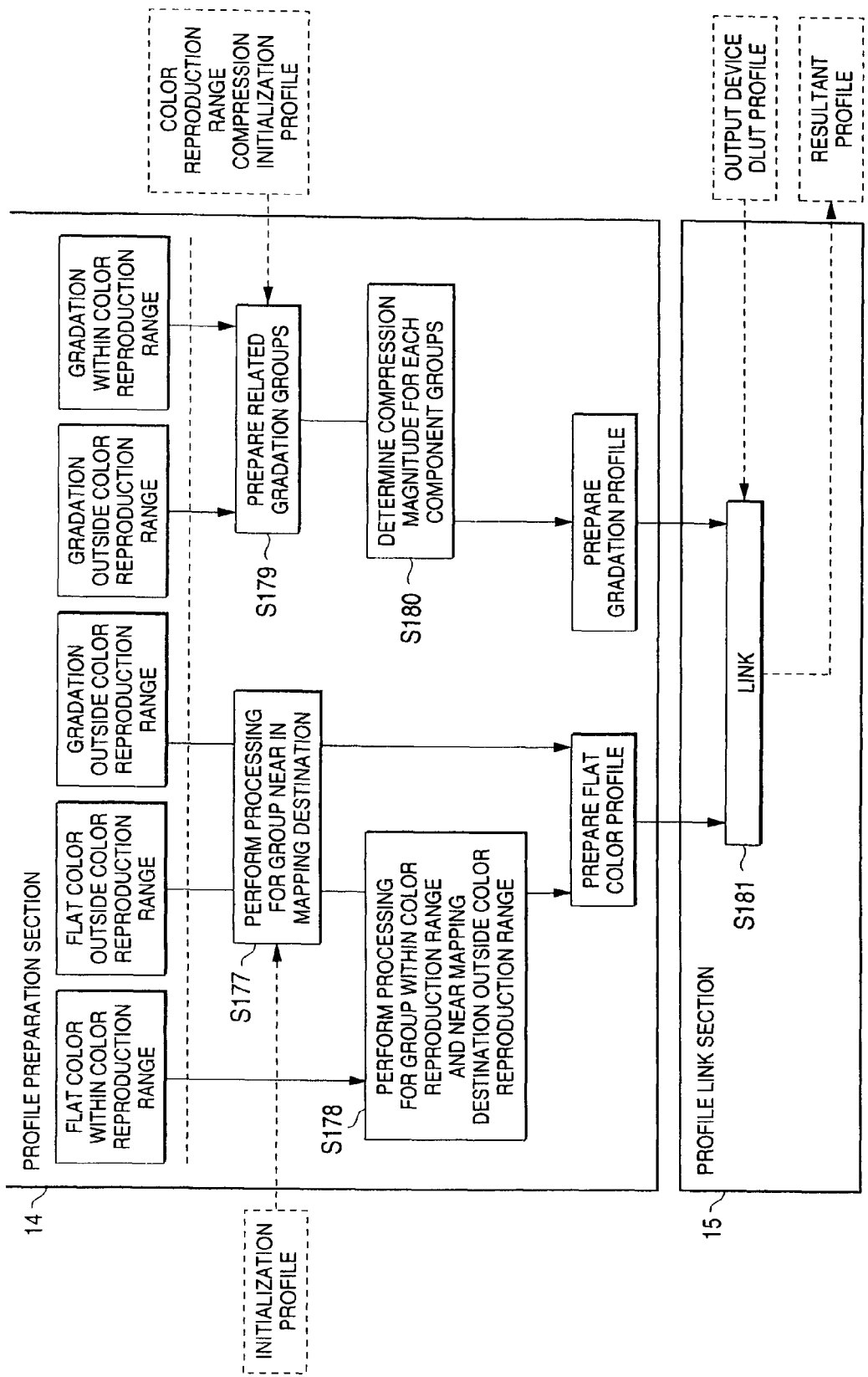
FIG. 17 is a flowchart to show an operation example following the intermediate point of the profile preparation section in the second embodiment of the image processing system of the invention.

FIG. 16 is a flowchart to show an operation example from the group determination section to an intermediate point of the profile preparation section in the second embodiment of the image processing system of the invention. FIG. 17 is a flowchart to show an operation example following the intermediate point of the profile preparation section. At the termination of grouping in the group preparation section 13, then at step S173, the group determination section 16 determines whether each group is gradation or flat color. Based on the number of lattice points N belonging to the group, the group determination section 16 sorts the division color areas into flat color when N=1 and gradation, when N is equal or more than 2, for example. The threshold value used for the sorting is given as a spread determination value from the holding section 81.

Subsequently, the profile preparation section 14 prepares a profile. First at step S174, the profile preparation section 14 selects a group containing as many pixels having color value outside the color reproduction range as or greater than the threshold value (or the threshold value calculated from the group size, etc.,). If the number of pixels outside the color reproduction range is small, it is considered that the number of pixels may be represented reasonably and that it will have a small effect on an image. Therefore, one threshold value is used and only when the number of pixels outside the color reproduction range is equal to or greater than the threshold value, color reproduction range compression processing is performed. Of course, all groups may be selected.

When a group is selected, a color reproduction range inside or outside indication flag indicating the color reproduction range inside or outside is given. If a group containing color value outside the color reproduction range less than the threshold value, namely, having most pixels within the color reproduction range is flat color, the subsequent processing is performed as flat color within the color reproduction range; if the group is gradation, the subsequent processing is performed as gradation within the color reproduction range. For a flat color group containing as many pixels having color value outside the color reproduction range as or greater than the threshold value, Sat compression processing is performed as flat color outside the color reproduction range in the subsequent processing.

For a gradation group containing as many pixels having color value outside the color reproduction range as or greater than the threshold value, the distribution of the portion outside the color reproduction range in the group is seen for determining the compression method to the color reproduction range. For example, if spread in a chroma direction is large, Per compression processing is used; if spread in a hue direction is large, Sat compression processing is executed. Since it is considered that the spread determination criterion also varies depending fairly on the color, a determination threshold value for each color area may be provided in the form of a database, for example.

In the embodiment, a histogram is prepared for each lattice point. Thus, at step S175, the center of gravity of lattice point in the group, lightness, chroma, spread degree in the hue direction (spread as large as how many lattice points are, etc.,) with the center of gravity as the center, and the like are found and at step S176, the distribution is determined by the values for selecting a compression technique to the color reproduction range. According such determination, either Sat or Per compression processing is executed for gradation.

One group may contain separate portions outside the color reproduction range. For example, assume that group G contains two portions outside the color reproduction range, A and B. In this case, processing is performed for the portion A of group G outside the color reproduction range and is also performed for the portion B of group G outside the color reproduction range.

Sat compression processing and Per compression processing are performed separately. First, Sat compression processing for flat color will be discussed. For flat color outside the color reproduction range, processing is performed for a group near in the mapping destination at step S177. If lattice points outside the color reproduction range are put on the contour of the color reproduction range, color discrimination from other colors may be degraded. The processing is performed to prevent such degradation of color discrimination.

First, the LCH value when lattice points are put on the contour of the color reproduction range is checked. For the LCH value when lattice points are put on the contour of the color reproduction range, map data to the contour of the color reproduction range may be previously determined for the lattice points outside the color reproduction range or the LCH value may be calculated by mapping to the contour of the color reproduction range each time. Further, color conversion parameters for initialization (color reproduction range compression initialization profile) may be used for mapping in response to the values of the parameters. In the description to follow, only one lattice point belongs to a flat color and mapping to a flat color outside the color reproduction range (one lattice point) will be considered.

FIG. 18 is an illustration of an example of Sat compression processing for flat color in the profile preparation section in the second embodiment of the image processing system of the invention. When lattice points outside the color reproduction range are put on the contour of the color reproduction range, a lattice point pair with the color difference between the lattice points after put on the contour (for example, the color difference defined in expression (1) described above) smaller than one threshold value is found. The discrimination between the colors of the lattice points lessens. Assuming that the color difference between the lattice points before mapping (for example, the color difference defined in expression (1) described above) is $E_1$ and that the color difference after mapping is $E_2$, if $E_2$ is equal to or less than the threshold value and $E_1$ is equal to or greater than the threshold value, namely, if color discrimination is degraded after compression to the color reproduction range although it was maintained before compression to the color reproduction range, the lattice point having chroma smaller by magnitude proportional to $E_1/E_2$, for example, is furthermore mapped to the inside of the color reproduction range.

Figure 18A:
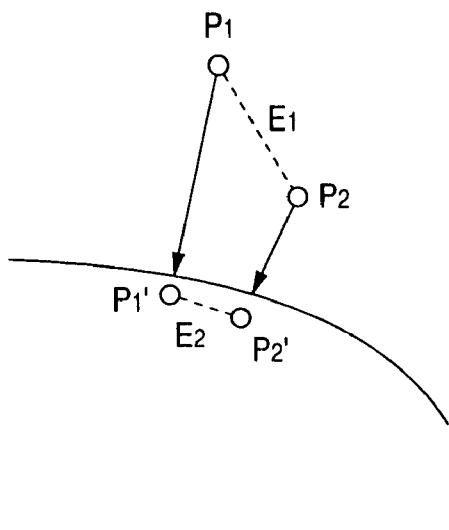
FIGS. 18a–d is an illustration of an example of Sat compression processing for flat color in the profile preparation section in the second embodiment of the image processing system of the invention.
Figure 18B:
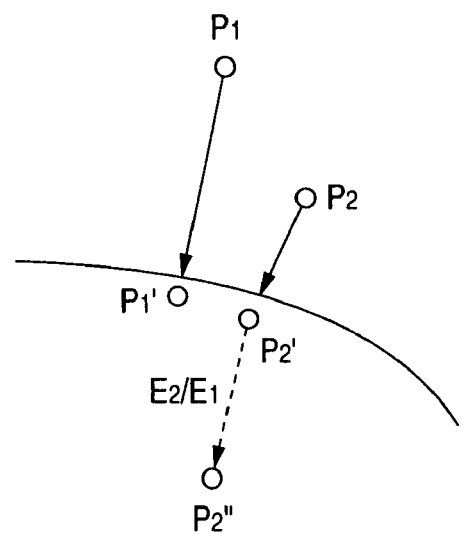

For example, as shown in FIG. 18A, when lattice points P1 and P2 exist outside the color reproduction range, P1' and P2' are points when the lattice points P1 and P2 are put on the contour of the color reproduction range. If the lattice points P1 and P2 are put on the contour of the color reproduction range, the color difference between the points P1' and P2' after mapping, $E_2$, becomes very small. In such a case, for example, if the lattice point P2 has smaller chroma, it is pushed into the inside of the color reproduction range exceeding P2' for mapping to P2". Degradation of color discrimination before mapping is prevented as much as possible.

If color discrimination is degraded among groups (lattice points), the above-described processing may be repeated starting at the group (lattice point) having larger chroma.

Figure 18C:
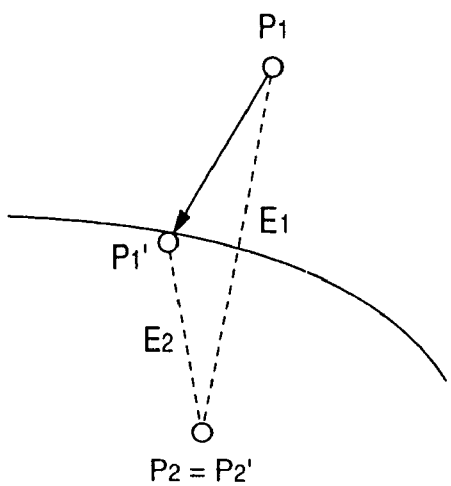
Figure 18D:
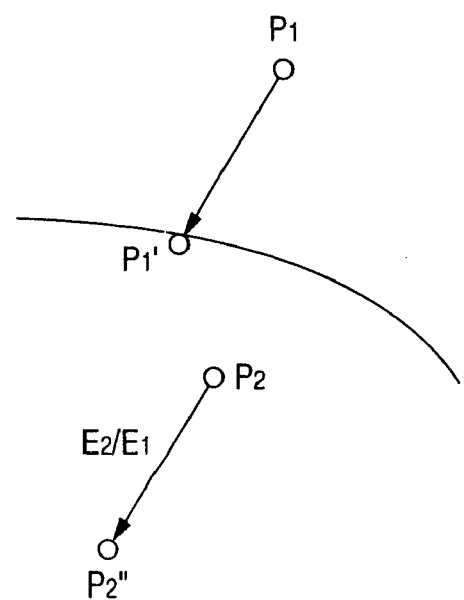

To maintain color discrimination against flat color, whether or not discrimination between the flat color existing within the color reproduction range and the flat color after a lattice point outside the color reproduction range is mapped is degraded is also considered at step S178. The same process as described above is executed. For example, as shown in FIG. 18C, if the color difference between the lattice points P1 and P2 before mapping, $E_1$, is equal to or greater than the threshold value and the color difference between P1' and P2' after mapping, $E_2$, is equal to or less than the threshold value, the lattice point P2 smaller in chroma may be again mapped in the chroma lessening direction by magnitude proportional to $E_2/E_1$, as shown in FIG. 18D. Here, the lattice point P2 is within the color reproduction range and the color after mapping according to the color reproduction range compression initialization profile does not change. Thus, although the lattice point P2 is within the color reproduction range, profile is changed and color conversion is executed.

As the lattice point P2 is moved, the color discrimination from another lattice point P3 may be degraded. In this case, a move of the lattice point P3 is also considered. The move distance is made smaller than the move distance of the lattice point P2. The lattice point P3 may be moved in the move direction of the lattice point P2, for example. Lattice points may be thus moved in sequence. The move distance is changed, whereby convergence occurs. The move distance and direction can also be changed according to the positional relationships among the lattice points, frequencies, etc.

The above-described processing is considered in such a manner that it is divided into two parts in which the color discrimination between flat colors outside the color reproduction range is considered, and then the color discrimination from flat color outside the color reproduction range and flat color in the color reproduction range is considered. However, there is no necessity for dividing the processing; processing may be performed for a set of flat colors with color discrimination degraded regardless of whether the colors are within or outside the color reproduction range from the beginning.

Although Sat compression processing is performed for flat colors, a process of again mapping a color smaller in chroma to prevent color discrimination is executed as described above. This process is similar to Per compression processing in a sense and the conventional conversion method for holding hue and lightness is not applied as it is.

Next, Sat compression processing for gradation will be discussed. For a gradation group containing lattice points outside the color reproduction range, processing for a group near in the mapping destination is also performed at step S177 as with flat color. The group determined to be gradation is considered to contain a plurality of lattice points and mapping of the lattice points is considered. Assume that groups G1 and G2 exist. Assume that the number of lattice points contained in the group G1 is g1 and that the number of lattice points contained in the group G2 is g2. Assume that if the lattice points outside the color reproduction range in the groups G1 and G2 are mapped to the contour of the color reproduction range, there are m combinations of lattice points with color discrimination degraded after the mapping although the lattice points maintained color discrimination before the mapping. In this case, for example, if the value such as m/g1 or m/g2 becomes equal to or greater than one threshold value, it is determined that the areas occupying a large range become similar colors in both G1 and G2, and similar processing to Sat compression processing for flat color described above may be performed for the lattice points in the group smaller in chroma.

Next, Per compression processing for gradation will be discussed. Since Per compression processing also affects the inside of the color reproduction range, the number of affected lattice points increases. What range the color reproduction range compression is to be applied to also becomes a problem. Here, first, groups undergoing the same processing are collected for facilitating processing described later.

If a large number of groups undergo Per compression processing, there is a possibility that groups with almost the same mapping destinations to the contour of the color reproduction range (or large overlap range) may exist. Per compression processing extends to a wide range to maintain gradation. In such a case, it is convenient to collectively process the groups close to the affection range. The groups which should be collectively processed are considered to be one group and will be referred to as "related gradation groups."

Figure 19A:
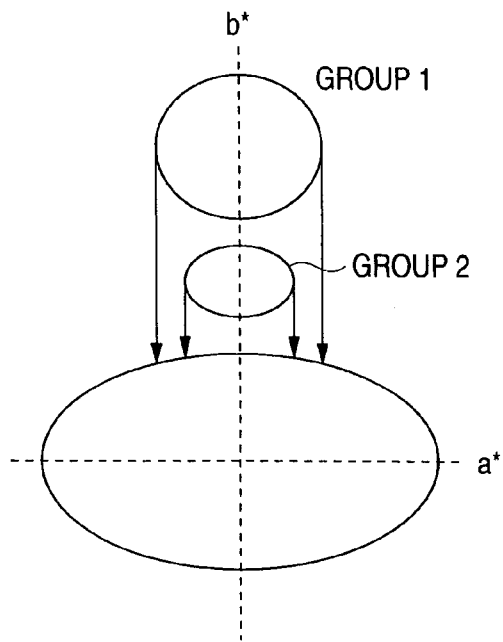
FIGS. 19a–c is an illustration of examples of related gradation groups in the profile preparation section in the second embodiment of the image processing system of the invention.
Figure 19B:
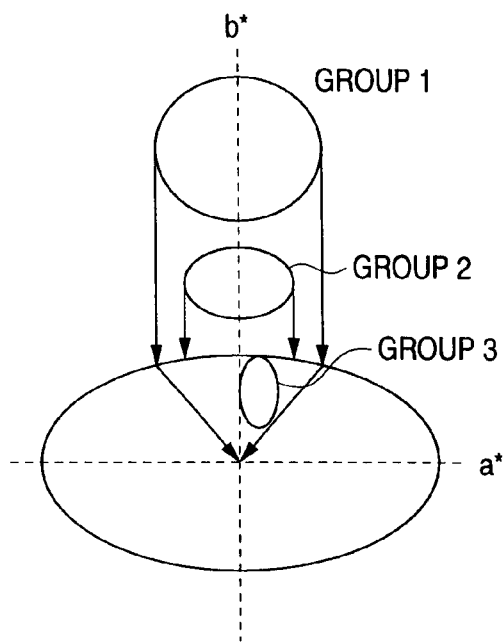

FIG. 19 is an illustration of examples of related gradation groups in the profile preparation section in the second embodiment of the image processing system of the invention; it shows several examples of groups brought into a related gradation group. In the example shown in FIG. 19A, when groups 1 and 2 are mapped to the contour of the color reproduction range, their ranges are completely overlapped. In the example shown in FIG. 19B, when groups 1 and 2 are further compressed with gradation held, a portion common to group 3 occurs. In the examples, groups 1 and 2 are brought into a related gradation group and further groups 1, 2, and 3 are brought into a related gradation group.

Figure 19C:
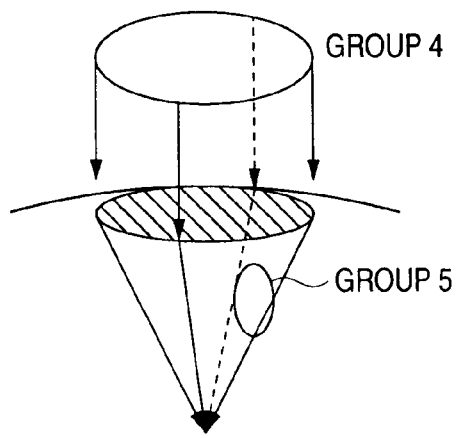

FIG. 19C hatches the mapping destination of group 4. Lines are drawn from the outer periphery of the area toward the grey axis direction and the area contained in the range is called "a color reproduction range compression target area". Group 5 in the color reproduction range compression target area and group 4 make up a related gradation group.

In the second embodiment, related gradation groups as described above are prepared at step S179 in FIG. 17. At step S180, the compression magnitude is determined and a profile is prepared for each related gradation group or each component group with the related gradation group or component groups as the Per compression processing target.

FIG. 20 is an illustration of compressibility in examples of Per compression processing for gradation in the profile preparation section in the second embodiment of the image processing system of the invention. As shown in FIG. 20A, assuming that the distance from the contour of the color reproduction range to the center of gravity of the group is a and that spread of the group in the chroma direction is b, spread in the chroma direction after compression of the color reproduction range, b', is defined as a value proportional to b/(a+b), for example. This acts so as to lessen the spread in the chroma direction after compression if the degree of the group outside the color reproduction range is large. However, if it is desired to limit the percentage in which the group containing a portion outside the color reproduction range falls within the color reproduction range as the spread in the chroma direction after compression widens, such a limitation may be placed. For example, a limitation can be placed so as to prevent the group from falling within the color reproduction range exceeding 30%. In FIG. 20B, a limitation is placed as b' because if compression is executed as it is, the spread in the chroma direction after the compression becomes too large.

In the Per compression processing, the maximum chroma portion of the gradation group is mapped to the contour of the color reproduction range, and compression is executed so that the spread in the chroma direction, b, becomes b'. The lattice points in other than the maximum chroma portion of the group may be mapped within the range of b' from the contour of the color reproduction range. As shown in FIG. 20C, the lattice point at a distance of size p from the maximum chroma portion of the group is pushed furthermore into the color reproduction range by size of pXb'/b from the contour of the color reproduction range. An average unit vector of transition vector when the color reproduction range compression initialization profile is applied to division color area outside the color reproduction range is found and the lattice point within the color reproduction range may be compressed in the direction of the vector. For gradation spread in the hue direction, a direction vector (unit vector) may be found for each hue interval.

Figure 21A:
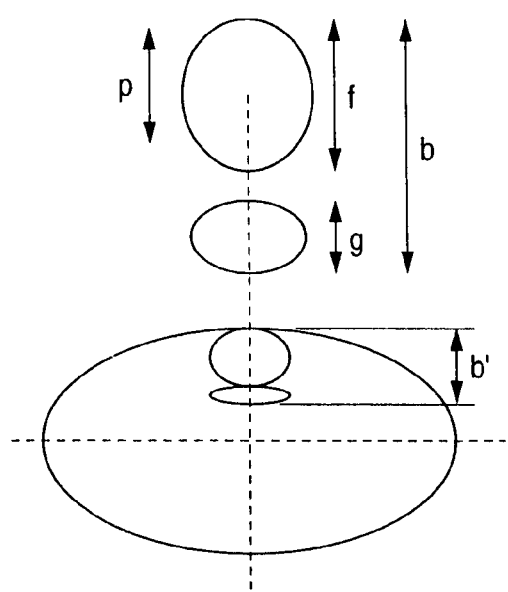
FIGS. 21a–b is an illustration of compressibility in examples of Per compression processing for related gradation groups in the profile preparation section in the second embodiment of the image processing system of the invention.
Figure 21B:
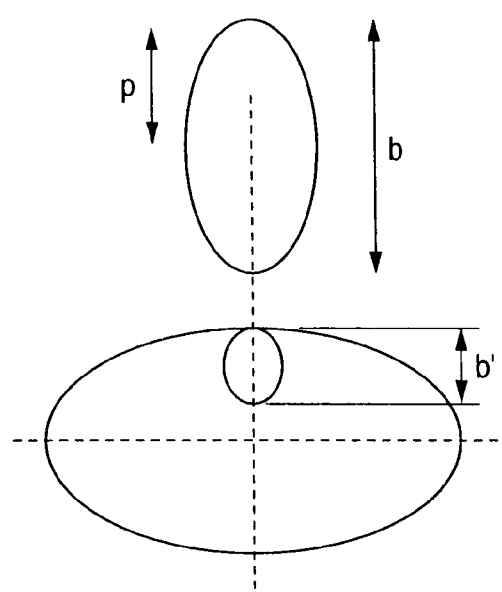

FIG. 21 is an illustration of compressibility in examples of Per compression processing for related gradation groups in the profile preparation section in the second embodiment of the image processing system of the invention. Similar processing to that described above is performed for related gradation groups as if one group occupying the area including the related gradation groups existed. For example, if two groups shown as ellipses in FIG. 21A are related gradation groups, compression is executed as if they were one group, as shown in FIG. 21B, whereby the two groups are each compressed. Moreover, the relation between the two groups is maintained.

In addition to uniform compression as described above with related gradation groups as one group as described above, the compressibility may be changed using the feature amounts of the groups making up the related gradation group, such as spread in the chroma direction and a frequency distribution.

Referring again to FIG. 17, at step S181, the profile link section 15 links the LCH-to-LCH direct look-up table profile prepared from flat color and the LCH-to-LCH direct look-up table profile prepared from gradation together to prepare an LCH-to-LCH direct look-up table profile for color reproduction range compression and further links the profile with an LCH-to-CMYK direct look-up table profile, for example, for the image output device 7 to prepare an LCH-to-CMYK direct look-up table profile, which is a profile considering color reproduction range compression.

When the LCH-to-LCH direct look-up table profiles for color reproduction range compression separately prepared for flat color and gradation are combined to prepare an LCH-to-LCH direct look-up table profile, the data values are changed at the lattice points within the color reproduction range and in flat color processing and gradation processing, thus the discrepancy between the data values may occur. In this case, adjustment needs to be made by any method of making either value take precedence over the other, adopting an intermediate value between them, or the like.

In the second embodiment, determination as to the inside or outside of the color reproduction range is made after grouping. Thus, if an input image does not contain any portion outside the color reproduction range, needless grouping is performed. In this sense, the first embodiment involves needless processing less than the second embodiment. However, the second embodiment does not perform processing taking long operation time on dispersion values, etc., as compared with the first embodiment, thus can also lessen the processing amount and used memory as a whole. The modifications in the first embodiment can also be applied to the second embodiment.

Figure 22:
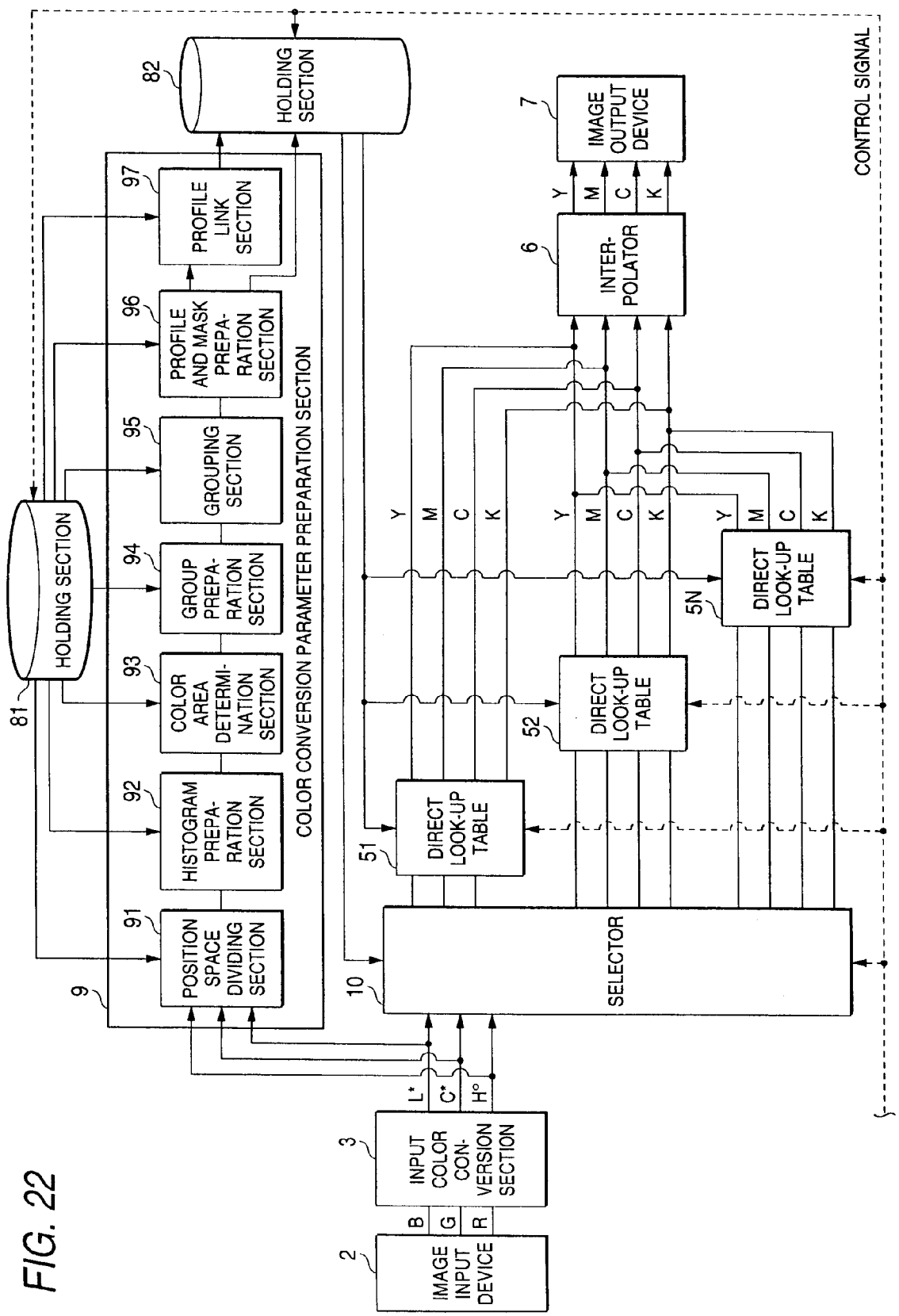
FIG. 22 is a block diagram to show a third embodiment of the image processing system of the invention.

FIG. 22 is a block diagram to show a third embodiment of the image processing system of the invention. Parts identical with or similar to those previously described with reference to FIG. 1 are denoted by the same reference numerals in FIG. 22 and will not be discussed again. Numeral 9 is a color conversion parameter preparation section, numeral 10 is a selector, numerals 51–5N are direct look-up tables, numeral 91 is a position space dividing section, numeral 92 is a histogram preparation section, numeral 93 is a color area determination section, numeral 94 is a group preparation section, numeral 95 is a grouping section, numeral 96 is a profile mask preparation section, and numeral 97 is a profile link section. The third embodiment is an example wherein image position information is furthermore used in the first embodiment.

The third embodiment is almost the same as the first embodiment in the general configuration of the system and the generation operation. The color conversion parameter preparation section 9 corresponds to the color conversion parameter preparation section 1 of the first embodiment. The third embodiment provides a number of direct look-up tables. The selector 10 has a function of holding an image subjected to color space conversion in an input color conversion section 3 and selects a direct look-up table for each position area in the xy position space of the held image, thereby enabling color conversion processing responsive to the position in the xy position space of the image. For example, if a gradation portion exists in a part of an image and a flat color portion also exists in the image, color conversion is executed using a profile appropriate for the gradation in the gradation portion of the image and is also executed with a profile responsive to the flat color portion in the flat color portion. Thus, if positions on the xy position space of the image differ, different profile can be used even if the same color is used.

The color conversion parameter preparation section 9 divides the xy position space of an image and prepares a color conversion parameter for each position area and sets the prepared color conversion parameters in the direct look-up tables 51–5N.

The color conversion parameter preparation section 9 has a position space dividing section 91, a histogram preparation section 92, a color area determination section 93, a group preparation section 94, a grouping section 95, a profile and mask preparation section 96, and a profile link section 97. The histogram preparation section 92, the color area determination section 93, the group preparation section 94, the profile and mask preparation section 96, and the profile link section 97 correspond to the histogram preparation section 11, the area determination section 12, the group preparation section 13, the profile preparation section 14, and the profile link section 15 in the first embodiment respectively. Only the differences will be discussed for the sections.

The position space dividing section 91 divides the xy position space of an input image. Portions into which the xy position space is divided are called "division position areas". The xy position space is first divided by an initial method, then an average value and a dispersion value of colors are found. If the dispersion value is equal to or less than a threshold value, it is considered that almost the same color is applied within the division position area, thus the color of the division position area is represented by the average value. If the dispersion value is greater than the threshold value, the division position area is a portion in which colors change hard, thus is furthermore divided. After the area is furthermore divided, likewise an average value and a dispersion value of colors are found. The division position areas each with the dispersion value greater than the threshold value are divided until the dispersion value becomes equal to or less than the threshold value in every division position area. Thus, for all division position areas, their dispersion values are made equal to or less than the threshold value and the representative colors of the division position areas are set to the average values. Each division position area has xy position information. Of course, the xy position space can also be divided only by the initial method or each pixel can also be set to a division position area.

The histogram preparation section 92 creates a histogram in a five-dimensional space of $L^*$, $C^*$, $H°$, x, and y. Considering that histograms are prepared in an actual processing system, LCH space is divided and a histogram is created for each xy position information piece in the division color areas into which the LCH space is divided. Alternatively, LCH histogram is created in division position area in the xy position space. Here, the former method is used as an example.

The color area determination section 93 and the group preparation section 94 are similar to the area determination section 12 and the group preparation section 13 in the first embodiment. Groups on color space prepared by the group preparation section 94 will be called "color groups" in the description that follows to distinguish them from groups on the xy position space.

The grouping section 95 checks a distribution on the xy position space for each color group and if the frequency of adjacent division position areas is equal to or greater than a threshold value, groups the division position areas. This division position area group is called "a position group". The grouping section 95 checks what colors the position group contains, and again defines the division color areas corresponding to the position group as a new color group. At this time, there is a possibility that more than one color group containing the same division color area may be produced. In this case, the color groups are combined into one color group and the position groups are also combined into one group. When the color groups are again grouped by the method, a division color area may not be adjacent to other division color areas in one color group. In this case, a method of furthermore dividing the color group is also possible. However, in the embodiment, the color group containing a division color area not adjacent to other division color areas is also recognized as one color group. The position groups and the color groups can be thus related for grouping in the five-dimensional space of $L^*$, $C^*$, $H°$, x, and y.

The profile and mask preparation section 96 prepares a profile set in a direct look-up table for each corresponding color group, position group. To prepare a profile, processing is performed in response to whether the group is flat color or gradation as in the first embodiment. The profile mask preparation section 96 also prepares a position mask indicating the area on the xy position space using the profile in response to the position group.

The profile link section 97 links a profile prepared by the profile and mask preparation section 96 and a profile to be output to an image output device 7 together as in the first embodiment. Since the profile and mask preparation section 96 prepares a number of profiles, the profile link section 97 links each prepared profile and a profile to be output to an image output device 7 together. It also stores the profiles and the position masks in a holding section 82 in a once-to-one correspondence therebetween.

Next, an example of the operation in the third embodiment of the image processing system of the invention will be discussed. The general operation is similar to that in the first embodiment. An image is read through an image input device 2 and input image data is converted from RGB space to LCH space by the input color conversion section 3. The resultant LCH signal is input to the color conversion parameter preparation section 9 and is also held in the selector 10.

The color conversion parameter preparation section 9 prepares a color conversion parameter containing processing for color outside the color reproduction range for each xy position area from the input image data and prepares a position mask indicating the xy position area to which the color conversion parameter is applied. It sets the prepared color conversion parameters in the direct look-up tables 51–5N.

For conversion processing of an LCH image to a CMYK image, mask information is referenced in response to the position of a pixel processed and the direct look-up table in which the color conversion parameter to be used is set is selected by the selector 10. If the number of the types of parameters to be used is greater than the number of memories, processing of read replacement of the parameters, etc., is performed for selection. Table values are read from any of the selected direct look-up tables 5l–5N in response to the pixel value and are interpolated by an interpolator 6 and CMYK signals are transmitted to the image output device 7, whereby an image is output from the image output device 7.

Figure 23:
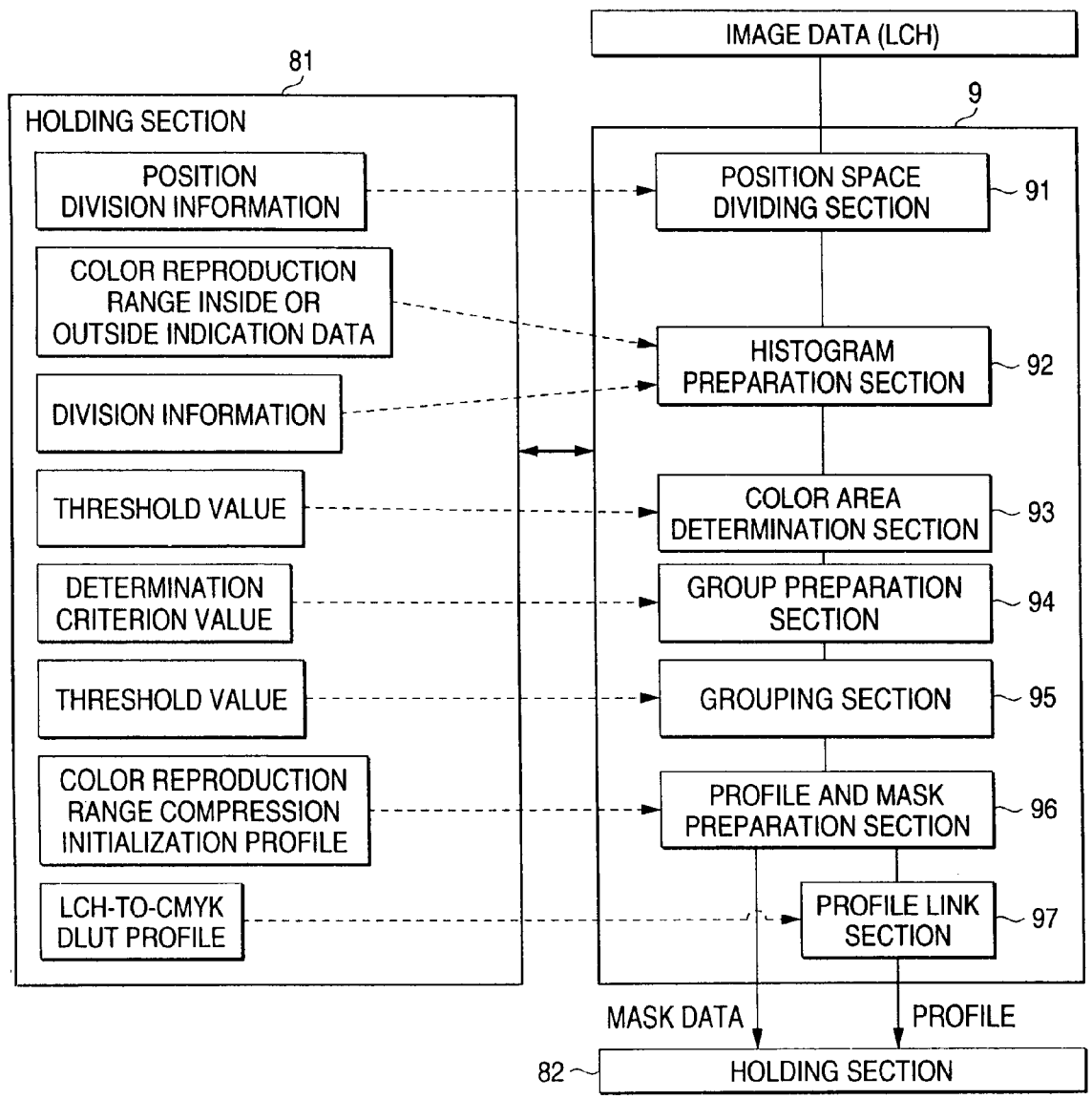
FIG. 23 is an illustration of an operation example of a color conversion parameter preparation section 9 in the third embodiment of the image processing system of the invention.

FIG. 23 is an illustration of an operation example of the color conversion parameter preparation section 9 in the third embodiment of the image processing system of the invention. It also shows data in a holding section 81 used together with the processing sections of the color conversion parameter preparation section 9.

Image data, which is inputted through the image input device 2, undergoes color space conversion processing of RGB to LCH in the input color conversion section 3, and is inputted to the color conversion parameter preparation section 9. First, the position space dividing section 91 divides the xy position space. FIG. 24 is a flowchart to show an operation example of the position space dividing section 91 in the third embodiment of the image processing system of the invention. First, at step S191, the initialization method is used to divide the xy position space of an input image. As the initialization method, for example, the xy position space may be divided into 50 pixels in the x direction and 50 pixels in the y direction. The areas into which the space is divided are called "division position areas".

At step S192, average value $LCH_{AVE}$ and dispersion values $\{\sigma L, \sigma C, \sigma H\}$ of colors are found for each division position area. At step S193, the dispersion values are compared with threshold values. That is, when the threshold values are $\{th1, th2, th3\}$, whether $\sigma L \leq th1$ and $\sigma C \leq th2$ and $\sigma H \leq th3$ is determined. If the dispersion values are greater than the threshold values, at step S194 the division position area is furthermore divided and steps S192 and later are executed for each of the division position areas into which that division position area is furthermore divided.

If the dispersion values are equal to or less than the threshold values, color change of the division position area is small, the division position area is not divided any more. At step S195, whether processing for all division position areas is complete is determined. If an unprocessed division position area remains, control returns to step S192 for processing the division position area. When the dispersion values become equal to or less than the threshold values for all division position areas, processing terminates. At this time, the color average value $LCH_{AVE}$ calculated at step S192 for each division position area is set to the representative color of the division position area.

FIG. 25 is an illustration of an operation example of the position space dividing section in the third embodiment of the image processing system of the invention. The flowchart in FIG. 24 will be discussed with a specific example. Assume that an image as shown in FIG. 25A is input. For convenience, the colored portion is hatched. In FIG. 25A, the vertical and horizontal lines are division lines produced by the initialization method executed at step S191. The areas separated by the vertical and horizontal lines are division position areas produced by the initialization method. In each division position area, an average value and dispersion values of colors are found and the dispersion values are compared with the threshold values. Here, since the color of the hatched portion shown in FIG. 25A changes largely, the dispersion values of the division position area hatched in FIG. 25B do not become equal to or less than the threshold values. Thus, the division position area is furthermore divided as shown in FIG. 25C and the color average value and dispersion values are found in each of the resultant division position areas. Dividing is thus repeated so that the color dispersion values become equal to or less than the threshold values in all division position areas. When the dispersion values of colors of all division position areas become equal to or less than the threshold values, dividing is stopped. Each division position area has xy position information for identifying the division position area and the color average value as a representative color.

Referring again to FIG. 23, the histogram preparation section 92 uses division information to divide color space and counts the number of pixels having color value contained in each division color area for each division position area. Thus, the xy position information of division position area information and the count are held for each division color area. The dividing color area dividing method is similar to that in the first embodiment.

Next, the color area determination section 93 determines each division color area. The group preparation section 94 prepares a color group for division color areas determined to be gradation areas. The division color area determination and color group preparation are similar to those in the first embodiment and are performed according to the flowcharts in FIGS. 4 and 5 respectively.

Figure 26:
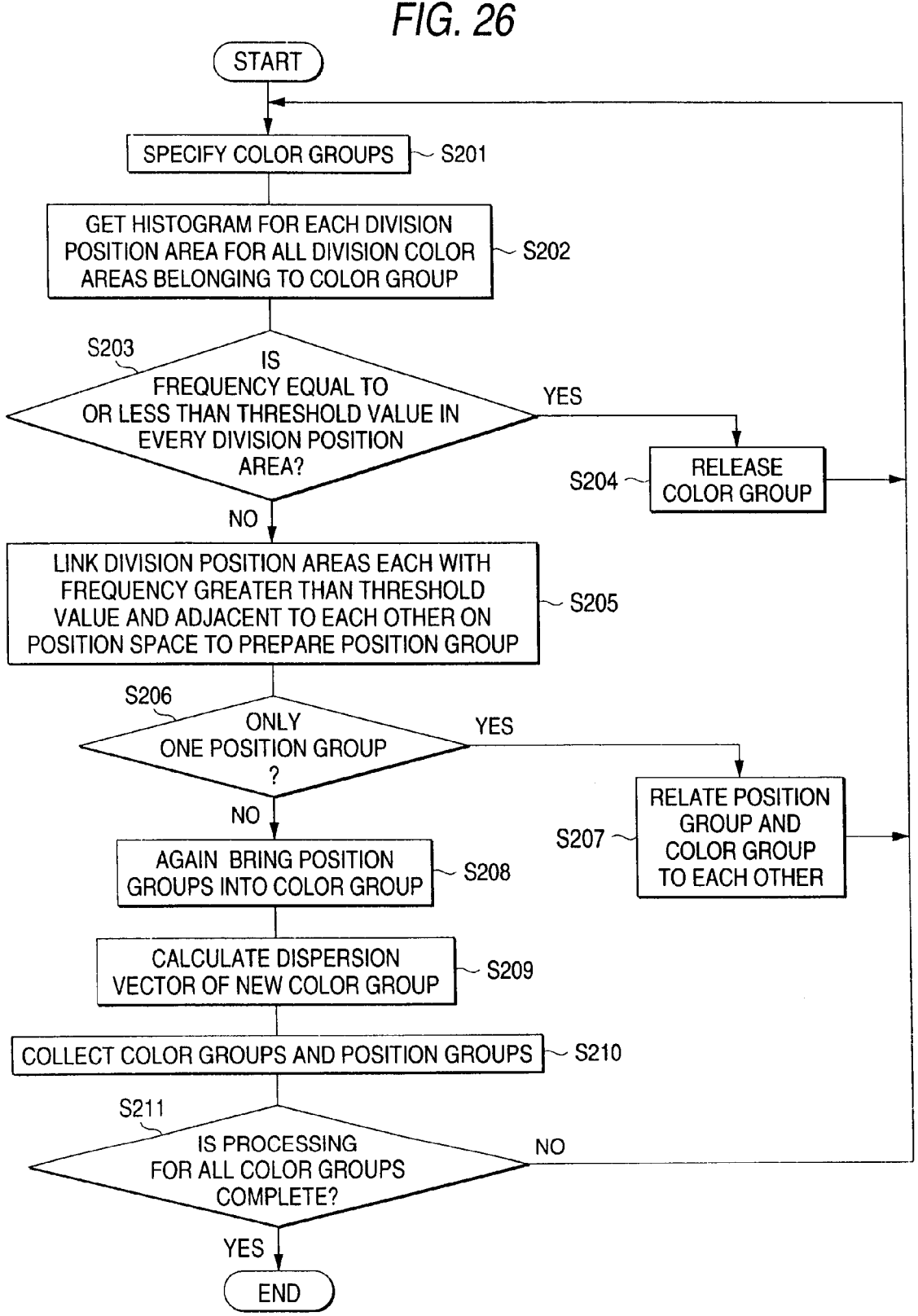
FIG. 26 is a flowchart to show an operation example of a grouping section in the third embodiment of the image processing system of the invention.

FIG. 26 is a flowchart to show an operation example of the grouping section in the third embodiment of the image processing system of the invention. At step S201, one unprocessed color group is specified. To check where the color group is distributed over the xy position space, the histogram for each division position area is gotten for all division color areas belonging to the specified color group. The histograms are prepared in the histogram preparation section 92. At step S203, whether or not the frequency is equal to or less than the threshold value in every division position area is determined from the gotten histograms. If the frequency is equal to or less than the threshold value in every division position area, the color group is a dispersed color, thus it is determined that gradation processing need not be performed for the color group. Thus, at step S204, the color group is released from color groups.

If the frequency is greater than the threshold value in one or more division position areas, there is a possibility that gradation processing may be required in the division position area. At step S205, the division position areas each with the frequency greater than the threshold value and adjacent to each other on the xy position space are grouped to prepare a position group. The division position areas adjacent to each other mentioned here refer to those adjacent to each other up and down, left and right, and slantingly.

More than one position group may be prepared for one color group. At step S206, whether or not one position group is prepared for one color group is determined. If only one position group is prepared, the position group and color group are related to each other at step S207.

If more than one position group is prepared for one color group, the position groups are again brought into a color group. That is, what colors each position group contains is checked and the division color areas corresponding to the colors contained in each position group are checked for grouping. At this time, since the representative color for each division position area is selected in the position space dividing section 91, which division color area the representative color is contained in may be checked for each of the division position areas making up the position group. The division color areas provided for the division position areas making up the position group are again defined as a new color group. At step S209, the dispersion values, etc., of the new color group are calculated.

After a new color group is prepared in position groups, at step S210 color groups having the same division color areas as members among all color groups are found and grouped into one and the corresponding position groups are grouped into one. This step is a step for performing the subsequent processing efficiently and may be skipped.

At step S211, whether processing for all color groups is complete is determined. If an unprocessed color group remains, control returns to step S201 for processing the color group. When processing for all color groups is complete, the color groups and the position groups are related to each other.

Figure 27A:
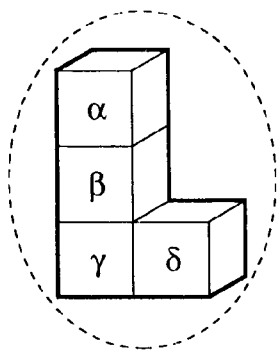
FIGS. 27a–c is an illustration of an operation example of the grouping section in the third embodiment of the image processing system of the invention.

FIG. 27 is an illustration of an operation example of the grouping section in the third embodiment of the image processing system of the invention. The operation example of the grouping section shown in FIG. 26 will be furthermore discussed. Now, assume that division color areas α to δ are brought into one color group, as shown in FIG. 27A. Each cube in FIG. 27A indicates one division color area.

Figure 27B:
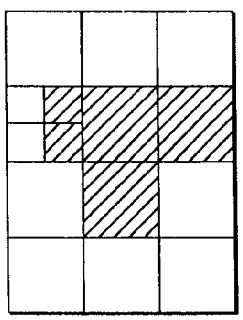
Figure 27C:
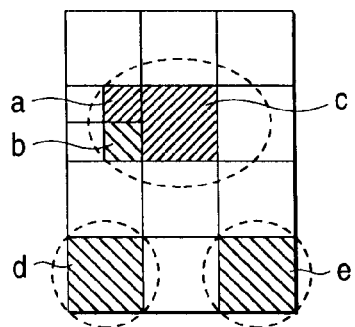

A histogram with the number of pixels counted for each division position area is gotten for the division color areas belonging to the color group. If a division position area has a frequency equal to or greater than the threshold value, it is linked with an adjacent division position area to prepare a position group. At this time, for example, one position group may be related to the color group as hatched in FIG. 27B or a number of position groups may be dispersed at discontinuous positions as shown in FIG. 27C. When only one position group is prepared as shown in FIG. 27B, the color group and position group are related to each other. Thus, processing for the color group is terminated.

When more than one position group is prepared as indicated by broken line ellipses in FIG. 27C, color grouping is again performed. In FIG. 27C, assume that hatched division position areas a to e are contained in one color group. If the adjacent division position areas are linked to prepare a position group, the division color areas can be brought into three position groups as indicated by the broken line ellipses. Which division color area the representative color is contained in is checked for each of the division position areas contained in each position group. As shown in different hatchings in FIG. 27C, the representative colors of the division position areas a, b, and d are contained in the same division color area, which is β. The representative colors of the division color areas c and e are contained in the same division color area, which is γ.

In the position group consisting of the division position areas a, b, and c, the representative colors of the division position areas a and c are contained in the division color area β and the representative color of the division position area b is contained in the division color area γ, thus the division color areas β and γ are brought into one color group. In the position group of the division position area d, the representative color is contained in the division color area γ, thus the division color area γ is brought into one color group. Further, in the position group of the division position area e, the representative color is also contained in the division color area γ, thus the division color area γ is brought into one color group. The color groups related to the position groups are thus found. Dispersion vectors of the color groups thus found are calculated.

Here, the color groups related to the division position areas d and e are groups each having only the division color area γ as an element. Thus, they are brought into one color group and position group, whereby the color group of the division color area γ is related to the position group consisting of the division position areas d and e.

Referring again to FIG. 23, the profile and mask preparation section 96 sorts areas into flat color and gradation and prepares a profile for each position group in gradation. It also prepares mask information indicating the area on the xy position space to which the profile is applied. Profile preparation processing for flat color is similar to that in the first embodiment; for example, a profile can be prepared according to the flowchart shown in FIG. 7. At this time, the profile and mask preparation section 96 can also prepare mask information indicating the area on the xy position coordinate space to which the profile corresponding to flat color is applied. The mask information can be prepared by linking the division position areas related to the division color areas determined to be flat color. When mask information is provided for gradation, if a profile for flat color is applied to a portion outside the mask information application range, mask information for flat color need not be prepared.

Figure 28:
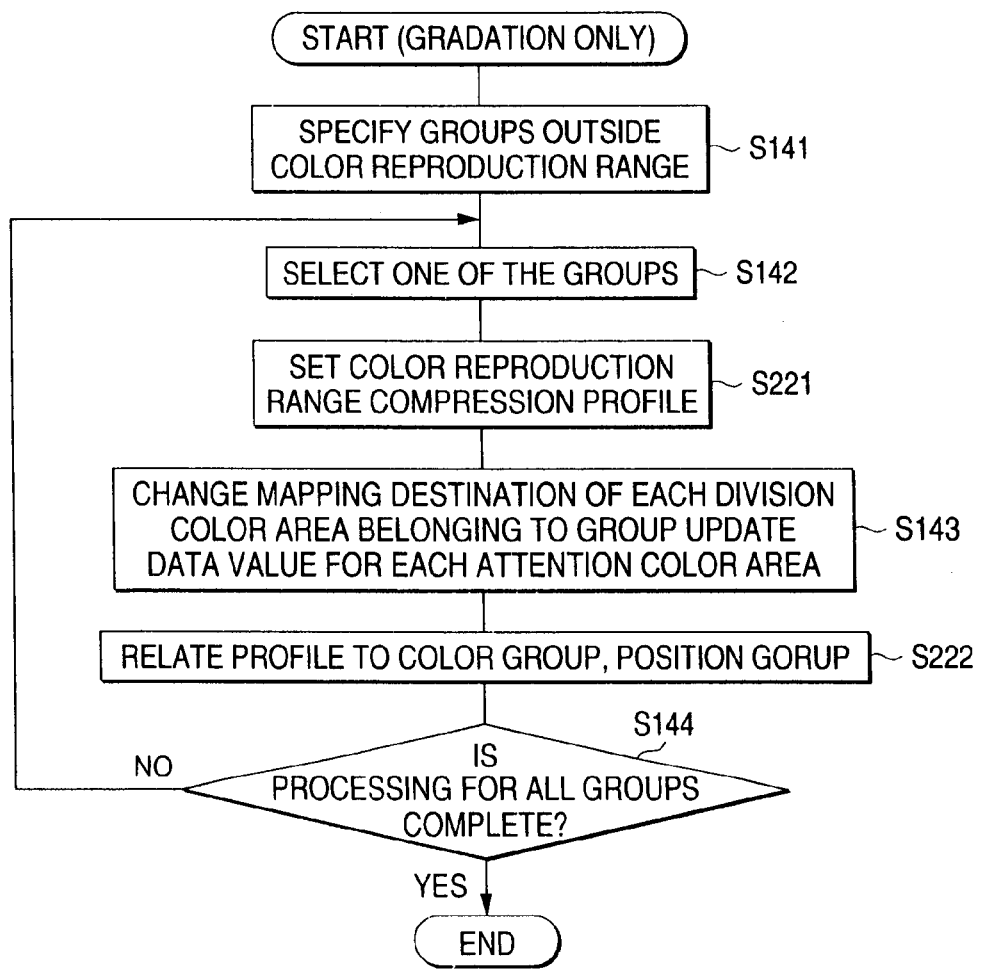
FIG. 28 is a flowchart to show an example of profile preparation processing for gradation in a profile and mask preparation section in the third embodiment of the image processing system of the invention.

A gradation profile is prepared for each position group. Thus, a part of the profile preparation processing for gradation in the first embodiment shown in FIG. 9 is changed. FIG. 28 is a flowchart to show an example of profile preparation processing for gradation in the profile and mask preparation section in the third embodiment of the image processing system of the invention. Steps identical with those previously described with reference to FIG. 9 are denoted by the same step numerals in FIG. 28 and will not be discussed again. In the third embodiment, steps S221 and S222 are added.

When a color group is selected at step S142, a color reproduction range compression profile for the color group is set. A color reproduction range compression initialization profile may be used as the profile. At step S143, the mapping destinations of the division color areas belonging to the selected color group are changed. The changed profile is related to the color group, position group at step S222.

Such processing is performed for each color group, whereby as many profiles as the number of the color groups are prepared and related to the color groups, position groups. According to xy position information of the division position areas belonging to each position group, mask information is prepared for using the areas on the xy position space containing the division position areas as process areas. The mask information is also related to the color group, position group, profile.

In addition to preparation of mask information for each profile, such one mask information piece to hold, for example, numeric values identifying the profiles for each division position area may be provided.

Figure 29A:
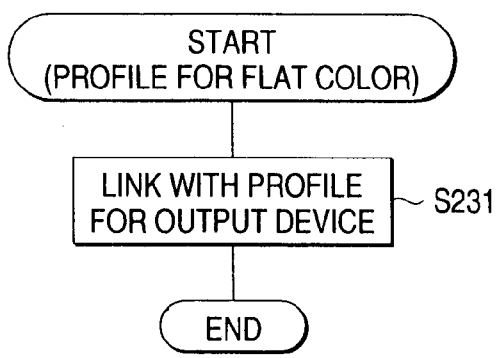
FIGS. 29a–b is a flowchart to show an operation example of a profile link section in the third embodiment of the image processing system of the invention.
Figure 29B:
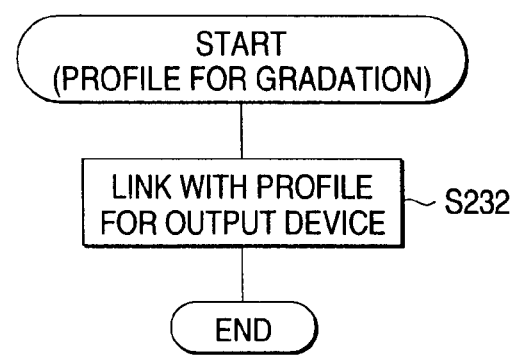

FIG. 29 is a flowchart to show an operation example of the profile link section in the third embodiment of the image processing system of the invention. The profile link section 97 links an LCH-to-LCH direct look-up table profile prepared from flat color or a plurality of LCH-to-LCH direct look-up table profiles prepared from gradation with, for example, an LCH-to-CMYK direct look-up table profile for the image output device 7 at step S231 or S232 to prepare an LCH-to-CMYK direct look-up table profile or profiles. This LCH profile is a profile considering color reproduction range compression.

One LCH-to-CMYK direct look-up table profile for flat color and LCH-to-CMYK direct look-up table profiles for gradation thus prepared are held in the holding section 82 and are set in the direct look-up tables 5l–5N. The mask information related to each LCH-to-CMYK direct look-up table profile is also held in the holding section 82 and is sent to the selector 10. The selector 10 selects a direct look-up table for inputting a pixel according to the mask information and sends color value of the pixel. Table values provided from any of the direct look-up tables 5l–5N are interpolated by the interpolator 6 and are transmitted to the image output device 7 for forming an image.

Figure 30:
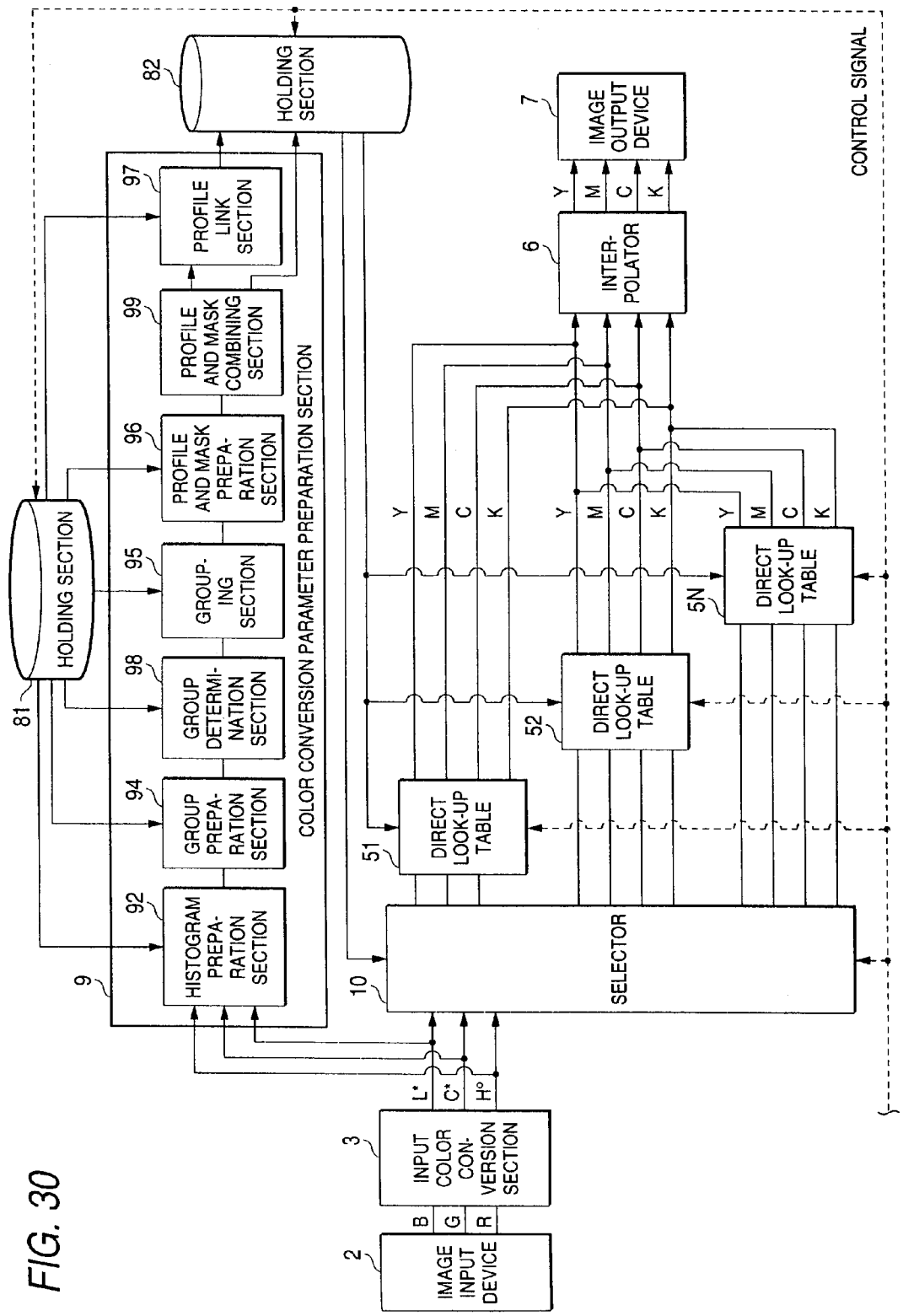
FIG. 30 is a block diagram to show a fourth embodiment of the image processing system of the invention.

FIG. 30 is a block diagram to show a fourth embodiment of the image processing system of the invention. Parts identical with or similar to those previously described with reference to FIG. 22 are denoted by the same reference numerals in FIG. 30 and will not be discussed again. Numeral 98 is a group determination section and numeral 99 is a profile mask combining section. In the fourth embodiment, determination as to whether each area is flat color or gradation in the third embodiment is made after a group is prepared. Further, in the second embodiment, as in the third embodiment, xy position information is used.

A color conversion parameter preparation section 9 in the fourth embodiment has a histogram preparation section 92, a group preparation section 94, a group determination section 98, a profile and mask preparation section 96, a profile mask combining section 99, and a profile link section 97.

In the fourth embodiment, an input image is divided only by the initial method in the third embodiment. Thus, no position space dividing section 91 is provided. The histogram preparation section 92 divides xy position space into division position areas according to division information. It also divides color space and prepares a histogram for each division position area for each of division color areas into which the color space is divided.

The group preparation section 94 combines areas adjacent to each other on both color space and position space into a group. Five-dimensional space of L*, C*, H°, x, and y will be discussed; it is separated into LCH color space and xy position space for discussion as in the third embodiment. Whether or not grouping is to be performed for the LCH color space is determined in response to the frequency of each division color area as in the second embodiment. Whether or not grouping is to be performed for the xy position space can also be determined by a similar determination criterion. For the description, a group into which division color areas in the color space are brought is called "a color group" and a group into which division position areas in the xy position space are brought is called "a position group". The color groups and position groups are in a one-to-one correspondence with each other.

As a result of such grouping, even division position areas related to the same division color area may belong to different position groups, in which case one division color area is contained in more than one color group. In contrast, if one division position area contains different colors contained in more than one division color area, it is contained in more than one position group. If more than one division color area or more than one color group is related to one division position area, the possibility that a problem will occur in actual color conversion processing is high. To deal with such a fear, the position group can be divided finely from the beginning or one division position area to which more than one division color area or color group is related can be furthermore divided.

The group determination section 98 can determine whether each color group is flat color or gradation by the number of division color areas contained in the color group or by also considering spread on the xy position space. For example, if the spread on the xy position space is small, the corresponding color group may be determined to be flat color; if small, the corresponding color group may be determined to be gradation.

When color groups overlap, the grouping section 95 combines the groups into one group. When groups are similar in color, but different in xy position, the group preparation section 94 determines the groups to be different groups. Thus, groups even with the same color may become different color groups. In such a case, if a color group distribution is seen in the LCH color space, it is understood that the color groups overlap at the same place. Thus, the color groups are combined into a group. The related position groups are also combined into a group accordingly. The resultant group for flat color is called "an effective flat color group" and that for gradation is called "an effective gradation group". Grouping can prevent similar processing from being repeated for similar groups.

The profile and mask preparation section 96 prepares profiles for flat color and gradation separately like the profile preparation section 14 in the second embodiment and also prepares mask information. It prepares separate gradation profiles related to color groups.

The profile mask combining section 99 combines profiles for flat color and gradation. At this time, if the table values of flat color and gradation profiles for the same color (the same lattice point) differ, the gradation profile is provided as a profile separate from the flat color profile together with mask information. If the table values of flat color and gradation profiles for the same color (the same lattice point) do not much differ, the flat color and gradation profiles need not be made separate and are combined. At this stage, one or more finally required LCH-to-LCH direct look-up table profiles for color reproduction range compression are determined (mask information is contained for more than one profile).

The profile link section 97 links the color reproduction range compression LCH-to-LCH direct look-up table profile provided by the profile mask combining section 99 with, for example, an LCH-to-CMYK direct look-up table profile for the image output device 7 to prepare an LCH-to-CMYK direct look-up table profile.

Figure 31:
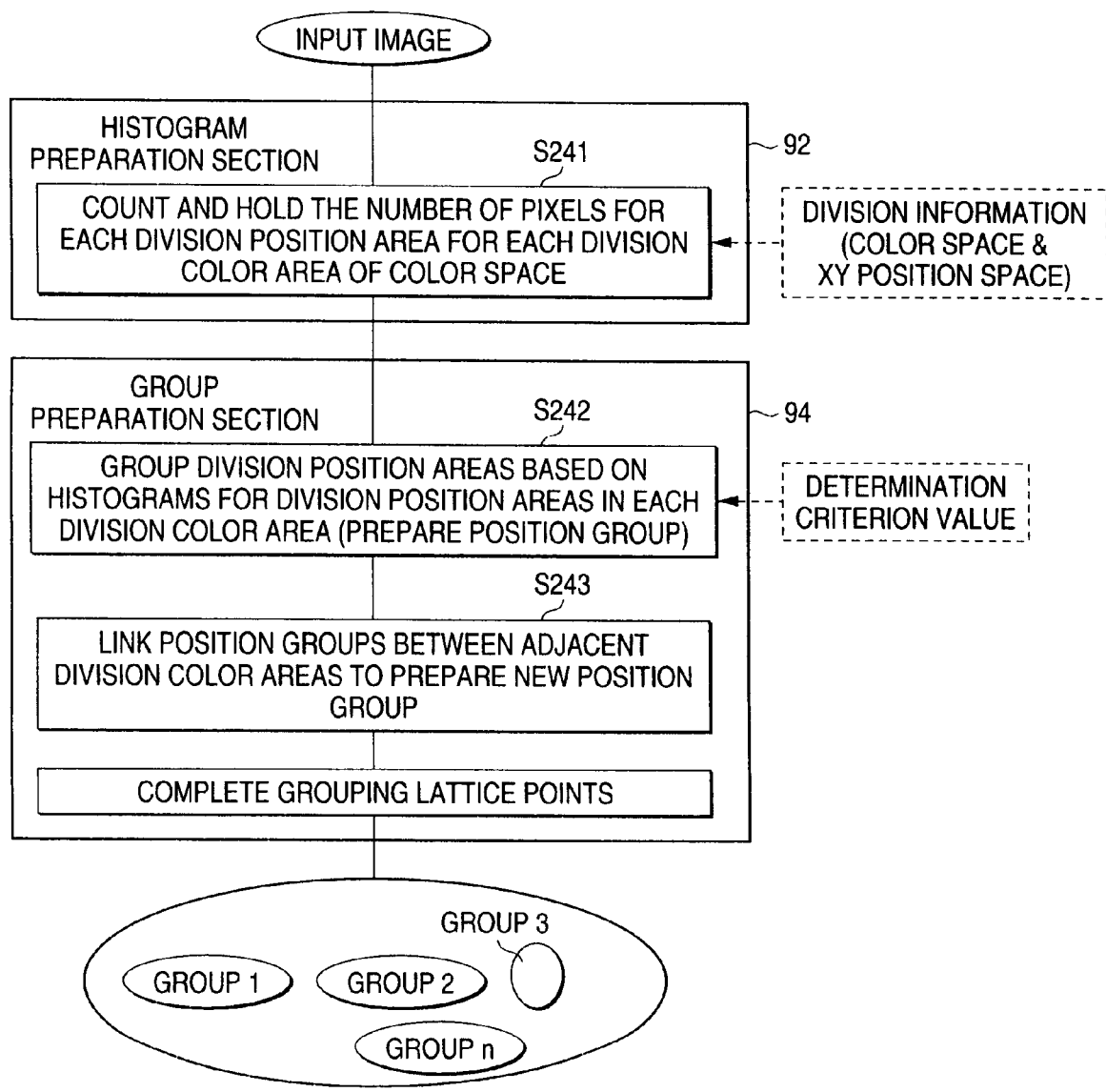
FIG. 31 is a flowchart to show a processing example of histogram and group preparation sections in the fourth embodiment of the image processing system of the invention.

Next, an example of the operation in the fourth embodiment of the image processing system of the invention will be discussed. FIG. 31 is a flowchart to show a processing example of the histogram and group preparation sections in the fourth embodiment of the image processing system of the invention. Image data input through the image input device 2 undergoes color space conversion processing of RGB to LCH in the input color conversion section 3 and is input to the color conversion parameter preparation section 9. First, at step S241, the histogram preparation section 92 divides the color space and counts the number of pixels having color value contained in each of the division color areas into which the color space is divided for each division position area.

Next, the group preparation section 94 collects near division color areas and near division position areas and groups them. At step S242, the division position areas adjacent to each other up and down, left and right, and slantingly are collected as a position group based on the histograms for the division position areas in each division color area various methods can be used for grouping under conditions. For example, as in the second embodiment, when threshold values th1 to th3 (th1>th2>th3) are defined and frequencies in adjacent division color areas or division position areas are A and B, if either of the following two expressions is satisfied, the combination degree is determined to be strong and the areas are grouped:

max $(A, B) > th1$ and min $(A, B) > th3$ $A > th2$ and $B > th2$ where max (A, B) denotes A or B, whichever is the greater, and min (A, B) denotes A or B, whichever is the smaller. If such determination is made for each area, several groups of areas strong in the combination degree are produced. In the example, only adjacent areas are seen for determination, but a distribution of the frequencies of areas can also be seen for making any determination for grouping.

Next, at step S243, the position groups are combined between adjacent division color areas. In this case, if the position groups overlap each other (have a common division position area) or are adjacent to each other, they may be linked to prepare an enlarged group. Whether or not colors are close to each other can be determined by the number of division color areas contained in color group, etc., as in the second embodiment.

Figure 32:
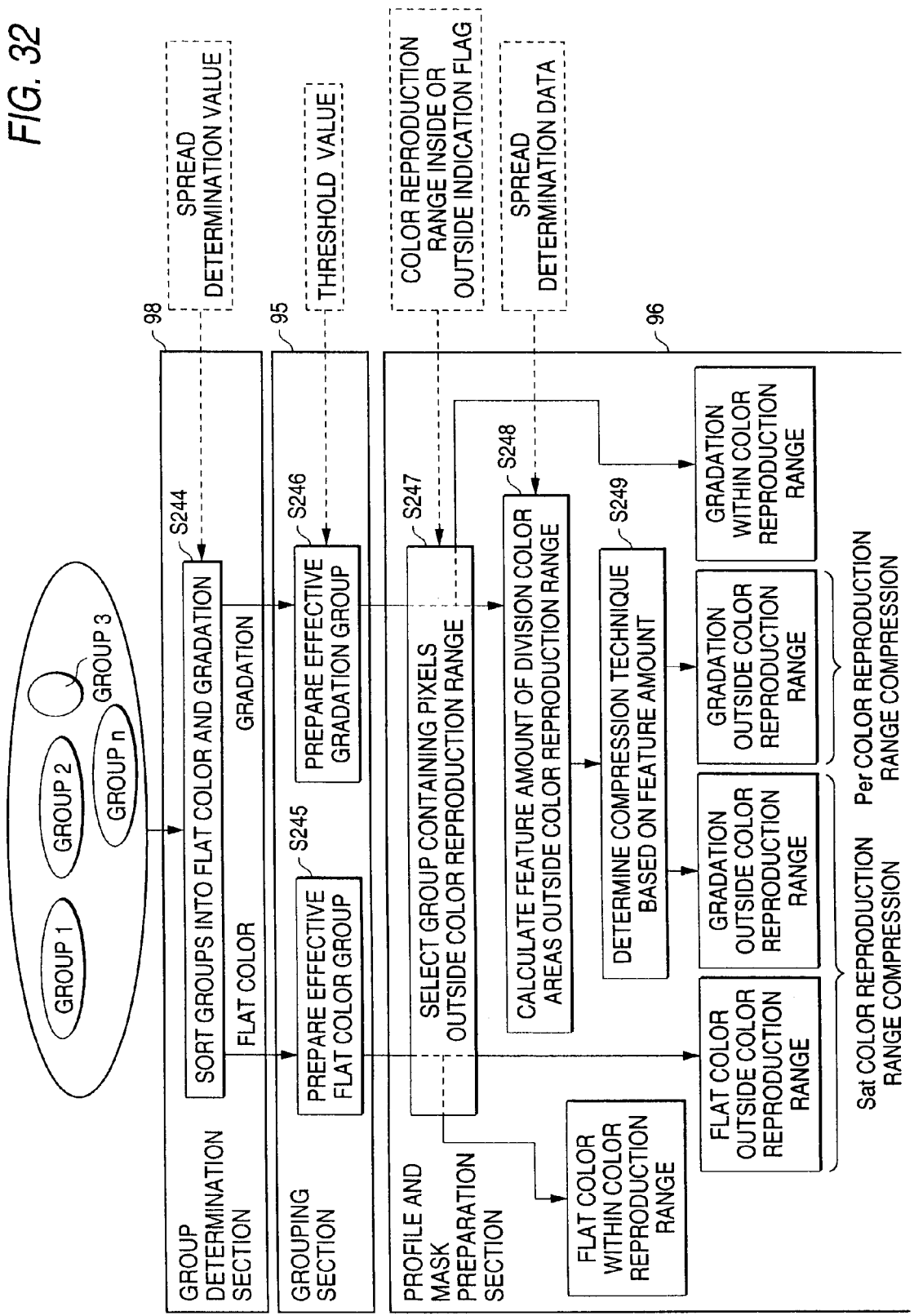
FIG. 32 is a flowchart to show a processing example from a group determination section to an intermediate point of a profile and mask preparation section in the fourth embodiment of the image processing system of the invention.

FIG. 32 is a flowchart to show a processing example from the group determination section to an intermediate point of the profile and mask preparation section in the fourth embodiment of the image processing system of the invention. At step S244, the group determination section 98 determines whether each color group is flat color or gradation, for example, by the number of division color areas belonging to the color group. That is, if the number of division color areas is one, the color group may be determined to be flat color; if the number of division color areas is two or more, the color group may be determined to be gradation.

Next, the grouping section 95 groups them for facilitating the subsequent processing. For example, the same flat colors different in position become different color groups. However, such groups are collected as one effective flat color group at step S245 because the necessity for changing the color reproducibility depending on the position information difference is judged to be small for flat color. At step S246, similar processing is performed for gradation to prepare an effective gradation group. For example, the same color conversion may be used for similar color groups different in position.

The profile and mask preparation section 96 first selects a color group containing pixels outside the color reproduction range from among color groups and performs processing for the selected color group. If the number of pixels outside the color reproduction range is small, it is considered that the number of pixels may be represented reasonably and that it will have a small effect on an image. Therefore, one threshold value is used and only when the number of pixels outside the color reproduction range is equal to or greater than the threshold value, color reproduction range compression processing may be performed.

For flat color, Sat color reproduction range compression is performed for the group determined to be outside the color reproduction range. At the subsequent steps, a color reproduction range compression method is determined for the group determined to be gradation containing pixels outside the color reproduction range. One color group may contain separate portions outside the color reproduction range. For example, assume that color group G contains two portions outside the color reproduction range, A and B. In this case, separate processing is performed for the two portions outside the color reproduction range, A and B, of the color group G.

For the group determined to be gradation containing division color areas outside the color reproduction range, the feature amount indicating how the division color areas outside the color reproduction range are distributed is calculated at step S248. Specifically, dispersion in the L, C, and H directions of the division color areas outside the color reproduction range is found or how many division color areas are spread is checked for finding the spread degree, and at step S249, how the division color areas outside the color reproduction range are distributed is determined according to the values for selecting either Sat or Per compression processing for gradation.

To determine the distribution situation, it may be desired to change the determination criterion depending on the color. To do this, such data containing the threshold values responsive to colors, such as spread determination data, may be held in the data holding section 81 for use in calculation of the feature amount.

As described above, groups can be sorted into flat color and gradation within the color reproduction range and those outside the color reproduction range and for gradation outside the color reproduction range, further the groups can be sorted into groups undergoing Sat compression processing and those undergoing Per compression processing by the first half processing of the profile and mask preparation section 96.

Figure 33:
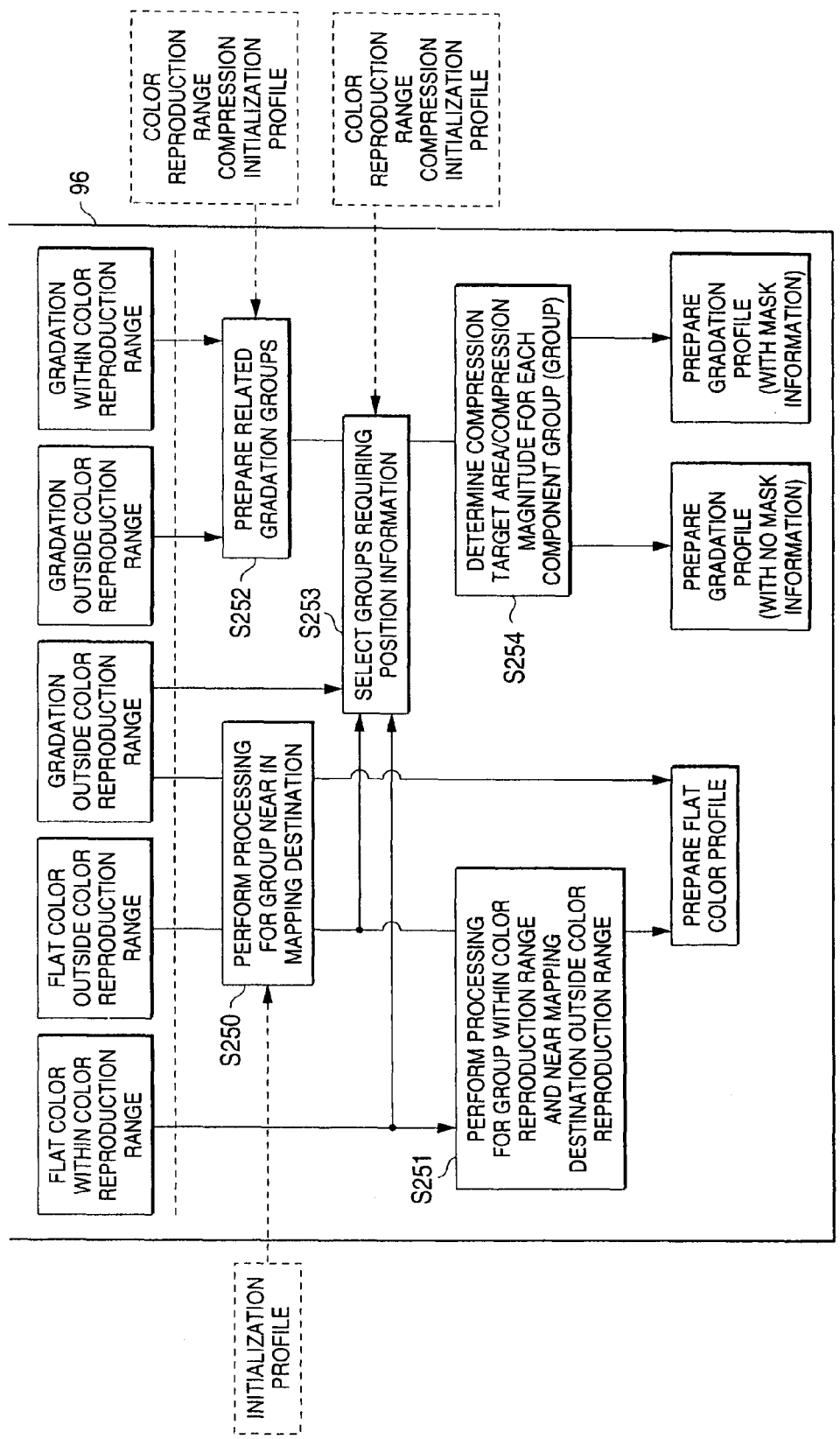
FIG. 33 is a flowchart to show a processing example from the intermediate point to the last of the profile and mask preparation section in the fourth embodiment of the image processing system of the invention.

FIG. 33 is a flowchart to show a processing example from the intermediate point to the last of the profile and mask preparation section in the fourth embodiment of the image processing system of the invention. First, Sat compression processing will be discussed. This Sat compression processing is similar to that in the second embodiment. Steps S250 and S251 are the same as steps S177 and S178 in FIG. 17.

Next, Per compression processing will be discussed. This Per compression processing is also similar to that in the second embodiment. Steps S252 and S254 correspond to steps S179 and S180 in FIG. 17. At step S252, related gradation groups are prepared. Actual Per compression processing is to be performed for the related gradation groups prepared here. To this stage, position information is held for gradation for considering that even the same color may undergo both Sat processing and Per processing. At step S253, whether or not a related gradation group actually requiring the position information exists is checked.

It may be determined by checking whether or not the division color area affected by Sat compression processing overlaps the division color area affected by Per compression processing. Basically, if the division color areas overlap each other, another profile may be provided because Per compression processing is performed using mask information at the later color conversion time. If the percentage of the overlap division color areas is equal to or less than a threshold value, it may be assumed that the division color areas do not overlap, and mask information may be discarded. Thus, groups are sorted into those requiring mask information and those requiring no mask information and position information may be erased for the groups requiring no mask information.

At step S254, the compression magnitude is determined and a profile is prepared for each related gradation group or each component group with the related gradation group or component groups as the Per compression processing target. At this time, different profiles are prepared for the related gradation groups or component groups determined to use mask information at step S253. One profile is applied to the related gradation groups or component groups determined to require mask information.

Thus, a flat color profile is prepared for flat color or gradation for which Sat compression processing can be performed, and a gradation profile using no mask information and one or more gradation profiles using mask information are prepared for gradation for which Per compression processing is performed.

To use mask information, not all profiles need to be provided. Only the portion necessary as the difference from the profiles with no mask information may be provided.

Figure 34:
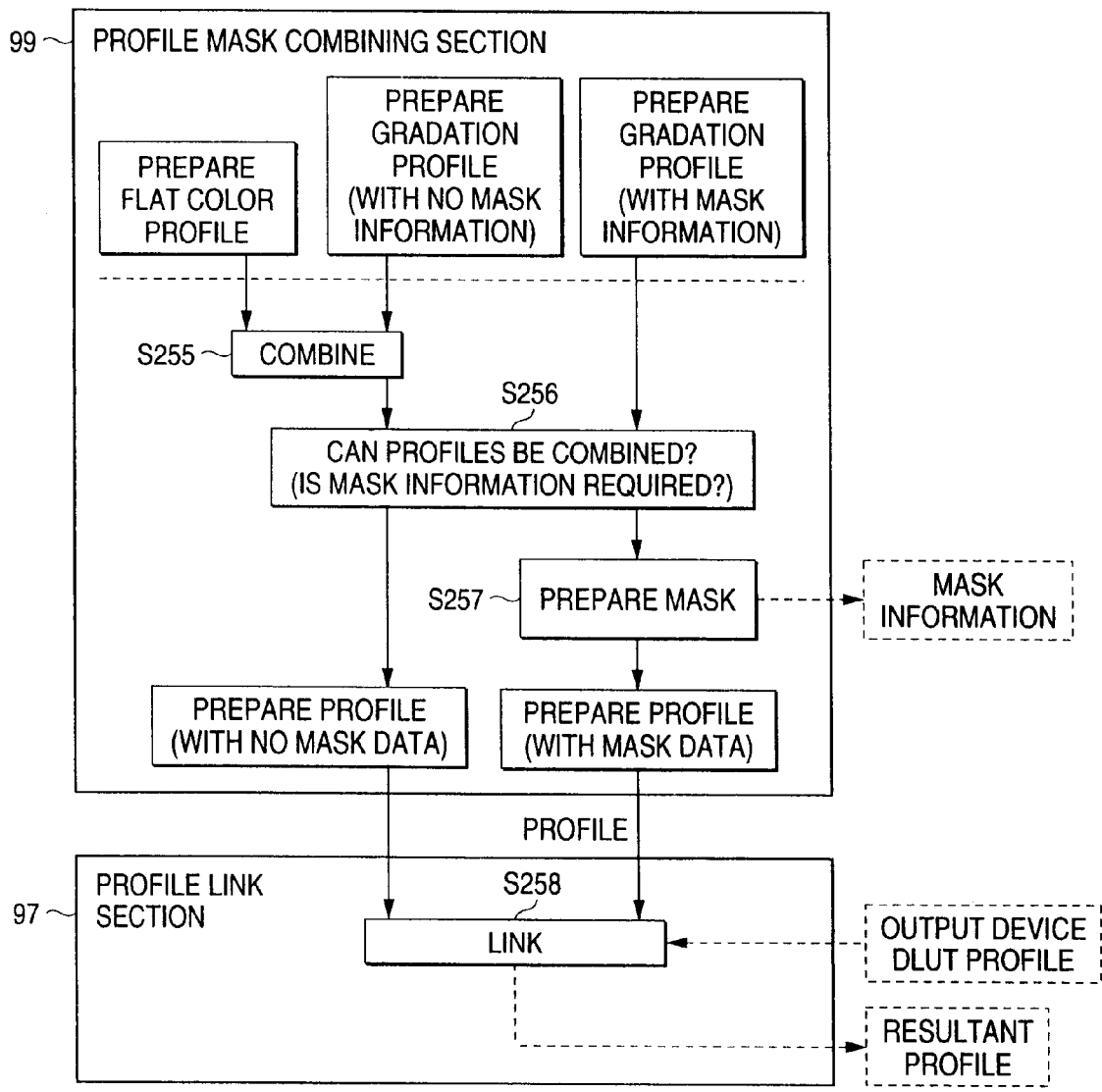
FIG. 34 is a flowchart to show a processing example from a profile mask combining section to a profile link section in the fourth embodiment of the image processing system of the invention.

FIG. 34 is a flowchart to show a processing example from the profile mask combining section to the profile link section in the fourth embodiment of the image processing system of the invention. At step S255, the profile mask combining section 99 combines a flat color direct look-up table profile prepared in Sat compression processing and a gradation direct look-up table profile using no mask information prepared in Per compression processing into one profile because the profiles do not overlap.

Further, the profile mask combining section 99 attempts to combine the resultant direct look-up table profile and a gradation direct look-up table profile having mask information. That is, it determines whether or not mask information is required actually for the gradation direct look-up table profile requiring mask information. For example, although it is determined at step S253 that mask information is required, if the actually prepared direct look-up table profile is compared with a direct look-up table profile with no mask information, they may be almost the same. In such a case, the direct look-up table profiles are combined and mask information is erased.

For the gradation direct look-up table profile determined to require mask information at step S256, mask data in the bit map format is prepared from the corresponding mask information at step S257, or mask data with numeric information or the like for selecting a direct look-up table profile to use, prepared for each pixel is prepared based on a number of mask information pieces.

The direct look-up table profile requiring no mask data and the gradation direct look-up table profile requiring mask data are thus prepared. More than one gradation direct look-up table profile requiring mask data may be prepared.

At step S258, the profile link section 97 links each of the direct look-up table profile requiring no mask data and the gradation direct look-up table profile requiring mask data prepared by the profile mask combining section 99 with a profile for executing color conversion responsive to the color space of the image output device 7. For example, if the profile mask combining section 99 prepares an LCH-to-LCH direct look-up table profile and the image output device 7 uses the CMYK color space, an LCH-to-CMYK direct look-up table profile for color space conversion held in the image output device 7 and the LCH-to-LCH direct look-up table profile prepared by the profile mask combining section 99 are linked to prepare an LCHto-CMYK direct look-up table profile containing color reproduction range compression processing. When two or more profiles are output from the profile mask combining section 99, each of the profiles is linked with the profile for the image output device 7.

The one or more resultant profiles are set in direct look-up tables 5l–5N. Mask data is input to the selector 10, any of the direct look-up tables 5l–5N is selected according to the input mask data, and input image data is set in the selected direct look-up table, whereby color reproduction range compression processing is performed for the input image data and color value converted into the color space for the image output device 7 is output.

Figure 35:
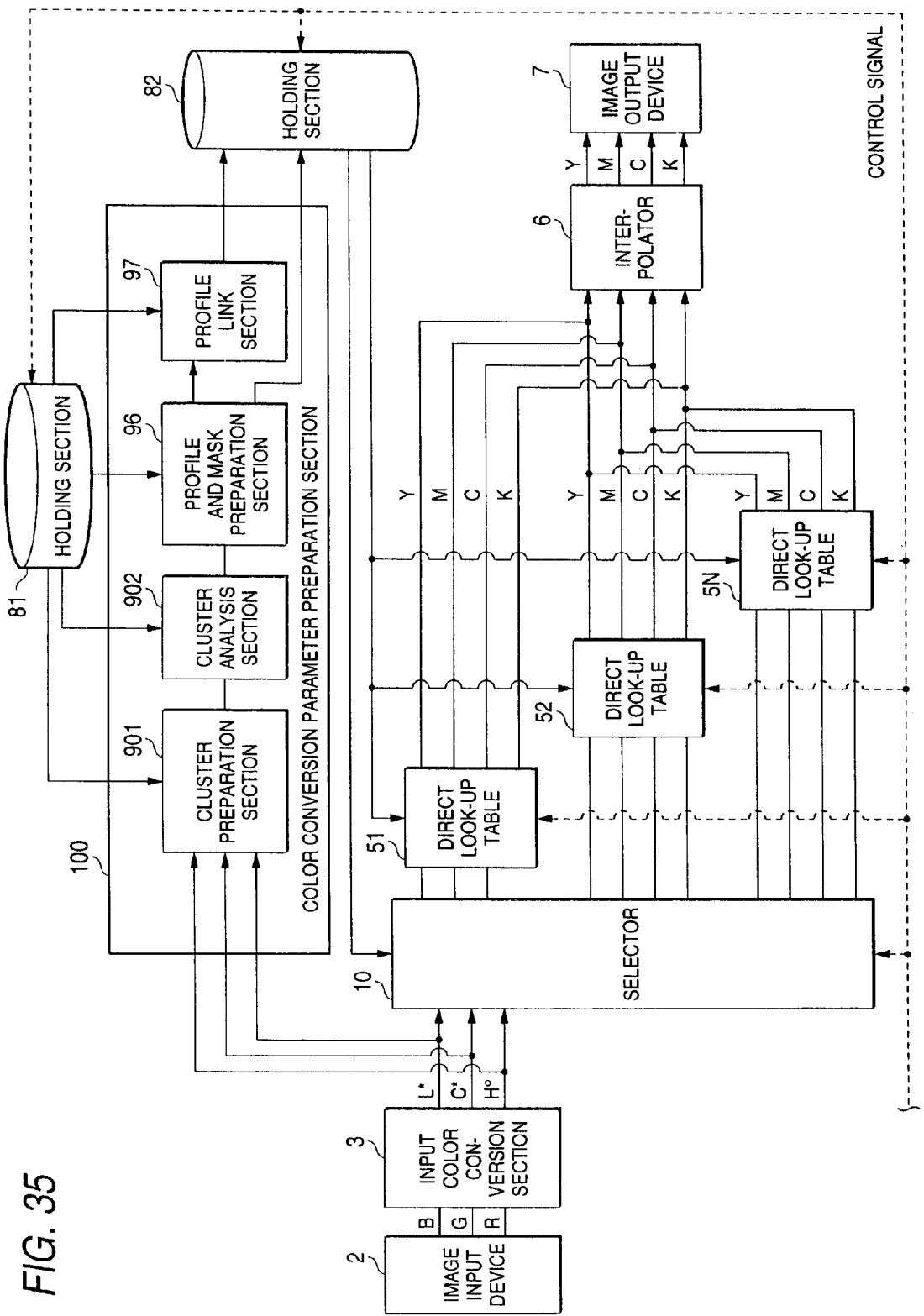
FIG. 35 is a block diagram to show a fifth embodiment of the image processing system of the invention.

FIG. 35 is a block diagram to show a fifth embodiment of the image processing system of the invention. Parts identical with or similar to those previously described with reference to FIG. 22 are denoted by the same reference numerals in FIG. 35 and will not be discussed again. Numeral 901 is a cluster preparation section and numeral 902 is a cluster analysis section. In the fifth embodiment like the third embodiment, position information as well as color value is used for grouping; a position group is formed using pixel values in pixel units, whereby a more adaptive group can be prepared. To distinguish from the division position areas in the third embodiment, position groups in pixel units will be hereinafter called "clusters".

The fifth embodiment is almost the same as the third embodiment in the general configuration of the system and the generation operation. A color conversion parameter preparation section 100 has a cluster preparation section 901, a cluster analysis section 902, a profile and mask preparation section 96, and a profile link section 97.

The cluster preparation section 901 extracts a cluster in an image space, made up of pixels having similar features from an input image. The cluster analysis section 902 recognizes a color distribution in each cluster extracted by the cluster preparation section 901 and generates a color group. The profile and mask preparation section 96 prepares a profile to be set in one of direct look-up tables 5l–5N based on the color group generated by the cluster analysis section 902 for each cluster extracted by the cluster preparation section 901. The profile link section 97 links the profile prepared by the profile and mask preparation section 96 and a profile to be output to an image output device 7 together to prepare a new profile for each cluster.

Figure 36:
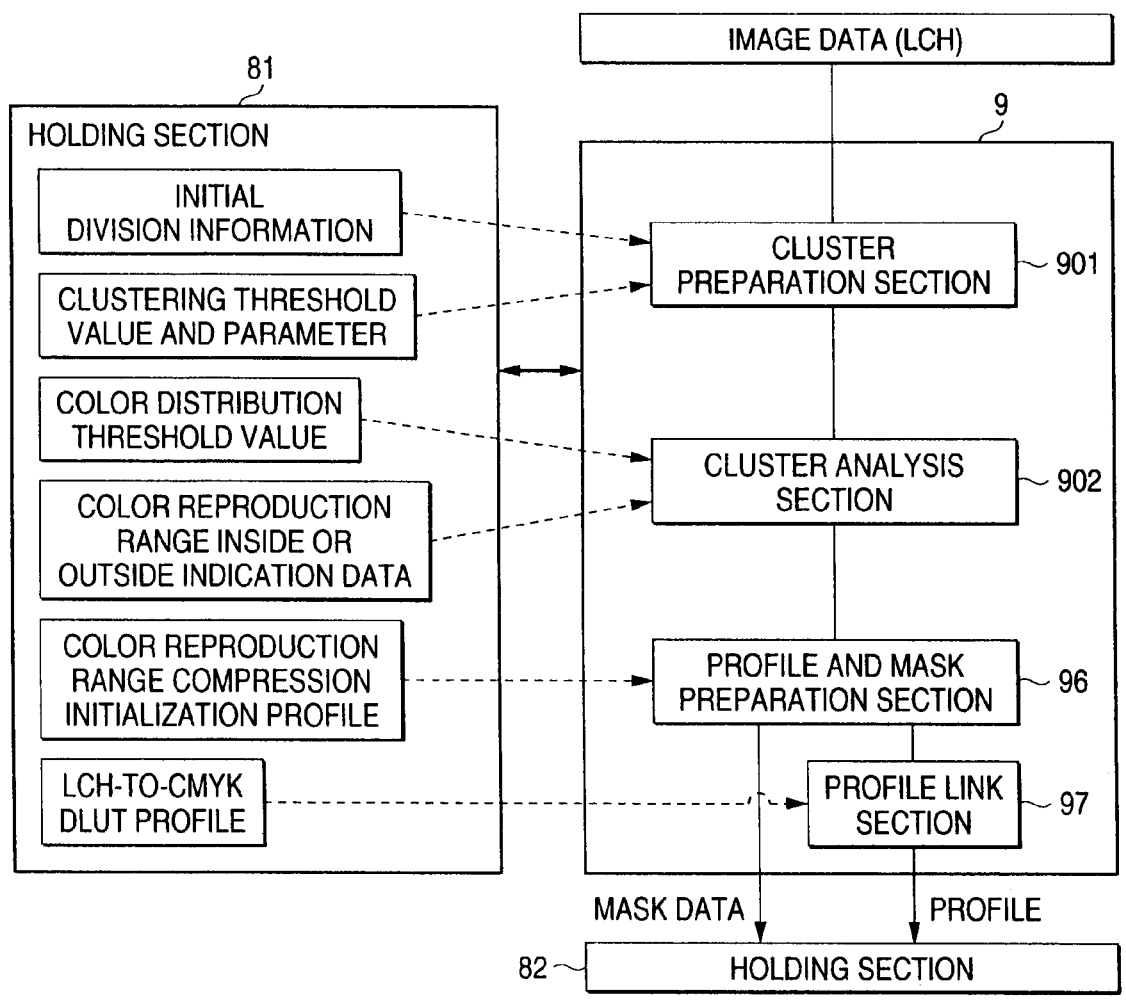
FIG. 36 is an illustration of an operation example of a color conversion parameter preparation section 100 in the fifth embodiment of the image processing system of the invention.

FIG. 36 is an illustration of an operation example of the color conversion parameter preparation section 100 in the fifth embodiment of the image processing system of the invention. It also shows data in a holding section 81 used together with the processing sections of the color conversion parameter preparation section 100.

Image data input through an image input device 2 undergoes conversion processing of RGB color space to LCH color space in an input color conversion section 3 and is input to the color conversion parameter preparation section 100. Here, conversion of the RGB color space to the LCH color space is executed, thus image data and pixel values used in the description to follow are each made up of three elements of L, C, and H.

The cluster preparation section 901 extracts a set of pixels having similar features as a cluster. The features used here are three coordinate values in the color space (L, C, and H) and two coordinate values in the position space (X and Y). In the invention, the features used are not limited to the five (L, C, H, X, and Y) and any number of features of any types may be used if they contain features concerning colors.

Extraction processing of a set of pixels having similar features can be carried out by clustering. For example, non-hierarchical clustering, so-called "K-mean method", shown on "Gazou kaiseki handbook" (Tokyo Daigaku Shuppankai) p. 648–651 can be used. Here, examples using the K-mean method will be discussed, but the invention is not limited to the method and any method may be used if it is a method capable of extracting a set of pixels having similar features on an image plane.

Figure 37:
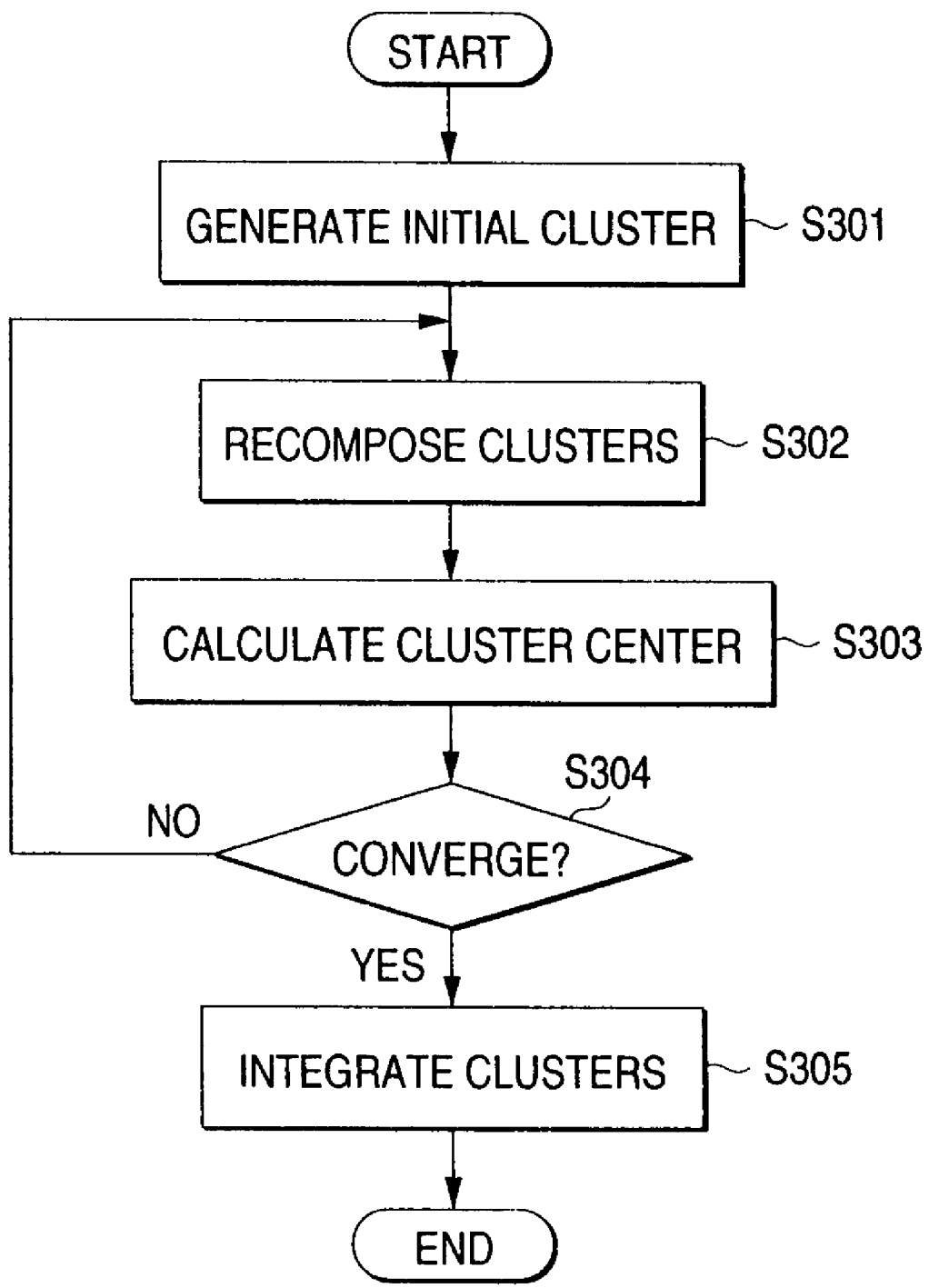
FIG. 37 is a flowchart to show an operation example of a cluster preparation section 901 in the fifth embodiment of the image processing system of the invention.

FIG. 37 is a flowchart to show an operation example of the cluster preparation section 901 in the fifth embodiment of the image processing system of the invention. First, at step S301, an initial cluster is generated. Here, it is generated using initial division information previously entered in the holding section 81. For example, an initial cluster of a square with 10 pixels on one side can be generated. When the initial cluster is generated, the cluster center used for relocation of pixels is calculated. Various cluster center calculation methods, such as a median method and a force placement method, are also available. Any method may be adopted; here, as an example, the average value of coordinate values in the color space of pixels belonging to each cluster (L, C, and H) and coordinate values in the position space (X and Y) is used as the cluster center.

At step S302, which cluster each pixel belongs to is checked for all pixels and clusters are recomposed. Here, to check which cluster each pixel belongs to, a weighted distance between the target pixel and the center of every cluster in the five-dimensional feature space consisting of L, C, H, X, and Y is calculated. For efficient processing, the weighted distance between the target pixel and each of only the cluster centers in the proximity of the target pixel rather than all cluster centers may be calculated.

Weighted distance Di between target pixel T and cluster center Mi ($1 \leq i \leq$ total number of clusters) can be calculated as $$Di = \sqrt{(a\ (LT-LMi)^2 + b(CT"CMi)^2 + c(HT-HMi)^2 + d\ (XT-XMi)^2 + e(YT-YMi)^2)}$$

where (LT, CT, HT, XT, YT) are coordinates of the target pixel T on the five-dimensional feature space consisting of L, C, H, X, and Y, (LMi, CMi, HMi, XMi, YMi) are coordinates of the cluster center Mi on the five-dimensional feature space consisting of L, C, H, X, and Y, and a, b, c, d, and e are weighted coefficients for L, C, H, X, and Y respectively. The group to be generated can be adjusted by setting the weighted coefficients appropriately. For example, if c is made comparatively large and d and e are set to comparatively small values, clusters can be composed as one group although they are a little distant from each other on the position space if they are close to each other in hue.

The clusters are recomposed so that the target pixel belongs to the cluster with the smallest weighted distance. Further, if the smallest weighted distance between one pixel and the cluster center is greater than a preset threshold value, a new cluster containing only the one pixel may be generated to prepare a more appropriate group.

At step S303, the cluster center of each of the clusters recomposed at step S302 is calculated by a method similar to that used at step S301.

At step S304, whether or not the clusters are changed at the cluster recomposing executed at step S302 is checked. If the clusters are not changed, the recomposing is assumed to converge, and control goes to step S305. If the clusters are changed, control returns to step S302 at which the process is repeated.

If the cluster center of adjacent clusters is smaller than a preset threshold value, the clusters are integrated at step S305. From the clusters thus provided, unique cluster numbers and mask information of pixel sets belonging to the clusters corresponding to the cluster numbers are generated and passed to the cluster analysis section 902. The cluster numbers and mask information can also be passed via a temporary work storage to the cluster analysis section 902 rather than passed directly thereto.

Referring again to FIG. 36, the cluster analysis section 902 recognizes color distributions in the clusters prepared by the cluster preparation section 901 and generates a color group. In the example, each cluster is sorted into gradation or flat color depending on whether the pixels in the cluster disperse or concentrate on the color space. Whether the pixels in the cluster disperse or concentrate on the color space can be determined by checking whether or not dispersion of pixel values in the cluster (L, C, H) is greater than a preset threshold value of color distribution or checking whether or not the size of the convex space that the pixel values in the cluster (L, C, H) occupy on the color space is greater than a preset threshold value. Further, whether or not each cluster prepared by the cluster preparation section 901 contains pixels outside the color reproduction range is checked. If the cluster contains pixels outside the color reproduction range, information indicating that the cluster contains pixels outside the color reproduction range is added to the cluster.

Figure 38:
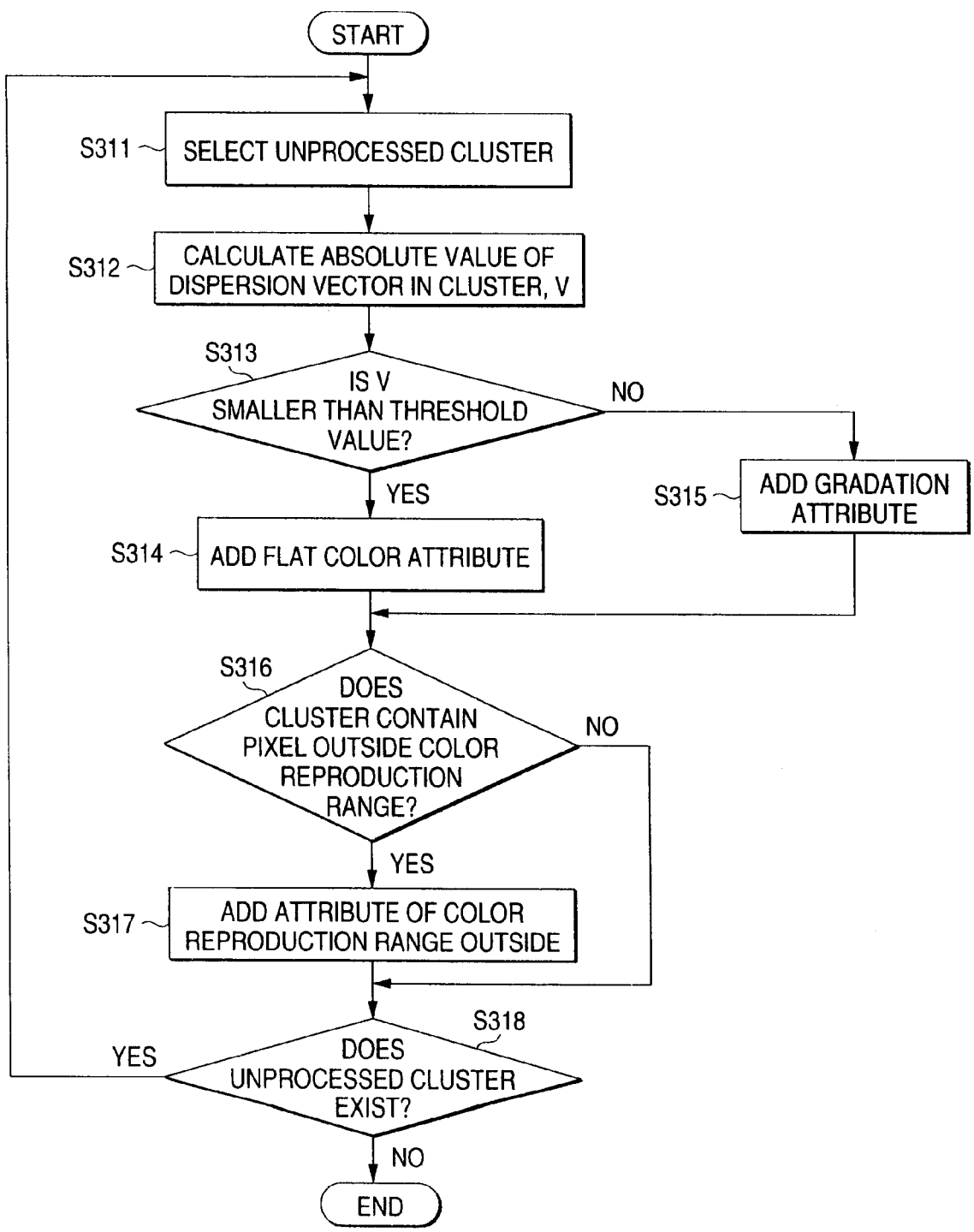
FIG. 38 is a flowchart to show an operation example of a cluster analysis section 902 in the fifth embodiment of the image processing system of the invention.

FIG. 38 is a flowchart to show an operation example of the cluster analysis section 902 in the fifth embodiment of the image processing system of the invention. First, at step S311, a cluster with the color distribution not recognized is selected as a target cluster. The subsequent steps S312 to S317 are applied to the selected target cluster.

At step S312, dispersion of the pixel values of the pixels belonging to the target cluster (in this case, L, C, and H) is calculated to find the absolute value of a dispersion vector, V. At step S313, the absolute value of the dispersion vector calculated at step S312, V, is compared with a preset threshold value of color distribution, and if the absolute value of the dispersion vector, V, is smaller than the threshold value, the color distribution in the target cluster is assumed to be flat color and control branches to step S314; if the absolute value of the dispersion vector, V, is not smaller than the threshold value, the color distribution in the target cluster is assumed to be gradation and control branches to step S315. At step S314, a flat color attribute is given to the target cluster. At step S315, a gradation attribute is given to the target cluster.

At step S316, whether or not the cluster contains a pixel outside the color reproduction range is checked on color reproduction range inside or outside indication data preset in the holding section 81. If the cluster contains a pixel outside the color reproduction range, an attribute of color reproduction range outside is added to the target cluster at step S317. If the cluster does not contain a pixel outside the color reproduction range, step S317 is skipped. At step S318, whether processing for all clusters is complete is determined. If an unprocessed cluster remains, control returns to step S311 at which the process is repeated. If processing for all clusters is complete, the processing of the cluster analysis section 902 is completed.

Referring again to FIG. 36, the profile and mask preparation section 96 prepares a profile appropriate for the target cluster depending on whether the color distribution in the cluster recognized by the cluster analysis section 902 is flat color or gradation. Profile preparation processing for the cluster to which the flat color attribute is added is similar to that in the first embodiment; for example, the profile can be prepared according to the flowchart shown in FIG. 7, for example. Here, a common profile to all clusters to which the flat color attribute is added is prepared. Profile preparation processing for the cluster to which the gradation attribute is added is also similar to that in the first embodiment; for example, the profile can be prepared for each cluster according to the flowchart shown in FIG. 9, for example.

As in the third embodiment, mask information related to each profile is also prepared. If a profile is prepared for each cluster, the mask information prepared by the cluster preparation section 901 may be used intact. For example, if a common profile to the clusters to which the flat color attribute is added is used, mask information related to each profile is prepared and output from the mask information prepared by the cluster preparation section 901.

The profile link section 97 can link each of the profile prepared from flat color by the profile and mask preparation section 96 and the profiles for each cluster prepared from gradation with a profile for an image output device 7 to prepare a final profile, for example, according to the flowchart shown in FIG. 29, as in the third embodiment.

One flat color profile and more than one gradation profile thus prepared are held in a holding section 82 and are set in direct look-up tables 5l–5N. The mask information in the position space related to each profile is also held in the holding section 82 and is sent to a selector 10. The selector 10 selects a direct look-up table for inputting a pixel according to the mask information and sends the pixel values of the pixel (L, C, H). Table values provided from any of the direct look-up tables 5l–5N are interpolated by an interpolator 6 and are transmitted to the image output device 7 for forming an image.

Figure 39:
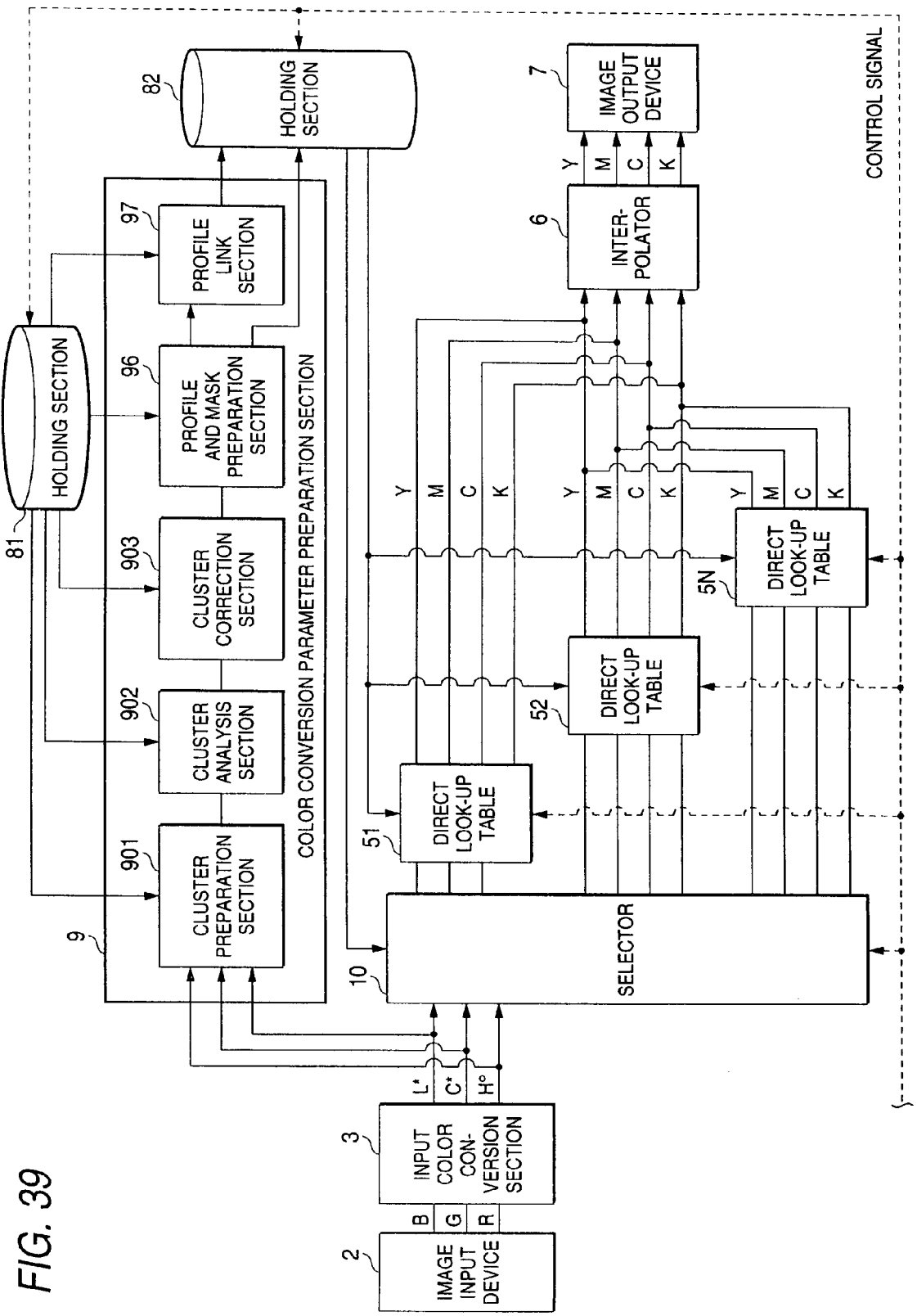
FIG. 39 is a block diagram to show a sixth embodiment of the image processing system of the invention.

FIG. 39 is a block diagram to show a sixth embodiment of the image processing system of the invention. Parts identical with or similar to those previously described with reference to FIG. 35 are denoted by the same reference numerals in FIG. 39 and will not be discussed again. Numeral 903 is a cluster correction section. In the sixth embodiment, clusters are composed as in the fifth embodiment, then corrected to a more appropriate pixel set. The sixth embodiment is almost the same as the fifth embodiment in the general configuration of the system and the generation operation. A color conversion parameter preparation section 100 has a cluster preparation section 901, a cluster analysis section 902, a cluster correction section 903, a profile and mask preparation section 96, and a profile link section 97.

The cluster correction section 903 uses the analysis result of the cluster analysis section 902 and the color distribution relation between clusters to correct clusters prepared by the cluster preparation section 901. The profile and mask preparation section 96 prepares a profile to be set in one of direct look-up tables 5l–5N based on the color distribution for each cluster corrected by the cluster correction section 903.

Figure 40:
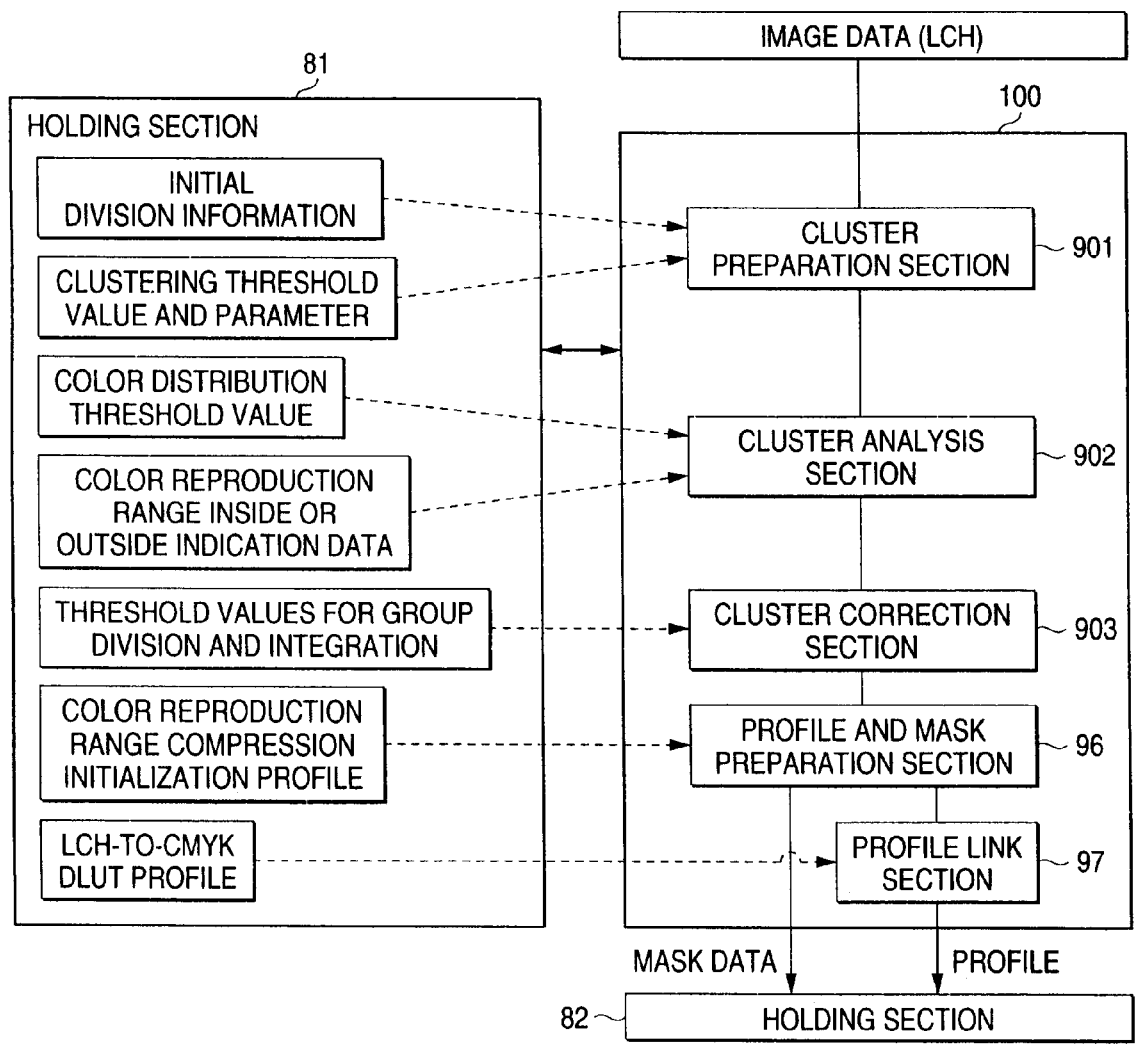
FIG. 40 is an illustration of an operation example of a color conversion parameter preparation section 100 in the sixth embodiment of the image processing system of the invention.

FIG. 40 is an illustration of an operation example of the color conversion parameter preparation section 100 in the sixth embodiment of the image processing system of the invention. It also shows data in a holding section 81 used together with the processing sections of the color conversion parameter preparation section 100. Image data input through an image input device 2 undergoes conversion processing of RGB color space to LCH color space in an input color conversion section 3 and is input to the color conversion parameter preparation section 100.

The cluster preparation section 901 extracts a set of pixels having similar features to prepare a cluster. This cluster preparation processing may be similar to that in the fifth embodiment. Here, for efficient processing, an example is given wherein a set of pixels having similar features is extracted using a K-mean method with areas generated by a separation and integration method as initial division areas. This example can also be applied to the fifth embodiment. The features used in the example are three coordinate values in the color space (L, C, and H) and two coordinate values on an image plane (X and Y), but not limited to the five values.

Figure 41:
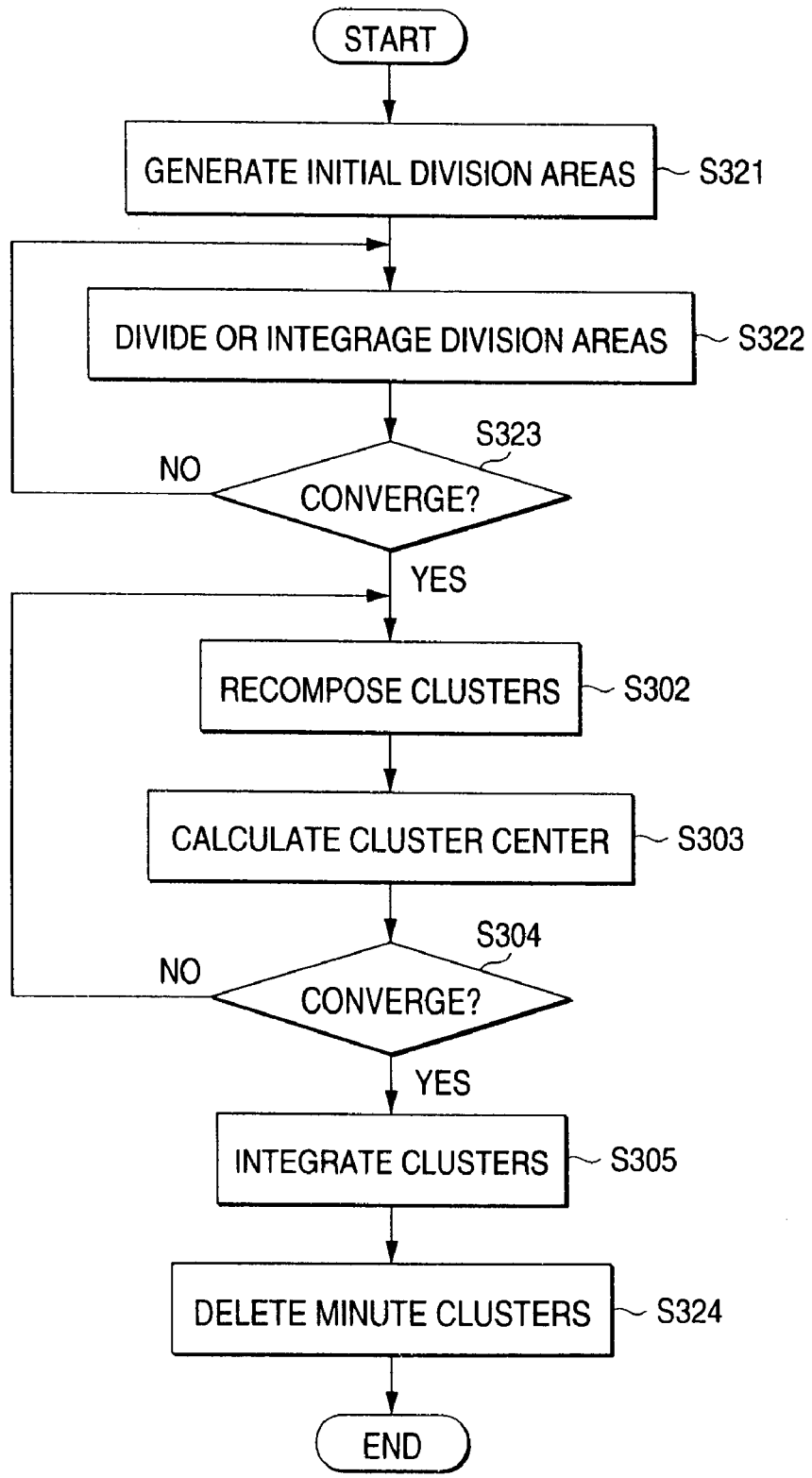
FIG. 41 is a flowchart to show an operation example of a cluster preparation section 901 in the sixth embodiment of the image processing system of the invention.

FIG. 41 is a flowchart to show an operation example of the cluster preparation section 901 in the sixth embodiment of the image processing system of the invention. Steps identical with those previously described with reference to FIG. 37 are denoted by the same step numerals in FIG. 41 and will not be discussed again. First, at step S321, initial division information is used to divide an input image for generating initial division areas. For example, assuming that a value indicating 16 divisions (divide by 16) is set in the holding section 81 as the initial division information, the input image can be divided into 16 parts in longitudinal and lateral directions to generate a total of 256 initial division areas of rectangles.

At step S322, an average and dispersion of values of pixels (L, C, H) in each division area are found and if the dispersion is greater than a predetermined clustering threshold value, the division area is furthermore divided. If the average difference between adjacent division areas is smaller than a predetermined threshold value, dispersion of the division areas is calculated and if the dispersion is smaller than a predetermined threshold value, the division areas are integrated.

At step S323, a check is made to see if step S322 results in neither integration nor division of division areas, namely, whether or not convergence occurs is determined. If convergence occurs, step S302 is executed. If division area integration or division occurs, step S322 is repeated. Limitation may be placed on dividing of a division area executed at step S322 according to the division area size, whereby generation of extremely small division areas can be avoided and the convergence speed can be improved.

At steps S302–S305, a plurality of division areas generated at step S322 are assumed to be initial clusters and a process similar to the K-mean method described with reference to FIG. 37 in the fifth embodiment is performed.

At step S324, if the number of pixels belonging to each cluster generated at step S305 is smaller than a preset clustering threshold value, the corresponding cluster is deleted. From the fact that the number of pixels belonging to one cluster is small, it can be assumed that the pixels belonging to the cluster have a small effect on the input image. Thus, efficient processing can be accomplished without decreasing the effects of the invention by deleting the clusters. A profile in the subsequent processing is not prepared for the pixels contained in the deleted clusters, and a profile prepared in another cluster or a default cluster is used for color conversion.

Referring again to FIG. 40, the cluster analysis section 902 recognizes a color distribution in each cluster extracted by the cluster preparation section 901 and generates a color group. Although recognition of the color distribution can also be determined by the dispersion degree as in the fifth embodiment, here dispersion of pixels belonging to a cluster and the pixel value change rate between pixels belonging to the cluster are used to recognize the color distribution in the cluster. For example, if dispersion of pixels belonging to a cluster is smaller than a preset color distribution threshold value, it can be estimated that the cluster is a flat color area as almost uniform color. If the pixel value change rate between any pixels belonging to a cluster is smaller than a preset color distribution threshold value, it can be estimated that the cluster is a gradation area where pixel value change of adjacent pixels in the cluster is moderate. Such a technique may also be applied to the fifth embodiment. A histogram according to pixel values of pixels belonging to a cluster required for processing of the cluster correction section 903 is calculated. The histogram may be normalized as required.

Figure 42:
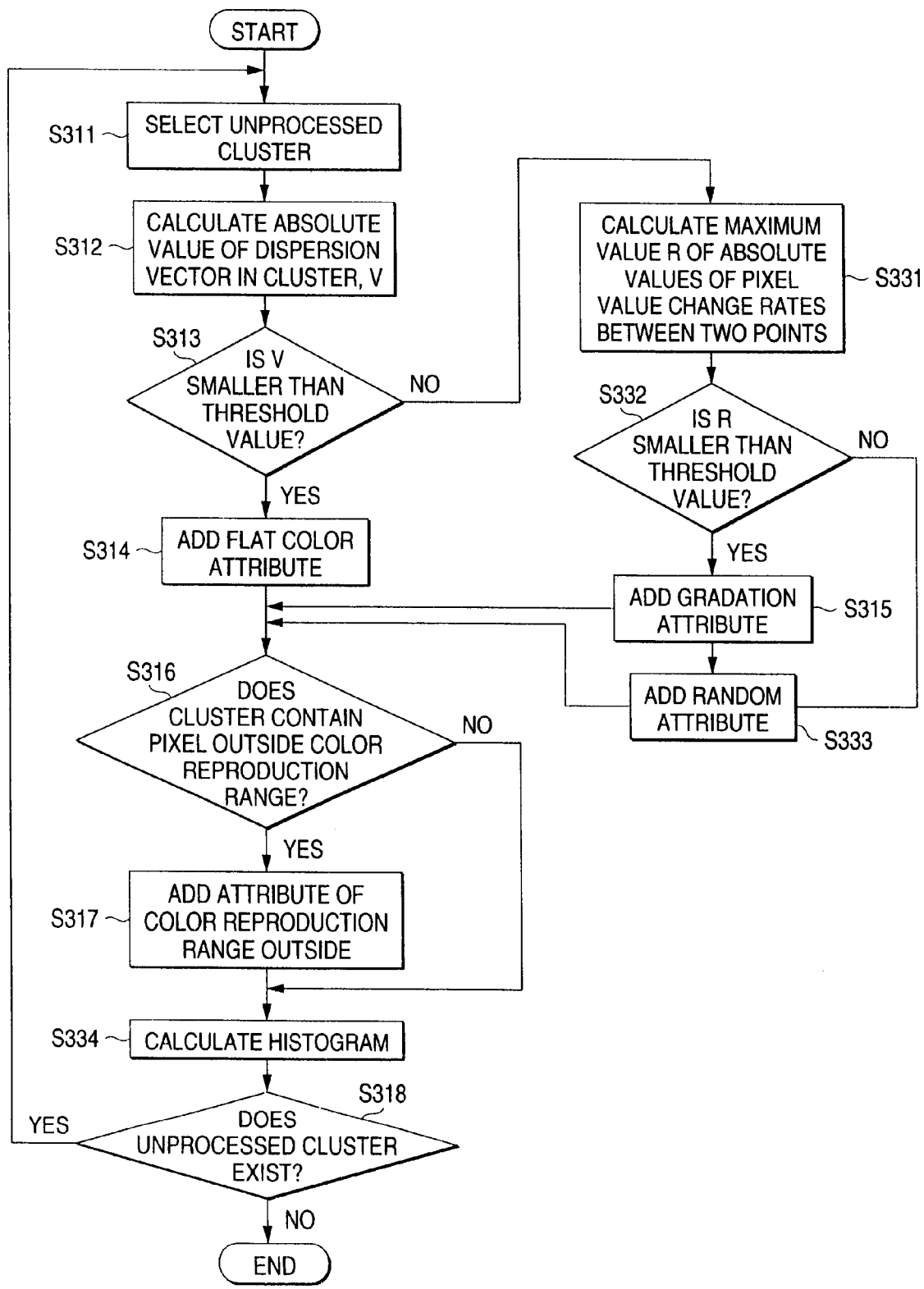
FIG. 42 is a flowchart to show an operation example of the cluster analysis section 902 in the sixth embodiment of the image processing system of the invention.

FIG. 42 is a flowchart to show an operation example of the cluster analysis section 902 in the sixth embodiment of the image processing system of the invention. Steps similar to those previously described with reference to FIG. 38 are denoted by the same step numerals in FIG. 42 and will be discussed briefly.

First, steps S311 to S314 are similar to those in the fifth embodiment. One unprocessed cluster is selected as a target cluster for the subsequent processing and a dispersion vector of pixel values (L, C, H) of pixels belonging to the target cluster is checked. If the absolute value (magnitude) of the dispersion vector is smaller than a preset color distribution threshold value, a flat color attribute is added to the selected cluster. If the absolute value of the dispersion vector is larger than the preset threshold value, step S331 is executed for a more detailed analysis.

Figure 43:
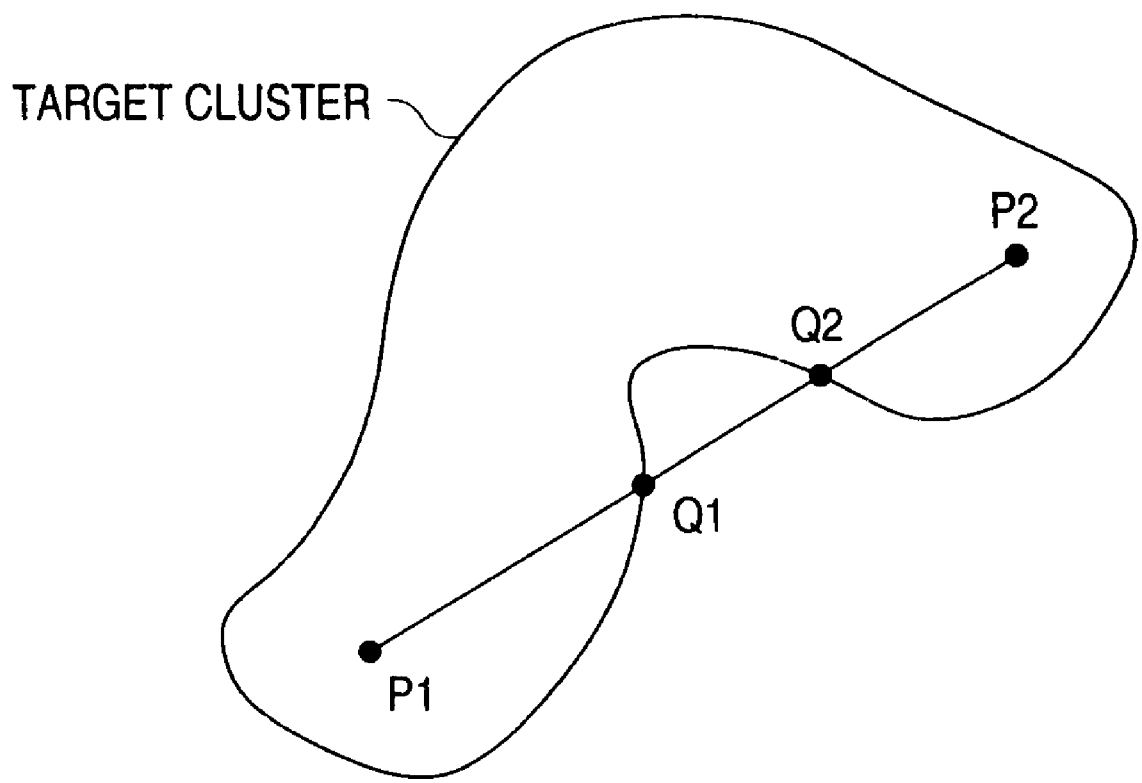
FIG. 43 is an illustration of a specific example in color distribution recognition processing of the cluster analysis section 902 in the sixth embodiment of the image processing system of the invention.
Figure 44A:
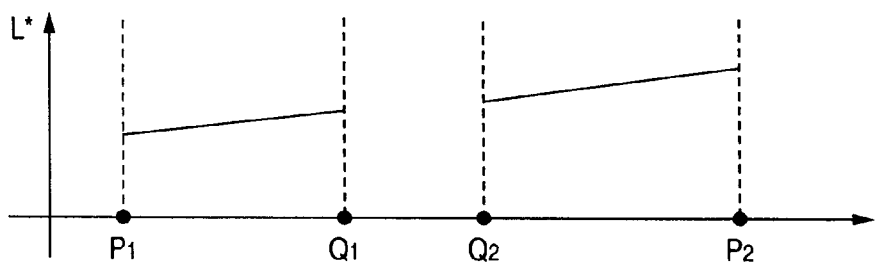
FIGS. 44a–c is graphs of pixel values in the specific example in color distribution recognition processing of the cluster analysis section 902 in the sixth embodiment of the image processing system of the invention.
Figure 44B:
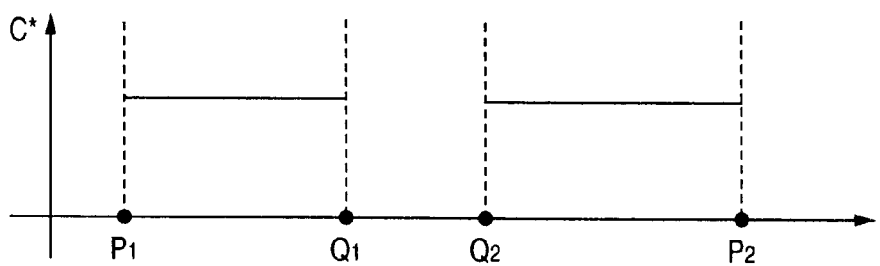
Figure 44C:
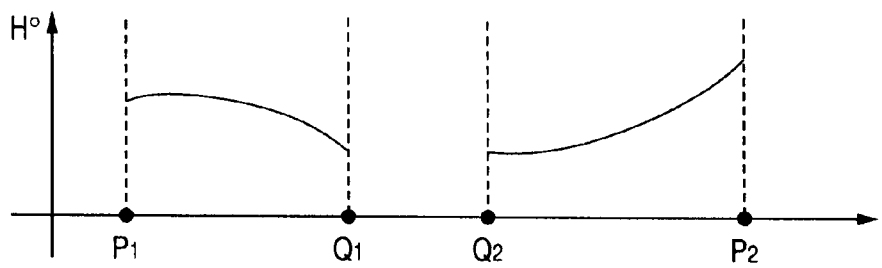

At step S331, two proper points are selected from pixels belonging to the target cluster and a string of pixels on the line connecting the two points and belonging to the target cluster is extracted. The absolute values of the change rates of continuous pixel values (L, C, and H) are calculated and the maximum values of the absolute values of the change rates are RL, RC, and RH. FIG. 43 is an illustration of a specific example in color distribution recognition processing of the cluster analysis section 902 in the sixth embodiment of the image processing system of the invention. FIG. 44 is graphs of pixel values in the specific example in color distribution recognition processing of the cluster analysis section 902 in the sixth embodiment of the image processing system of the invention. For example, when a cluster as shown in FIG. 43 is the target cluster, two proper points P1 and P2 are selected from the pixels belonging to the cluster. A string of pixels on the line connecting the two points and belonging to the target cluster, namely, a list of pixels on line segments P1Q1 and Q2P2 is extracted. FIG. 44 show graphing examples of pixel values in the pixel list order separately for L, C, and H. The absolute values of the change rates of the continuous pixel values (L, C, and H) are calculated and the maximum values of the absolute values of the change rates are RL, RC, and RH. The tangent gradient of an arbitrary point on the graph shown in FIG. 44 becomes the change rate of the point. Two points P1 and P2 can be selected in accordance with one rule or at random. More than one pair is selected and the maximum absolute values may be obtained from the change rates obtained from each pair.

At step S332, if RL, RC, and RH calculated at step S331 are smaller than preset threshold values, it is determined that the colors of the adjacent pixels in the cluster change smoothly and at step S315, a gradation attribute is added to the target cluster. If RL, RC, and RH are greater than preset threshold values, it is seen that the colors of the adjacent pixels in the cluster change largely and at step S333, a random attribute is added to the target cluster.

At step S316, whether or not the target cluster contains a pixel outside the color reproduction range is checked and if the cluster contains a pixel outside the color reproduction range, an attribute of color reproduction range outside is added to the cluster at step S317, as in the fifth embodiment.

At step S334, a pixel value histogram in the target cluster is calculated. This histogram is used in the cluster correction section 903. In the example, a one-dimensional histogram of hue (H°) is calculated. The histogram may be when it is used in the cluster correction section 903 rather than calculated at step S334.

At step S318, whether or not an unanalyzed cluster remains is checked. If an unanalyzed cluster remains, control returns to step S311 at which the process is repeated. If all clusters have been analyzed, the processing of the cluster analysis section 902 is completed.

Referring again to FIG. 40, the cluster correction section 903 again integrates and divides clusters prepared by the cluster preparation section 901 based on the color distribution recognized by the cluster analysis section 902. Since position information in the position space is considered for clustering of the cluster preparation section 901, there is a possibility that more than one cluster having a similar color distribution will be generated. Therefore, the similar color distributions at distant locations are integrated into one cluster for efficient processing of the profile and mask preparation section 96 and the profile link section 97.

For example, if two clusters have similar representative colors and the same color distribution, they can be integrated. The histograms of clusters calculated by the cluster analysis section 902 are used and if the correlation value between two histograms is greater than a predetermined threshold value, the two clusters having the histograms can also be integrated. Further, the color distribution in a cluster may be unbalanced depending on the values of weight coefficients a, b, c, d, and e of weighted distances used for the cluster preparation section 901 to recompose clusters. Therefore, the form of the histogram of pixel values belonging to each cluster is checked to see if the histogram has more than one peak, for example. If the histogram has more than one peak, the corresponding cluster can be again divided based on the values of the peak portions.

Figure 45:
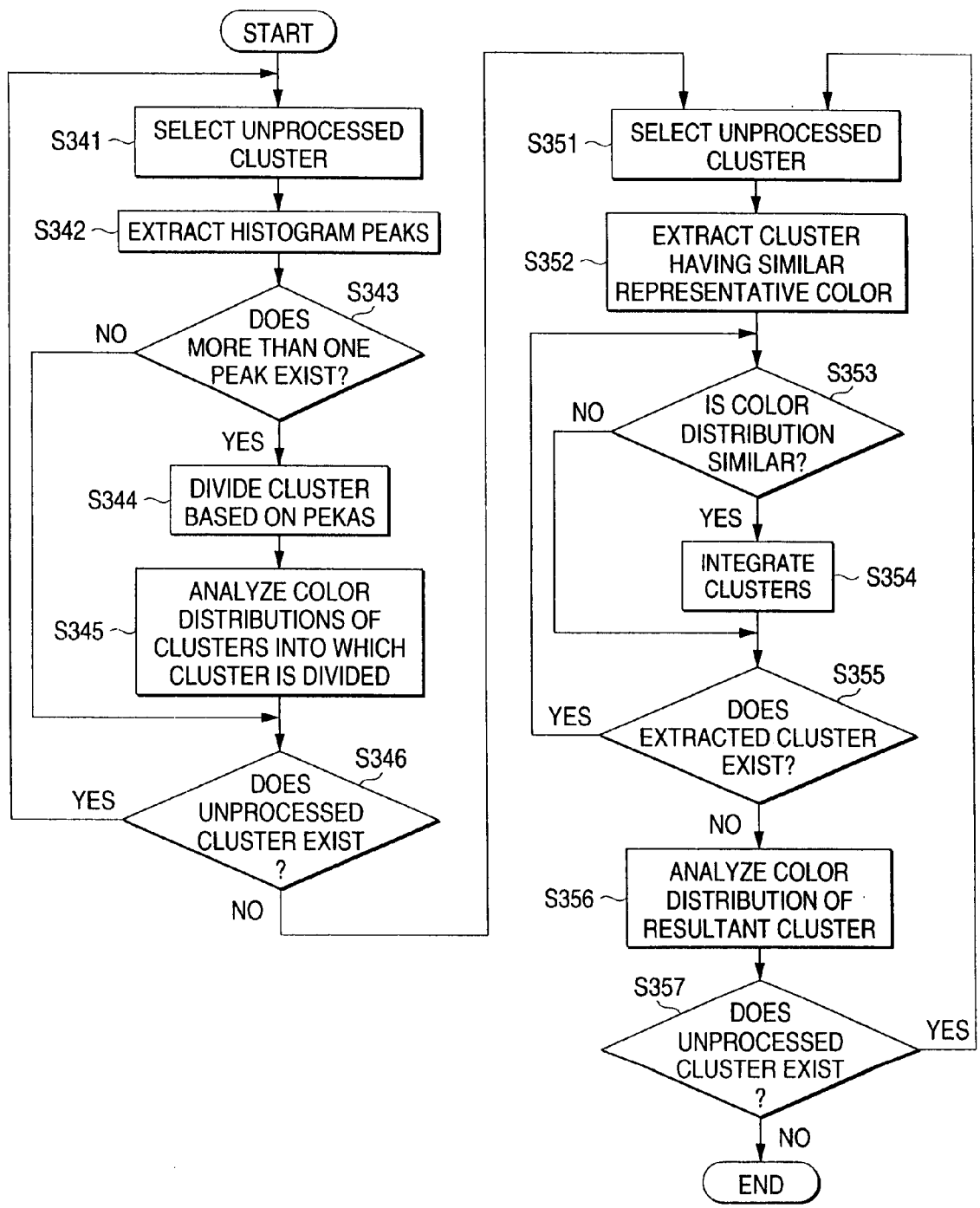
FIG. 45 is a flowchart to show an operation example of a cluster correction section 903 in the sixth embodiment of the image processing system of the invention.

FIG. 45 is a flowchart to show an operation example of the cluster correction section 903 in the sixth embodiment of the image processing system of the invention. The flowchart consists of steps S341–S346 for cluster redivision processing and steps S351–S357 for cluster reintegration processing. First, at step S341, one cluster not subjected to cluster redivision processing is selected from among clusters generated by the cluster preparation section 901.

Figure 46A:
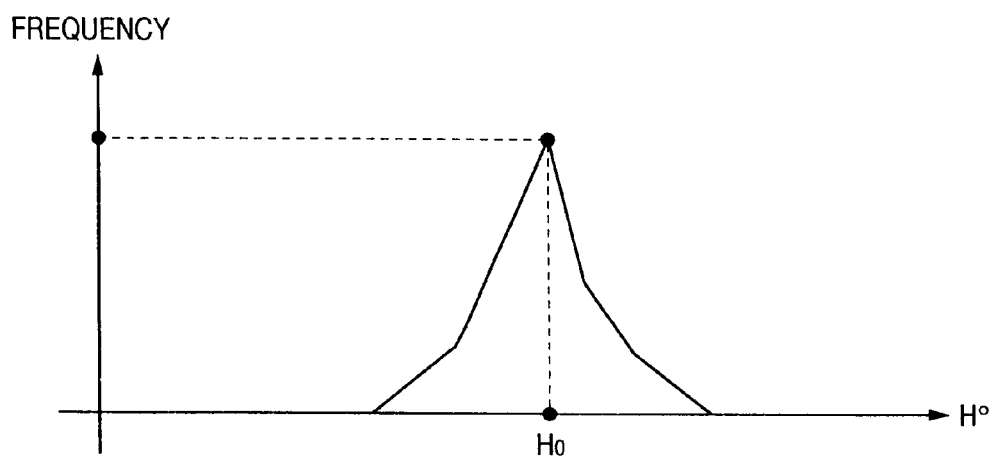
FIGS. 46a–b is graphs to show examples of histograms about hue (H) of a target cluster, calculated by the cluster analysis section 902 in the sixth embodiment of the image processing system of the invention.
Figure 46B:
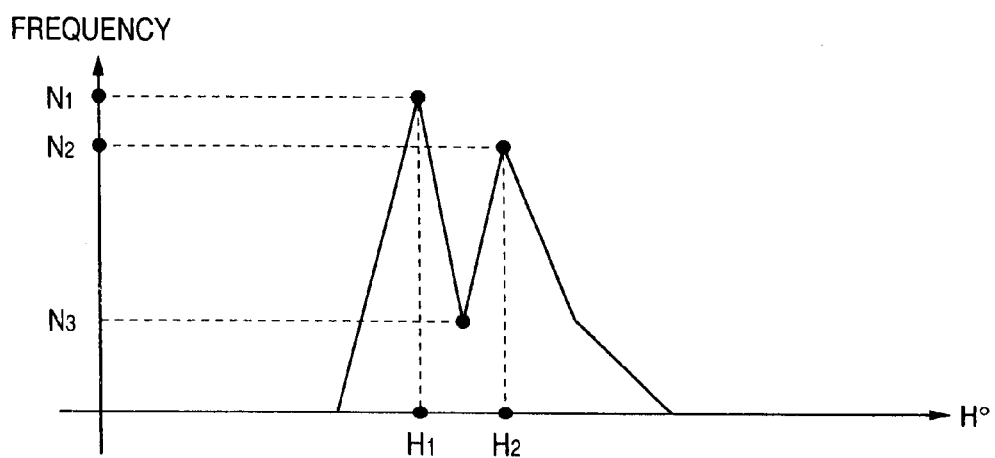

At step S342, peaks of the histogram of the selected cluster, calculated by the cluster analysis section 902 are extracted. FIG. 46 is graphs to show examples of histograms about hue (H°) of the target cluster, calculated by the cluster analysis section 902 in the sixth embodiment of the image processing system of the invention. FIG. 46A provides an example of a histogram having only one maximum value and FIG. 46B provides an example of a histogram having two maximum values. With the histogram shown in FIG. 46A, only H° can be calculated as a hue value having a peak value. On the other hand, if the histogram has more than one maximum value as shown in FIG. 46B, whether or not the maximum values are effective as peak values is checked. For example, if the values of H1 and H2 are distant from each other to some extent and a frequency valley between H1 and H2 is clear, H1 and H2 can be assumed to be different peak values. This can be verified by checking whether or not the following conditional expressions are satisfied:

$|H2-H1| \geq Th1$

Min $(N1, N2)-N3 \geq Th2$ where H1 and H2 are hue values having adjacent maximum values, N1 and N2 are hue value frequencies corresponding to H1 and H2, N3 is a minimum value of frequencies between H1 and H2, Th1 and Th2 are predetermined threshold values, and Min (N1, N2) is N1 or N2, whichever is the smaller.

If the conditions are satisfied, the maximum values are calculated as peak values. For example, in FIG. 46B, the peak values H1 and H2 can be calculated. If the conditions are not satisfied, for example, the maximum value with the larger frequency can be represented to two maximum values for calculating one peak value. For example, if the conditions are not satisfied in FIG. 46B, only Hi with the larger frequency is calculated as the peak value.

At step S343, whether or not more than one peak value is extracted at step S342 is checked. If more than one peak value is extracted, it is determined that the target cluster can be furthermore divided, and cluster redivision processing is performed at steps S344 and S345. At step S344, the cluster is again divided based on the peak values. Here, a hue histogram is used to calculate the peak values. Thus, the cluster center equal to the peak value is considered for the initial cluster of the total number of the peak values and reallocation of pixels is repeated according to the hue values, thereby again dividing the cluster. This method, which is the K-mean method, is already described with reference to FIG. 37 and therefore will not be discussed again in detail. Although the histogram with only hue is used to calculate peak values at step S342 in the example, a multi-dimensional histogram, such as a three-dimensional histogram of (L, C, H), may be prepared for calculating peak values for again dividing the corresponding cluster according to the three features of L, C, and H. At step S345, the color distributions of the clusters into which the cluster is again divided at step S344 are analyzed by a method similar to that described in the cluster analysis section 902.

At step S346, whether or not a cluster not yet subjected to cluster redivision processing exists is determined. If a cluster not yet subjected to cluster redivision processing exists, control returns to step S341 at which the process is repeated. At completion of processing for all clusters, steps S351 to S356 are executed for cluster reintegration processing.

At step S351, one cluster not subjected to reintegration processing is selected from among all clusters containing clusters generated in the cluster redivision processing. At step S352, a cluster having a representative color similar to the representative color of the target cluster is extracted for preparing a similar color list. To do this, the difference between the representative color of the target cluster and that of each of all other clusters is calculated and the cluster having the difference smaller than a preset threshold value is added to the similar color list.

At steps S353 to S355, the clusters having the same color distribution as the target cluster are extracted out of the prepared similar color list and are integrated with the target cluster. As a result, if even clusters at distant locations on the position space have similar representative colors and similar color distributions, they can be handled as one cluster. For the representative colors, similarity is guaranteed by selecting clusters out of the similar color list. For color distribution similarity, here any of the attributes recognized by the cluster analysis section 902, namely, flat color, gradation, or random is used as a color distribution and if the attributes match, the color distributions are assumed to be similar and the clusters are integrated.

At step S356, the color distribution of the resultant cluster is analyzed. Since the color distribution in the cluster results from integrating the clusters of the same color distribution, the color distribution of the resultant cluster should also be the same as that of each of the clusters before they are integrated. Therefore, here the representative color is again calculated only. If the process is not required, the analysis can also be skipped.

At step S357, whether or not a cluster not yet subjected to cluster reintegration processing exists is determined. If a cluster not yet subjected to cluster reintegration processing remains, control returns to step S351 at which the process is repeated. If a cluster not yet subjected to cluster reintegration processing does not remain, processing of the cluster correction section 903 is completed.

The profile and mask preparation section 96 prepares a profile appropriate for the target cluster depending on whether the color distribution in the cluster recognized by the cluster analysis section 902 is random, flat color, or gradation. Here, it is assumed that neither gradation nor color discrimination need not be considered for clusters to which the random attribute is added, and the profile and mask preparation section 96 does not apply processing to the clusters. Specifically, in profile preparation processing for the clusters to which the random attribute is added, a color reproduction range compression initialization profile is output intact.

Profile preparation processing for the clusters to which the flat color attribute is added is similar to that in the first embodiment; for example, a profile can be prepared according to the flowchart shown in FIG. 7. Profile preparation processing for the clusters to which the gradation attribute is added is also similar to that in the first embodiment; for example, a profile can be prepared according to the flowchart shown in FIG. 9.

The profile link section 97 can link each of the profile prepared from flat color by the profile and mask preparation section 96 and the profiles for each cluster prepared from gradation with a profile for an image output device 7 to prepare a final profile, for example, according to the flowchart shown in FIG. 29, as in the third or fifth embodiment.

One profile for flat color (which means other than gradation and in the example, also contains a cluster given the random attribute) and more than one gradation profile thus prepared are held in a holding section 82 and are set in direct look-up tables 5l–5N. The mask information in the position space related to each profile is also held in the holding section 82 and is sent to a selector 10. The selector 10 selects a direct look-up table for inputting a pixel according to the mask information and sends the pixel values of the pixel (L, C, H). Table values provided from any of the direct lookup tables 5l–5N are interpolated by an interpolator 6 and are transmitted to the image output device 7 for forming an image.

Next, a seventh embodiment of the image processing system of the invention will be discussed. In the first embodiment, the area determination section 12 extracts division color areas each having a frequency greater than one threshold value as target division color areas and the subsequent processing is performed for the target division color areas for speeding up the processing. However, the target division color areas also contain a large number of division color areas within the color reproduction range not affected at all when target division color areas outside the color reproduction range are placed within the color reproduction range in processing of the profile preparation section 14. Since no processing is performed for the division color areas as a result, time is wasted in grouping of the group preparation section 13, color difference determination processing of the profile preparation section 14, etc. Since unnecessary color division area information is also held, a large memory area becomes necessary. In the seventh embodiment, for a group preparation section 13 to prepare only groups having a high possibility that they will be processed by a profile preparation section 14, an area determination section 12 excludes unnecessary target division color areas for speeding up the subsequent processing. The seventh embodiment differs from the first embodiment only in processing of the area determination section 12; this difference will only be discussed.

Figure 47:
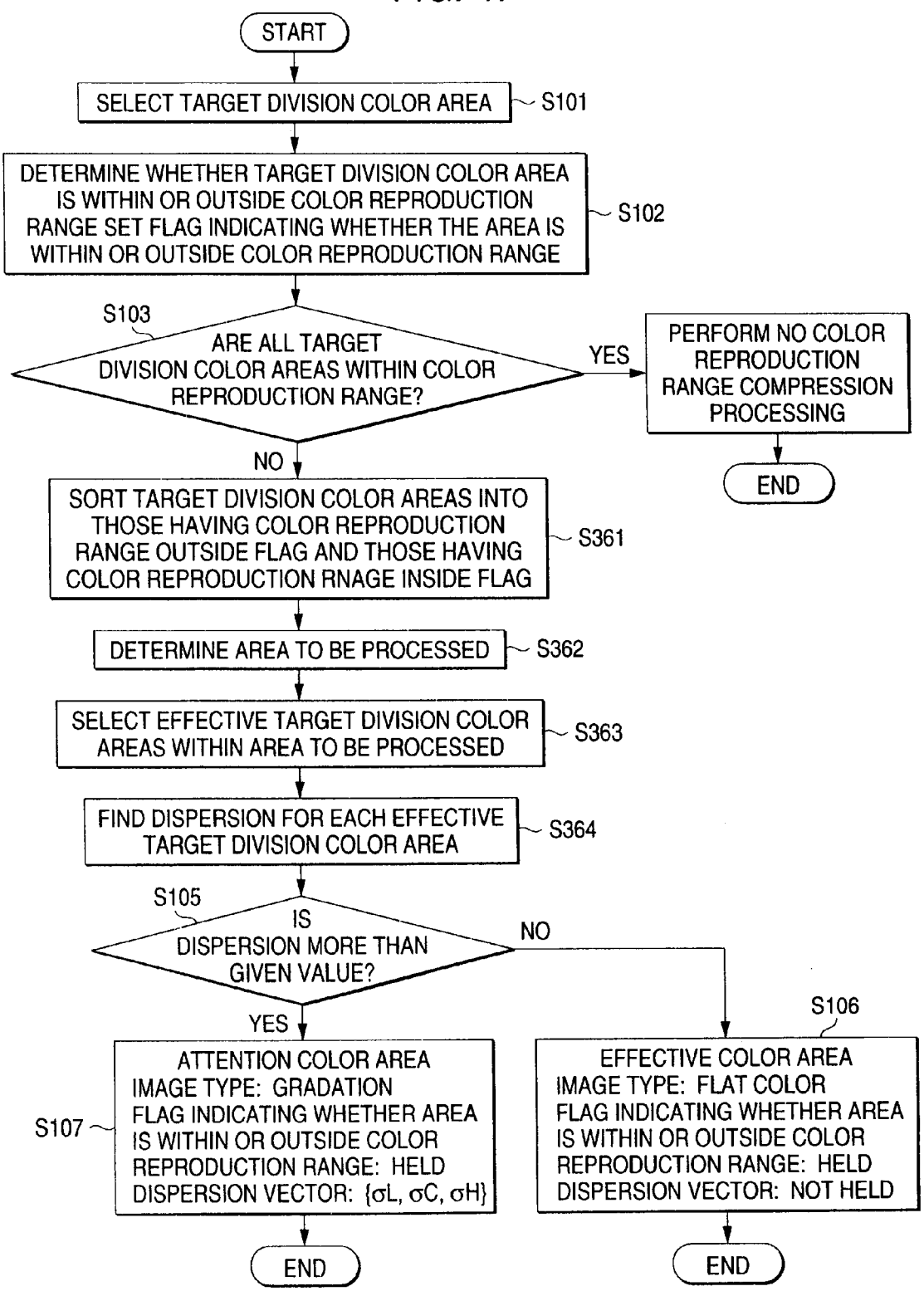
FIG. 47 is a flowchart to show a processing example of an area determination section 12 in a seventh embodiment of the image processing system of the invention.

FIG. 47 is a flowchart to show a processing example of the area determination section 12 in the seventh embodiment of the image processing system of the invention. Steps similar to those previously described with reference to FIG. 4 are denoted by the same step numerals in FIG. 47 and will not be discussed again. At step S101, the histogram frequency is checked for each division color area and the division color areas each having the frequency greater than a threshold value are selected as the target division color areas. At step S102, whether each of the division color areas determined to be the target division color areas at step S101 is within or outside the color reproduction range, and flag data indicating whether the area is within or outside the color reproduction range is given to each division color area. At step S103, whether or not all target division color areas are within the color reproduction range is checked based on the determination result at step S102. If not all target division color areas are within the color reproduction range, step S361 and the later steps are executed.

At step S361, all target division color areas are sorted into target division color areas having a color reproduction range outside indication flag and those having a color reproduction range inside indication flag. At step S362, the area to be processed is determined. The area to be processed indicates a color area having a possibility that it will be moved as the profile preparation section 14 performs processing, for example, as shown in FIG. 7 for an effective color area (flat color division color area). The color area having a possibility that it will be moved is a color area within a similar color reproduction range when a color outside the color reproduction range is moved to the inside of the color reproduction range, for example. To determine the area to be processed, conditions for determining whether or not the area is the area to be processed may be set as a specific example. Setting the determination conditions will be described later.

At step S363, only the target division color areas existing within the area to be processed, determined at step S362 are selected from among the target division color areas within the color reproduction range. Of the target division color areas within the color reproduction range, information concerning the target division color areas outside the area to be processed, determined at step S362 is not used in the subsequent processing and may be erased at this stage. The target division color areas outside the color reproduction range and the division color areas existing within the area to be processed, determined at step S362 among the target division color areas within the color reproduction range will be represented as effective target division color areas.

At step S364, for the effective target division color areas selected at step S363, dispersion values in L, C, and H directions for each effective target division color area are found as σL, σC, and σH based on the distribution within the target division color area. At step S105, whether or not all dispersion values found at step S364 are equal to or less than threshold values is determined for each effective target division color area. If all dispersion values are equal to or less than the threshold values, the image type is set to flat color at step S106; otherwise, the image type is set to gradation at step S107.

The subsequent processing is applied only to the effective target division color areas and is performed as in the first embodiment. Since only the effective target division color areas are to be processed, the areas to be processed in grouping of the group preparation section 13, similar color determination of the profile preparation section 14, etc., can be decreased for speeding up the subsequent processing.

Figure 48:
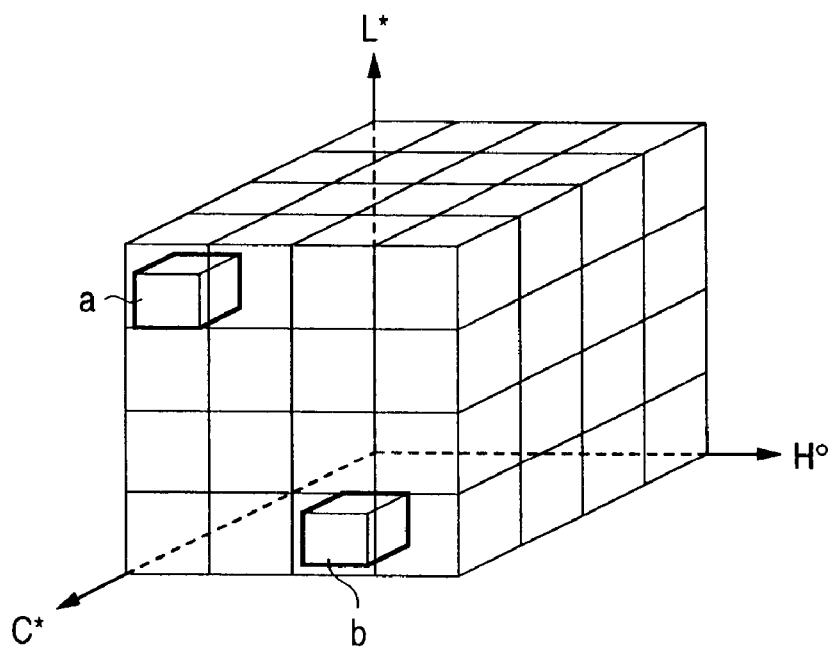
FIG. 48 is an illustration of an example of determination processing of the area to be processed in the seventh embodiment of the image processing system of the invention.
Figure 49:
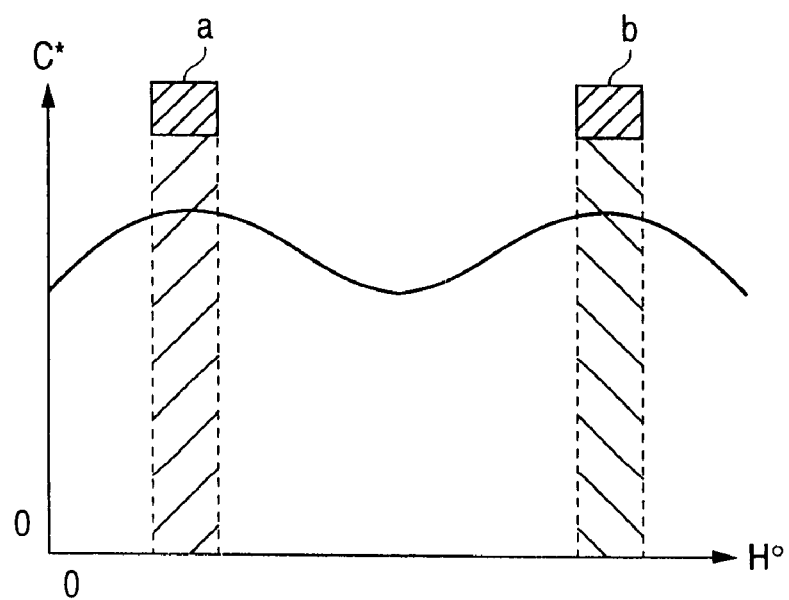
FIG. 49 is an illustration of an example of determination processing of the area to be processed on a $C^*$—H plane in the seventh embodiment of the image processing system of the invention.
Figure 50:
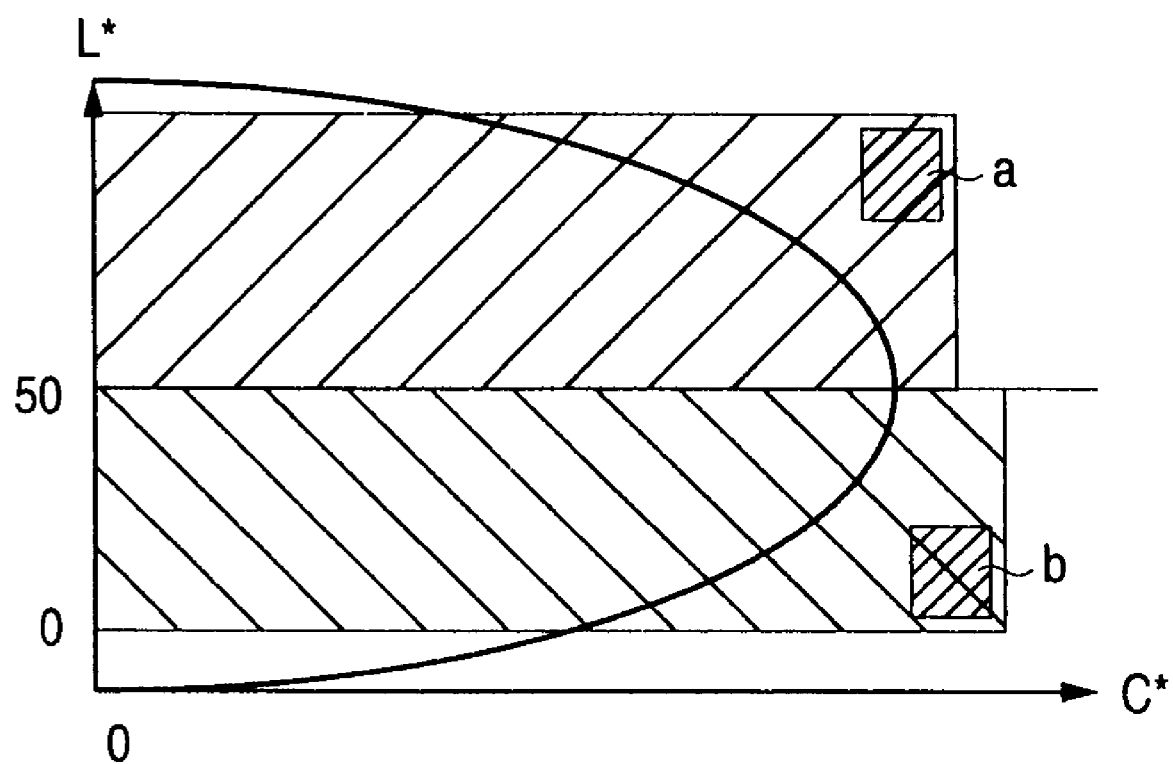
FIG. 50 is an illustration of an example of determination processing of the area to be processed on an $L^*$—$C^*$ plane in the seventh embodiment of the image processing system of the invention.

FIG. 48 is an illustration of an example of determination processing of the area to be processed in the seventh embodiment of the image processing system of the invention. FIG. 49 is an illustration of an example of determination processing of the area to be processed on a C*–H plane in the seventh embodiment of the image processing system of the invention. FIG. 50 is an illustration of an example of determination processing of the area to be processed on an L*–C* plane in the seventh embodiment of the image processing system of the invention. In FIGS. 49 and 50, the boundary between the inside and the outside of the color reproduction range is indicated by the thick line and the side having smaller values of C* than the thick line is the color reproduction range. FIGS. 48 to 50 show two division color areas outside the color reproduction range as areas a and b.

To reproduce a color outside the color reproduction range in a color inside the color reproduction range, generally the hue (H°) of the color outside the color reproduction range is held and either or both of the chroma (C*) and lightness (L*) are changed for placing the color within the color reproduction range. The hue may be changed, of course, but is scarcely changed largely. As a typical example of a method of changing the chroma and lightness, only the chroma is changed with the lightness held constant or both the lightness and chroma are changed toward a target point (a point in the color space).

In the examples shown in FIGS. 49 and 50 as the area to be processed to hold the hue, the area containing the division color area as shown in FIG. 49 is selected for the hue, the area containing the division color area and up to L*=50 as shown in FIG. 50 is selected for the lightness, and the area containing the division color area from C*=0 is selected for the chroma for setting the area to be processed for each division color area outside the color reproduction range. The numeric value of L*=50 for defining the lightness area can be set to any value. To set each area, some margin can be provided.

The actual area to be processed is an area on a three-dimensional space having coarsely hatched portions in FIGS. 49 and 50 in combination. Since the two areas are outside the color reproduction range (areas and b) in the example, two areas to be processed according to areas a and b are produced. For example, if the area a has hue H1–H2, lightness L1–L2, and chroma C1–C2, the area to be processed can be determined as an area of hue H1–αH1 to H2+αH2, lightness 50 to L2+αL, and chroma 0 to C2+αC.

Figure 51A:
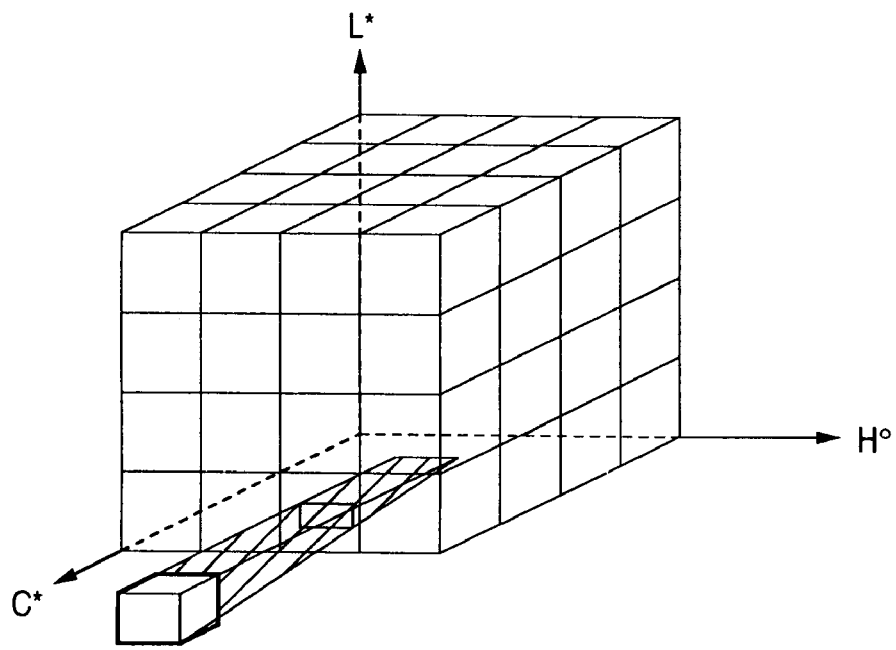
FIGS. 51a–b is an illustration of another example of determination processing of the area to be processed in the seventh embodiment of the image processing system of the invention.
Figure 51B:
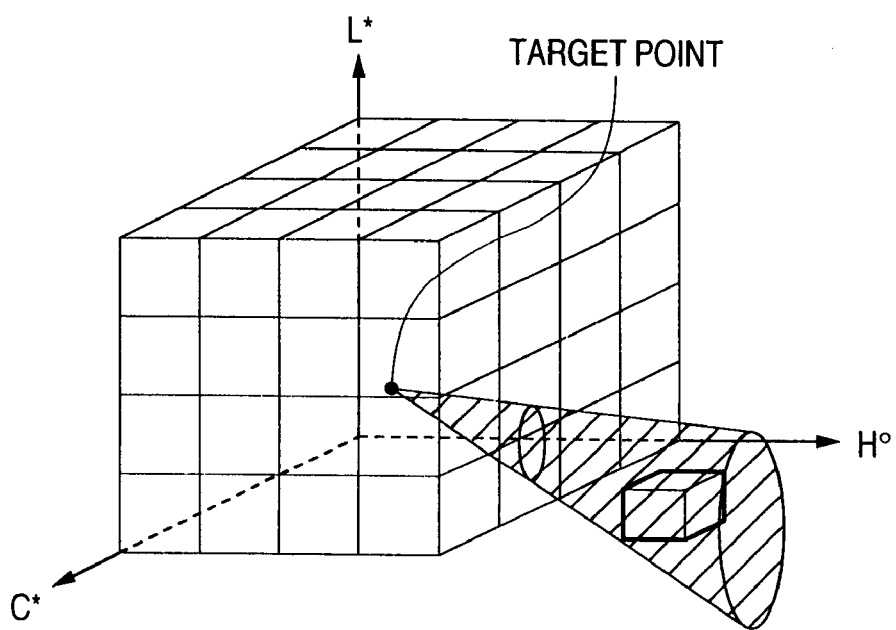

FIG. 51 is an illustration of another example of determination processing of the area to be processed in the seventh embodiment of the image processing system of the invention. In FIG. 48, the area to be processed is determined as a rectangular parallelopiped area in the three-dimensional space of LCH, but may be determined by another method. For example, as shown in FIG. 51A, a triangle pole area such that the chroma and lightness go toward predetermined target values with the hue held can also be set; as shown in FIG. 51B, a cone area such that the hue, chroma, and lightness go toward a target point can also be set. At this time, the target values or target point may be set for each color appropriately.

As still another method, a color reproduction range compression initialization profile may be used. Map data to the color reproduction range contour which seems to be optimum for color outside the color reproduction range is preset in the color reproduction range compression initialization profile, and the same color reproduction range compression initialization profile as used in the profile preparation section 14 can be used. The mapping direction of division color area outside the color reproduction range to the color reproduction range contour (vectory is read from the color reproduction range compression initialization profile and areas of various shapes can also be set in the direction.

The area to be processed can be thus determined for each division color area outside the color reproduction range.

At step S362 in FIG. 47, the areas to be processed, found from all division color areas outside the color reproduction range are collected for determination as the area to be processed.

At this time, neighboring areas to be processed may be integrated appropriately into one area for decreasing the number of the areas to be processed. At step S363, the target division color areas within the color reproduction range, not contained in any areas to be processed thus determined are assumed to be areas to which the subsequent processing is not applied, and the held data is discarded.

Step S362 is executed for providing the area to be processed and unnecessary data is deleted at step S363, thereby speeding up the subsequent processing. However, if the processing time is taken for finding the area to be processed, the whole throughput does not improve. For this reason, it is desired that determination of the area to be processed and deletion of unnecessary information can be executed as easily as possible. In the example, the conditions can be set simply by limiting the axis values of L, C, and H, thus determination of the area to be processed and deletion of unnecessary information can be executed extremely easily. In contrast, division color areas not required in the processing may be able to be sorted roughly, thus easy processing may be adopted for the determination method of the area to be processed.

Since the LCH coordinate system is used as the coordinate system for internal processing in the example, the area to be processed can be determined by easy condition setting as described above. With any other coordinate system, conditions can be set in a similar manner. For example, in a Lab coordinate system, the area with the hue held can be set as a fan-shaped area with the L axis as the center on the a–b plane. The conditions can be set as two linear expressions. To determine the area to be processed according to such expressions, the prepared expressions can be collected for reducing the number of expressions. The Lab color space, a rectangular coordinate system, is converted into a cylindrical coordinate system, whereby it can be converted into the LCH coordinate system, and the area to be processed may be determined in any desired coordinate system. This also applies to other coordinate systems.

Thus, in the seventh embodiment, to map colors outside the color reproduction range to colors within the color reproduction range, the division color areas within the color reproduction range with color discrimination not degraded at all are previously excluded and only the division color areas required for processing can be picked up, so that the subsequent steps can be speeded up and the capacity of the memory, etc., can be saved because needless data is not held.

In the embodiments, the color conversion parameter section 1 or 9 performs color reproduction range compression processing in the LCH color space, but the invention is not limited to it. Similar processing can also be performed in the Lab color space, L*u*v* color space, or any other color space, an equal perceptual color space, for example. The color spaces for the image input device 2 and the image output device 7 are not limited to the RGB or CMYK color space either and may be various color spaces.

Figure 52:
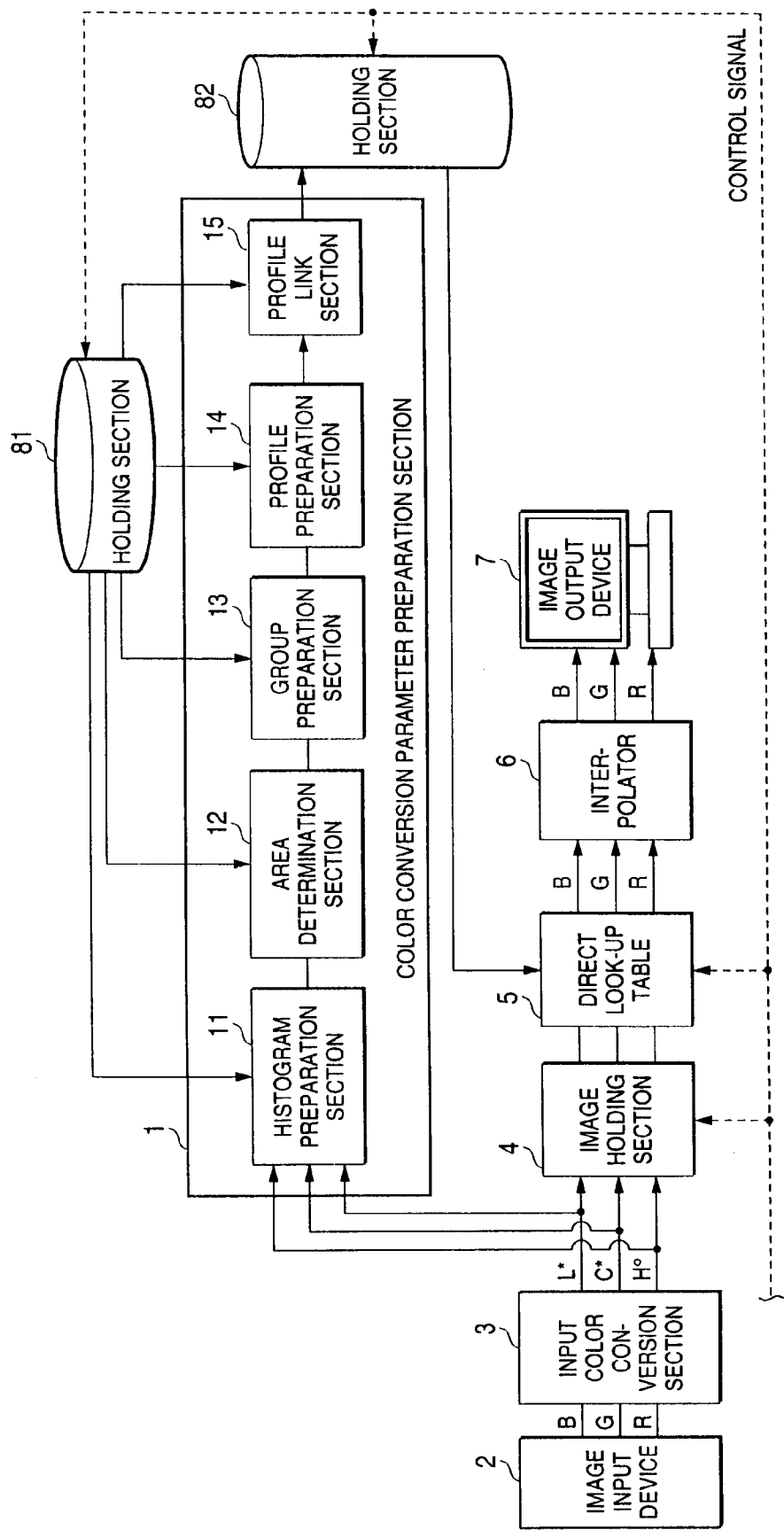
FIG. 52 is a block diagram to show a modification in the first embodiment of the image processing system of the invention.

FIG. 52 is a block diagram to show a modification in the first embodiment of the image processing system of the invention. In the configuration shown in FIG. 52, an image file represented in the YMCK color space for printing is input and the Lab color space is used as the internal processing color space. An output device assumes a CRT and the color space of an output image is the RGB color space.

In the modification, an input color conversion section 3 executes YMCK-to-Lab color conversion, a histogram preparation section 11, an area determination section 12, and a group preparation section 13 perform processing on the Lab color space, and a profile preparation section 14 prepares a profile by using a color reproduction range compression initialization profile for executing Lab-to-Lab color conversion. A profile link section 15 links a profile on the Lab color space prepared by the profile preparation section 14 and a profile for Lab-to-RGB color conversion together to prepare a profile to be set in a direct look-up table 5. This profile is used to execute color conversion of the Lab color space to the RGB color space and the result is output to an image output device 7 such as a CRT.

In addition to the modification shown in FIG. 52, any desired color coordinate systems can be used as the input color space, output color space, and internal processing color space in such a manner that color signals such as YCbCr are used as the input color space. The input color conversion section 3 may be changed in response to the color coordinate systems used as the input color space and the internal processing color space. Processing of the color conversion parameter preparation section 1 may be changed in response to the color coordinate system used as the internal processing color space. The profiles linked by the profile link section 15 may be changed in response to the output color space. If the internal processing color space and the output color space are the same, the profile link section 15 is not required.

As an image file is used in place of an image input device 2 in the modification, an image need not necessarily be output to the image output device 7 and can be stored in a storage unit, transferred to another system via a network, or input to any other software product. For the image input to the color conversion parameter preparation section 1, input images may be thinned out, in which case the processing can be speeded up.

FIG. 52 shows the modification in which the color spaces are changed in the configuration in the first embodiment; a similar modification can also be applied to the second to seventh embodiments.

As seen from the description made so far, according to the invention, color distribution is sorted into groups according to input image data and a color reproduction parameter is determined so as to place colors within the color reproduction range for each group. Thus, the colors of the whole image do not change and degradation of color discrimination as the colors outside the color reproduction range are changed can also be prevented; gradation portions can be represented as gradation and flat portion colors can be represented in colors appropriate for the flat colors at the same time.

Further, position information in the xy position space of image data is used, whereby partial color reproduction parameter use is enabled. For example, while color change of a gradation portion is guaranteed, the color of a flat color portion of the same color is represented faithfully so that gradation of the gradation portion can be made compatible with reproduction of the color appropriate for the flat color portion. At this time, by preparing a group by clustering, the prepared group can be adjusted freely by parameters, and by analyzing the color distribution in the group in detail, compression into the color reproduction range more appropriate to the color distribution of each part can be accomplished. Color value and position information are used at the same time to prepare groups (clusters) and the prepared groups (clusters) are corrected based on the color distributions in and between the groups (clusters), whereby color reproduction parameters for converting colors into colors within the color reproduction range adaptively for each group (cluster) can be determined efficiently.

What is claimed is:

1. An image processing apparatus comprising:
   means for inputting image data,
   cluster preparation means for extracting areas on an image plane made up of similar color pixels based on the image data input through said input means and preparing clusters based on the extracted areas,
   cluster analysis means for recognizing color distributions of the clusters prepared by said cluster preparation means and preparing a group, and
   means for determining a color reproduction parameter of the image data for each of the clusters prepared by said cluster preparation means based on the group generated by said cluster analysis means and a color reproduction range of an output device.

2. The image processing apparatus of claim 1, further comprising:
   cluster correction means for again dividing and again integrating the cluster prepared by said cluster preparation means based on the group generated by said cluster analysis means to prepare new clusters, recognizing color distributions of the new clusters, and generating a new group,
   wherein said color reproduction parameter determination means determines a color reproduction parameter of the image data for each of the new clusters based on the new clusters and the new group generated by said cluster correction means and the color reproduction range of the output device.

3. The image processing apparatus of claim 2, wherein said cluster correction means integrates the clusters based on representative colors of the clusters and the color distributions in the clusters recognized by said cluster analysis section.

4. The image processing apparatus of claim 2, wherein said cluster correction means divides and integrates clusters in response to a form of a multi-dimensional histogram based on the color distributions and color value in the clusters recognized by said cluster analysis section.

5. The image processing apparatus of claim 1, wherein said cluster preparation means extracts clusters on the image space by clustering based on one or more feature amounts extracted from the image data input through said input means.

6. The image processing apparatus of claim 1, wherein said cluster preparation means divides the image data input through said input means into blocks on the image space, repeats block division and integration in response to dispersion of pixel values in the blocks for extracting a global similar color area, and extracts a detailed cluster by clustering based on the global similar color area.

7. The image processing apparatus of claim 1, wherein said cluster preparation means divides the image data input through said input means into blocks on the image space, repeats block division and integration in response to dispersion of pixel values in the blocks for extracting a global similar color area, checks the global similar color area for color distribution, determines whether or not cluster preparation using position information is required, and extracts a detailed cluster by clustering based on the global similar color area, if necessary, based on the determination result.

8. The image processing apparatus of claim 1, wherein said cluster analysis means recognizes a color distribution based on dispersion of pixels belonging to the cluster prepared by said cluster preparation means.

9. The image processing apparatus of claim 1, wherein said cluster analysis means recognizes a color distribution based on a color value change rate of adjacent pixels belonging to the cluster prepared by said cluster preparation means and dispersion of pixels belonging to the cluster.

10. The image processing apparatus of claim 1, wherein said cluster analysis means groups the clusters except for color distributions of portions where no degradation of color discrimination is assumed to occur.

11. An image processing apparatus comprising:
    means for inputting image data,
    one or more multi-dimensional color conversion tables for executing color conversion of the image data input through said input means based on preset lattice point data,
    cluster preparation means for extracting areas on an image space made up of similar color pixels based on the image data input through said input means and preparing clusters based on the extracted areas,
    cluster analysis means for recognizing color distributions of the clusters prepared by said cluster preparation means and preparing a group, and
    means for determining lattice point data for said one or more multi-dimensional color conversion tables based on the clusters prepared by said cluster preparation means, the group generated by said cluster analysis means, and a color reproduction range of an output device.

12. An image processing system comprising:
    an image input device for inputting color image data,
    an image processing apparatus for performing image processing for color image data input through said image input device, and
    an image output device for performing image processing for the color image data based on an image processing instruction given by said image processing apparatus and outputting a color image, wherein said image processing apparatus comprises:
cluster preparation means for extracting areas on an image space made up of similar color pixels based on the color image data and preparing clusters based on the extracted areas, cluster analysis means for recognizing color distributions of the clusters prepared by said cluster preparation means and preparing a group, and means for determining a color reproduction parameter of the color image data based on the clusters prepared by said cluster preparation means, the group generated by said cluster analysis means, and a color reproduction range of said image output device, and wherein said image output device performs color conversion processing for the color image data based on the color reproduction parameter and the position information output from said image processing apparatus, and outputs a color image.

* * * * *